(12) United States Patent
Tamaizumi et al.

(10) Patent No.: US 6,999,862 B2
(45) Date of Patent: Feb. 14, 2006

(54) ELECTRIC POWER STEERING APPARATUS

(75) Inventors: Terutaka Tamaizumi, Okazaki (JP);
Shinya Aono, Okazaki (JP)

(73) Assignees: Favess Co., Ltd., Aichi (JP); Koyo Seiko Co., Ltd., Osaka (JP); Toyoda Koki Kabushiki Kaisha, Aichi (JP)

( * ) Notice: Subject to any disclaimer, the term of this patent is extended or adjusted under 35 U.S.C. 154(b) by 0 days.

(21) Appl. No.: 11/057,014

(22) Filed: Feb. 11, 2005

(65) Prior Publication Data

US 2005/0182541 A1  Aug. 18, 2005

(30) Foreign Application Priority Data

Feb. 13, 2004 (JP) ............................. 2004-037235
Feb. 13, 2004 (JP) ............................. 2004-037324

(51) Int. Cl.
*G60F 165/00* (2006.01)
(52) U.S. Cl. .......................... 701/41; 701/42; 180/446
(58) Field of Classification Search ................. 701/41, 701/42, 43; 180/410, 443, 446; 318/430–434
See application file for complete search history.

(56) References Cited

U.S. PATENT DOCUMENTS

| | | | |
|---|---|---|---|
| 5,732,373 A | | 3/1998 | Endo |
| 5,740,040 A | * | 4/1998 | Kifuku et al. ................. 701/41 |
| 5,919,241 A | | 7/1999 | Bolourchi et al. |
| 6,148,948 A | * | 11/2000 | Shimizu et al. ............. 180/446 |
| 6,240,350 B1 | | 5/2001 | Endo |
| 6,360,151 B1 | * | 3/2002 | Suzuki et al. ................. 701/41 |
| 6,370,459 B1 | | 4/2002 | Phillips |
| 6,407,524 B1 | | 6/2002 | Endo et al. |
| 6,427,104 B1 | * | 7/2002 | Matsushita et al. ........... 701/41 |
| 6,712,089 B1 | * | 3/2004 | Heflin ......................... 137/382 |
| 2001/0002631 A1 | | 6/2001 | Okanoue et al. |

FOREIGN PATENT DOCUMENTS

| | | |
|---|---|---|
| EP | 0 853 029 | 7/1998 |
| JP | 62-168758 | 7/1987 |
| JP | 63-291769 | 11/1988 |
| JP | 02-037075 | 2/1990 |
| JP | 03-074260 | 3/1991 |
| JP | 03-176272 | 7/1991 |
| JP | 03-178868 | 8/1991 |
| JP | 03-178873 | 8/1991 |

(Continued)

*Primary Examiner*—Richard M. Camby
(74) *Attorney, Agent, or Firm*—Jordan and Hamburg LLP

(57) ABSTRACT

An electric power steering apparatus has a motor controlled so as to generate steering assist power according to the steering torque required to operate a steering wheel. As a result of correction of the output of the motor in accordance with a value correlating with the rotation angular velocity correspondence value of the steering wheel, in the frequency response characteristic represented by the steering frequency of the steering wheel and the amplitude ratio of the steering torque relative to the steering angle of the steering wheel, the amplitude ratio is set within a setting range, at least within the steering frequency range when a person operates the steering wheel. As a result of correction of the output of the motor in accordance with a value directly correlating with the change velocity correspondence value of the steering torque, in the frequency response characteristic represented by the frequency of the disturbance torque input from the road surface to the steering system via vehicle wheels and the amplitude ratio of the steering torque relative to the disturbance torque, the amplitude ratio becomes smaller at the resonance frequency.

7 Claims, 31 Drawing Sheets

FOREIGN PATENT DOCUMENTS

| | | |
|---|---|---|
| JP | 5-238409 | 9/1993 |
| JP | 06-099836 | 4/1994 |
| JP | 07-228263 | 8/1995 |
| JP | 2001-106108 | 4/2001 |
| JP | 2002-029429 | 1/2002 |
| JP | 2002-029435 | 1/2002 |
| JP | 2002-302057 | 10/2002 |

* cited by examiner

Prior Art

Prior Art

Prior Art

ELECTRIC POWER STEERING APPARATUS

FIELD OF THE INVENTION

The present invention relates to an electric power steering apparatus for applying steering assist power via a motor.

DESCRIPTION OF THE RELATED ART

In an electric power steering apparatus comprising a motor for generating steering assist power, the steering assist power is varied in accordance with driving conditions such as the steering torque and vehicle speed. Further, the output of the motor for providing steering assist power is corrected in accordance with the rotation angular velocity or rotation angular acceleration of the motor or steering wheel, steering torque, change velocity of the steering torque, steering angle change velocity of vehicle wheels, and so on, so that the influence of inertia of the motor is compensated by improvement of the steering response, and the influence of disturbance is decreased by providing the steering system with viscosity (c.f., Japanese Patent No. 2773325; Japanese Patent No. 2767637; Japanese Patent No. 2694213; Japanese Patent Laid-Open Publication No. 1993-238409; Japanese Patent No. 3050036; Japanese Patent No. 2782254; Japanese Patent No. 2546673; Japanese Examined Patent Publication No. 1995-84178; Japanese Examined Patent Publication No. 1995-75986; Japanese Patent Laid-Open Publication No. 2002-302057; Japanese Patent Laid-Open Publication No. 2002-29435; Japanese Patent Laid-Open Publication No. 2002-29429; Japanese Patent Laid-Open Publication No. 2001-106108; and Japanese Patent Laid-Open Publication No. 1994-99836).

SUMMARY OF THE INVENTION

However, according to the conventional technology, it was not possible to reduce the influence of disturbance without deteriorating the steering response. For instance, in a rack and pinion type electric power steering apparatus which transmits the rotation of the steering wheel to the pinion via a torsion bar, when correcting the motor output according to the rotation angular velocity of the motor for generating steering assist power, it is possible to obtain the board diagrams representing the frequency response characteristic shown by FIG. 28 and FIG. 29. In FIG. 28, the horizontal axis represents the steering frequency (Hz) corresponding to the number of reciprocating operations per unit time of the steering wheel, and the vertical axis represents the amplitude ratio (dB) of the steering torque relative to the steering angle of the steering wheel. In FIG. 29, the horizontal axis represents the input frequency (Hz) of the disturbance torque input from the road surface to the steering system via the vehicle wheels, and the vertical axis represents the amplitude ratio (dB) of the steering torque relative to the disturbance torque.

Here, it is assumed that the input torque Ti to the steering system via the motor is determined with the following formula which subtracts the correction torque T' proportional to the rotation angular velocity of the motor from the basic assist torque To proportional to the steering torque.

$Ti = To - T'$ $To = Ka \cdot Ks(\theta_h - \theta_p)$ $K' = Kdo \cdot d\theta_m/dt$ $\theta_h$ is the steering angle of the steering wheel, $\theta_m$ is the rotation angle of the motor, Ka is a basic assist control gain, Kdo is a control gain of the rotation angular velocity $d\theta_m/dt$ upon correcting the motor output in accordance with the rotation angular velocity $d\theta_m/dt$ of the motor, and Ks is a spring constant of the torsion bar.

In the relationship of the steering frequency and the amplitude ratio of the steering torque relative to the steering angle shown in FIG. 28, the frequency $\omega_1$ and damping ratio $\zeta_1$ are determined with the following formulas.

$$\omega_1 = (K/Jp)^{1/2} \quad (A)$$

$$\zeta_1 = (Cp + Kdo)/\{2 \cdot (Jp \cdot \alpha 1/\alpha 2)^{1/2}\} \quad (B)$$

The frequency $\omega_2$ and damping ratio $\zeta_2$ in the relationship of the input frequency (Hz) of the disturbance torque and the amplitude ratio of the steering torque T relative to the disturbance torque shown in FIG. 29 are determined with the following formulas.

$$\omega_2 = [\{Ks \cdot (1+Ka) + K\}/Jp]^{1/2} \quad (C)$$

$$\zeta_2 = (Cp + Kdo)/\{2 \cdot (Jp \cdot Ks/\alpha 1)^{1/2}\} \quad (D)$$

$\alpha 1$ is a parameter of the weight of steering when the frequency is zero, and $\alpha 2$ is a transmission ratio of disturbance when the frequency is zero, and are represented by the following formulas.

$\alpha 1 = Ks \cdot K/\{Ks \cdot (1+Ka) + K\}$ $\alpha 2 = 1/\{(1+Ka) + K/Ks\}$ K is an elastic coefficient of the steering system, Jp is an inertia of the pinion axis conversion in the steering system, and Cp is a pinion axis conversion viscosity coefficient in the steering system lower than the torsion bar.

In FIG. 29, the state prior to correcting the motor output according to the rotation angular velocity $d\theta_m/dt$ of the motor is shown with a solid line, and the state after correction is shown with a dotted line. Since the gain of the rotation angular velocity $d\theta_m/dt$ of the motor is Kdo, when such correction is performed, the damping ratio $\zeta_2$ increases pursuant to the above-mentioned formula (D). In other words, the dotted line after correction shifts relative to the solid line before correction shown in FIG. 29 toward a direction in which the peak value of the amplitude ratio becomes smaller at the resonance frequency (generally existing in a range of roughly 10 to 30 Hz in the steering system). Thus, the influence of disturbance to the steering can be suppressed.

Meanwhile, in FIG. 28, the state prior to correcting the motor output is shown with a solid line, and the state after correction is shown with a dotted line. Since the gain of the rotation angular velocity $d\theta_m/dt$ of the motor is Kdo, when such correction is performed, the damping ratio $\zeta_1$ increases pursuant to the above-mentioned formula (B). In other words, within the steering frequency range when a person operates the steering wheel (generally a range of 2 Hz or less since the frequency does not exceed 2 Hz even upon sharp steering), the dotted line after correction shifts relative to the solid line before correction shown in FIG. 28 toward a direction in which the amplitude ratio increases, and therefore the steering response deteriorates and the feel of steering becomes inferior.

Further, according to the conventional technology, it was not possible to simultaneously improve the steering response and reduce the influence of disturbance in a sufficient manner. For instance, in a rack and pinion type electric power steering apparatus which transmits the rotation of the steering wheel to the pinion via a torsion bar, when the output of the motor for generating steering assist power is corrected according to the rotation angular acceleration of the motor, it is possible to obtain the board diagrams representing the frequency response characteristic shown in FIG. 30 and FIG. 31. In FIG. 30, the horizontal axis represents the steering frequency (Hz) corresponding to the number of reciprocating operations per unit time of the steering wheel, and the vertical axis represents the amplitude ratio (dB) of the steering torque relative to the steering angle of the steering wheel. In FIG. 31, the horizontal axis represents the input frequency (Hz) of the disturbance torque input from the road surface to the steering system via vehicle wheels, and the vertical axis represents the amplitude ratio (dB) of the steering torque relative to the disturbance torque.

Here, it is assumed that the input torque Ti to the steering system via the motor is determined with the following formula which adds the correction torque T' proportional to the rotation angular acceleration of the motor to the basic assist torque To proportional to the steering torque.

$$Ti = To + T'$$

$$To = Ka \cdot Ks(\theta_h - \theta_p)$$

$$T' = Km \cdot d^2\theta_m/dt^2$$

$\theta_h$ is the steering angle of the steering wheel, $\theta_m$ is the rotation angle of the motor, Ka is a basic assist control gain, Km is a control gain of the rotation angular acceleration $d^2\theta_m/dt^2$ upon correcting the motor output in accordance with the rotation angular acceleration $d^2\theta_m/dt^2$ of the motor, and Ks is a spring constant of the torsion bar.

In the relationship of the steering frequency and the amplitude ratio of the steering torque relative to the steering angle shown in FIG. 30, the frequency $\omega_1$ and damping ratio $\zeta_1$ are determined with the following formulas.

$$\omega_1 = \{K/(Jp - Km)\}^{1/2} \quad (E)$$

$$\zeta_1 = Cp/[2 \cdot \{(Jp - Km) \cdot \alpha 1/\alpha 2\}^{1/2}] \quad (F)$$

The frequency $\omega_2$ and damping ratio $\zeta_2$ in the relationship of the input frequency (Hz) of the disturbance torque and the amplitude ratio of the steering torque T relative to the disturbance torque shown in FIG. 31 are determined with the following formulas.

$$\omega_2 = [\{Ks \cdot (1 + Ka) + K\}/(Jp - Km)]^{1/2} \quad (G)$$

$$\zeta_2 = Cp/[2 \cdot \{(Jp - Km) \cdot Ks/\alpha 1\}^{1/2}] \quad (H)$$

$\alpha 1$ is a parameter of the weight of steering when the frequency is zero, and $\alpha 2$ is a transmission ratio of disturbance when the frequency is zero, and are represented by the following formulas.

$$\alpha 1 = Ks \cdot K/\{Ks \cdot (1 + Ka) + K\}$$

$$\alpha 2 = 1/\{(1 + Ka) + K/Ks\}$$

K is an elastic coefficient of the steering system, Jp is an inertia of the pinion axis conversion in the steering system, and Cp is a pinion axis conversion viscosity coefficient in the steering system lower than the torsion bar.

In FIG. 30, the state prior to correcting the motor output is shown with a solid line, and the state after correction is shown with a dotted line. Since the gain of the rotation angular acceleration $d^2\theta_m/dt^2$ of the motor is Km, when such correction is performed, the frequency $\omega_1$ increases pursuant to the above-mentioned formula (E). In other words, the dotted line after correction shifts relative to the solid line before correction shown in FIG. 30 toward a direction in which the frequency $\omega_1$ increases. As a result, since the amplitude ratio becomes smaller under the same frequency in the steering frequency range when a person operates the steering wheel (generally a range of 2 Hz or less since the frequency does not exceed 2 Hz even upon sharp steering), the steering response improves.

Meanwhile, in FIG. 31, the state prior to correcting the motor output is shown with a solid line, and the state after correction is shown with a dotted line. Since the gain of the rotation angular acceleration $d^2\theta_m/dt^2$ of the motor is Km, when such correction is performed, the frequency $\omega_2$ increases pursuant to formula (G) above. In other words, the dotted line after correction shifts relative to the solid line before correction shown in FIG. 31 toward a direction in which the frequency $\omega_2$ increases. As a result, the resonance frequency (generally existing in a range of roughly 10 to 30 Hz in the steering system) in which the amplitude ratio becomes the peak value increases. Thus, the frequency range of disturbance in which the disturbance has an influence expands, so that the influence of disturbance against the steering increases. In other words, when the motor output is corrected according to the rotation angular acceleration of the motor, the range of input frequency of the disturbance torque generating resonance increases, and it is easy to come under the influence of disturbance.

An object of the present invention is to provide an electric power steering apparatus capable of overcoming the foregoing problem.

The present invention is applied to an electric power steering apparatus comprising a motor for generating steering assist power; a means for determining the steering torque required to operate a steering wheel; and a means for controlling the motor so as to generate the steering assist power according to the determined steering torque.

In one aspect of the present invention, the electric power steering apparatus includes: a means for determining a rotation angular velocity correspondence value corresponding to the rotation angular velocity of the steering wheel; a means for determining a change velocity correspondence value corresponding to the change velocity of the steering torque; a means for storing a first relation set between the rotation angular velocity correspondence value and a first motor output correction value correlating with the rotation angular velocity correspondence value; a means for storing a second relation set between the change velocity correspondence value and a second motor output correction value directly correlating with the change velocity correspondence value; and a means for correcting the output of the motor in accordance with the sum of the first motor output correction value corresponding to the determined rotation angular velocity correspondence value and the second motor output correction value corresponding to the determined change velocity correspondence value; wherein, in a frequency response characteristic represented by the steering frequency of the steering wheel and the amplitude ratio of the steering torque relative to the steering angle of the steering wheel, the first relation is set such that the amplitude ratio is within a setting range as a result of correction of the output of the motor, at least within the steering frequency range when a person operates the steering wheel; and in a frequency response characteristic represented by the frequency of the disturbance torque input from the road surface to the steering system via vehicle wheels and the amplitude ratio of the steering torque relative to the disturbance torque, the second relation is set such that the amplitude ratio becomes smaller at the resonance frequency as a result of correction of the output of the motor.

As a result, since the amplitude ratio does not become too large or too small at least within the steering frequency range when a person operates the steering wheel, the feel of steering does not become inferior. Further, since the amplitude ratio of the steering torque relative to the disturbance torque becomes smaller at the resonance frequency, the influence of disturbance to the steering can be suppressed.

In another aspect of the present invention, the electric power steering apparatus includes: a means for determining a rotation angular velocity correspondence value corresponding to the rotation angular velocity of the motor; a means for determining a change velocity correspondence value corresponding to the change velocity of the steering torque; a means for storing a first relation set between the rotation angular velocity correspondence value and a first motor output correction value correlating with the rotation angular velocity correspondence value; a means for storing a second relation set between the change velocity correspondence value and a second motor output correction value directly correlating with the change velocity correspondence value; and a means for correcting the output of the motor in accordance with the sum of the first motor output correction value corresponding to the determined rotation angular velocity correspondence value and the second motor output correction value corresponding to the determined change velocity correspondence value; a wherein, in a frequency response characteristic represented by the steering frequency of the steering wheel and the amplitude ratio of the steering torque relative to the steering angle of the steering wheel, the first relation is set such that the amplitude ratio is within a setting range as a result of correction of the output of the motor, at least within the steering frequency range when a person operates the steering wheel; and in a frequency response characteristic represented by the frequency of the disturbance torque input from the road surface to the steering system via vehicle wheels and the amplitude ratio of the steering torque relative to the disturbance torque, the second relation is set such that the amplitude ratio becomes smaller at a resonance frequency as a result of correction of the output of the motor.

As a result, since the amplitude ratio does not become too large or too small at least within the steering frequency range when a person operates the steering wheel, the feel of steering does not become inferior. Further, since the amplitude ratio of the steering torque relative to the disturbance torque becomes smaller at the resonance frequency, the influence of disturbance to the steering can be suppressed.

In another aspect of the present invention, the electric power steering apparatus includes: a means for determining a first rotation angular velocity correspondence value corresponding to the rotation angular velocity of the steering wheel; a means for determining a second rotation angular velocity correspondence value corresponding to the rotation angular velocity of the motor; a means for storing a first relation set between the first rotation angular velocity correspondence value and a first motor output correction value correlating with the first rotation angular velocity correspondence value; a means for storing a second relation set between the second rotation angular velocity correspondence value and a second motor output correction value inversely correlating with the second rotation angular velocity correspondence value; and a means for correcting the output of the motor in accordance with the sum of the first motor output correction value corresponding to the determined first rotation angular velocity correspondence value and the second motor output correction value corresponding to the determined second rotation angular velocity correspondence value; wherein, in a frequency response characteristic represented by the steering frequency of the steering wheel and the amplitude ratio of the steering torque relative to the steering angle of the steering wheel, the first relation is set such that the amplitude ratio is within a setting range as a result of correction of the output of the motor, at least within the steering frequency range when a person operates the steering wheel; and in a frequency response characteristic represented by the frequency of the disturbance torque input from the road surface to the steering system via vehicle wheels and the amplitude ratio of the steering torque relative to the disturbance torque, the second relation is set such that the amplitude ratio becomes smaller at the resonance frequency as a result of correction of the output of the motor.

As a result, since the amplitude ratio does not become too large or too small at least within the steering frequency range when a person operates the steering wheel, the feel of steering does not become inferior. Further, since the amplitude ratio of the steering torque relative to the disturbance torque becomes smaller at the resonance frequency, the influence of disturbance to the steering can be suppressed.

As described above, by correcting the motor output in accordance with the first motor output correction value correlating with the rotation angular velocity of the steering wheel, in the frequency response characteristic represented by the steering frequency of the steering wheel and the amplitude ratio of the steering torque relative to the steering angle of the steering wheel, the amplitude ratio can be arbitrarily set at least within the steering frequency range when a person operates the steering wheel. Thus, the influence of disturbance can be decreased without deteriorating the feel of steering, by correcting the output of the motor in accordance with the sum of the first motor output correction value and the second motor output correction value corresponding to the change velocity of the physical quantity influencing the steering torque. Accordingly, in the present invention, the electric power steering apparatus includes: a means for determining a rotation angular velocity correspondence value corresponding to the rotation angular velocity of the steering wheel; a means for determining a change velocity correspondence value corresponding to the change velocity of the physical quantity influencing the steering torque; a means for storing a first relation set between the rotation angular velocity correspondence value and a first motor output correction value correlating with the rotation angular velocity correspondence value; a means for storing a second relation set between the change velocity correspondence value and a second motor output correction value correlating with the change velocity correspondence value; and a means for correcting the output of the motor in accordance with the sum of the first motor output correction value corresponding to the determined rotation angular velocity correspondence value and the second motor output correction value corresponding to the determined change velocity correspondence value; wherein, in a frequency response characteristic represented by the steering frequency of the steering wheel and the amplitude ratio of the steering torque relative to the steering angle of the steering wheel, the first relation is set such that the amplitude ratio is within a setting range as a result of correction of the output of the motor, at least within the steering frequency range when a person operates the steering wheel; and in a frequency response characteristic represented by the frequency of the disturbance torque input from the road surface to the steering system via vehicle wheels and the amplitude ratio of the steering torque relative to the disturbance torque, the second relation is set such that the amplitude ratio becomes smaller at the resonance frequency as a result of correction of the output of the motor.

Thus, according to the electric power steering apparatus of the present invention, the influence of disturbance can be reduced without deteriorating the feel of steering.

In another aspect of the present invention, the electric power steering apparatus includes: a means for determining a rotation angular acceleration correspondence value corresponding to the rotation angular acceleration of the steering wheel; a means for determining a change acceleration correspondence value corresponding to the change acceleration of the steering torque; a means for storing a first relation set between the rotation angular acceleration correspondence value and a first motor output correction value directly correlating with the rotation angular acceleration correspondence value; a means for storing a second relation set between the change acceleration correspondence value and a second motor output correction value directly correlating with the change acceleration correspondence value; and a means for correcting the output of the motor in accordance with the sum of the first motor output correction value corresponding to the determined rotation angular acceleration correspondence value and the second motor output correction value corresponding to the determined change acceleration correspondence value; wherein, in a frequency response characteristic represented by the steering frequency of the steering wheel and the amplitude ratio of the steering torque relative to the steering angle of the steering wheel, the first relation is set such that the amplitude ratio becomes smaller under the same frequency as a result of correction of the output of the motor, at least within the steering frequency range when a person operates the steering wheel; and in a frequency response characteristic represented by the frequency of the disturbance torque input from the road surface to the steering system via vehicle wheels and the amplitude ratio of the steering torque relative to the disturbance torque, the second relation is set such that the resonance frequency at which the amplitude ratio reaches the peak value becomes smaller as a result of correction of the output of the motor.

With the result that the amplitude ratio of the steering torque relative to the steering angle of the steering wheel becomes smaller at least within the steering frequency range when a person operates the steering wheel, the steering response can be improved. Further, since the resonance frequency of the steering system in which the amplitude ratio of the steering torque relative to the disturbance torque reaches a peak value becomes smaller, the input frequency of the disturbance torque corresponding to such resonance frequency becomes smaller, the frequency range of disturbance in which the disturbance has an influence becomes narrow, and the influence of disturbance to the steering can be suppressed thereby.

In another aspect of the present invention, the electric power steering apparatus includes: a means for determining a rotation angular acceleration correspondence value corresponding to the rotation angular acceleration of the motor; a means for determining a change acceleration correspondence value corresponding to the change acceleration of the steering torque; a means for storing a first relation set between the rotation angular acceleration correspondence value and a first motor output correction value directly correlating with the rotation angular acceleration correspondence value; a means for storing a second relation set between the change acceleration correspondence value and a second motor output correction value directly correlating with the change acceleration correspondence value; and a means for correcting the output of the motor in accordance with the sum of the first motor output correction value corresponding to the determined rotation angular acceleration correspondence value and the second motor output correction value corresponding to the determined change acceleration correspondence value; wherein, in a frequency response characteristic represented by the steering frequency of the steering wheel and the amplitude ratio of the steering torque relative to the steering angle of the steering wheel, the first relation is set such that the amplitude ratio becomes smaller under the same frequency as a result of correction of the output of the motor, at least within the steering frequency range when a person operates the steering wheel; and in a frequency response characteristic represented by the frequency of the disturbance torque input from the road surface to the steering system via vehicle wheels and the amplitude ratio of the steering torque relative to the disturbance torque, the second relation is set such that the resonance frequency at which the amplitude ratio reaches the peak value becomes smaller as a result of correction of the output of the motor.

With the result that the amplitude ratio of the steering torque relative to the steering angle of the steering wheel becomes smaller at least within the steering frequency range when a person operates the steering wheel, the steering response can be improved. Further, since the resonance frequency of the steering system in which the amplitude ratio of the steering torque relative to the disturbance torque reaches a peak value becomes smaller, the input frequency of the disturbance torque corresponding to such resonance frequency becomes smaller, the frequency range of disturbance in which the disturbance has an influence becomes narrow, and the influence of disturbance to the steering can be suppressed thereby.

In another aspect of the present invention, the electric power steering apparatus includes: a means for determining a first rotation angular acceleration correspondence value corresponding to the rotation angular acceleration of the steering wheel; a means for determining a second rotation angular acceleration correspondence value corresponding to the rotation angular acceleration of the motor; a means for storing a first relation set between the first rotation angular acceleration correspondence value and a first motor output correction value directly correlating with the first rotation angular acceleration correspondence value; a means for storing a second relation set between the second rotation angular acceleration correspondence value and a second motor output correction value inversely correlating with the second rotation angular acceleration correspondence value; and a means for correcting the output of the motor in accordance with the sum of the first motor output correction value corresponding to the determined first rotation angular acceleration correspondence value and the second motor output correction value corresponding to the determined second rotation angular acceleration correspondence value; wherein, as a result of correction of the output of the motor in accordance with the first motor output correction value, in a frequency response characteristic represented by the steering frequency of the steering wheel and the amplitude ratio of the steering torque relative to the steering angle of the steering wheel, the first relation is set such that the amplitude ratio becomes smaller under the same frequency, at least within the steering frequency range when a person operates the steering wheel; and as a result of correction of the output of the motor in accordance with the second motor output correction value, in a frequency response characteristic represented by the frequency of the disturbance torque input from the road surface to the steering system via vehicle wheels and the amplitude ratio of the steering torque relative to the disturbance torque, the second relation is set such that the resonance frequency at which the amplitude ratio reaches the peak value becomes smaller.

With the result that the amplitude ratio of the steering torque relative to the steering angle of the steering wheel becomes smaller at least within the steering frequency range when a person operates the steering wheel, the steering response can be improved. Further, since the resonance frequency of the steering system in which the amplitude ratio of the steering torque relative to the disturbance torque reaches a peak value becomes smaller, the input frequency of the disturbance torque corresponding to such resonance frequency becomes smaller, the frequency range of disturbance in which the disturbance has an influence becomes narrow, and the influence of disturbance to the steering can be suppressed thereby.

Thus, according to the electric power steering apparatus of the present invention, the influence of disturbance can be reduced simultaneously while improving the steering response.

DESCRIPTION OF THE PREFERRED EMBODIMENTS

Figure 1:
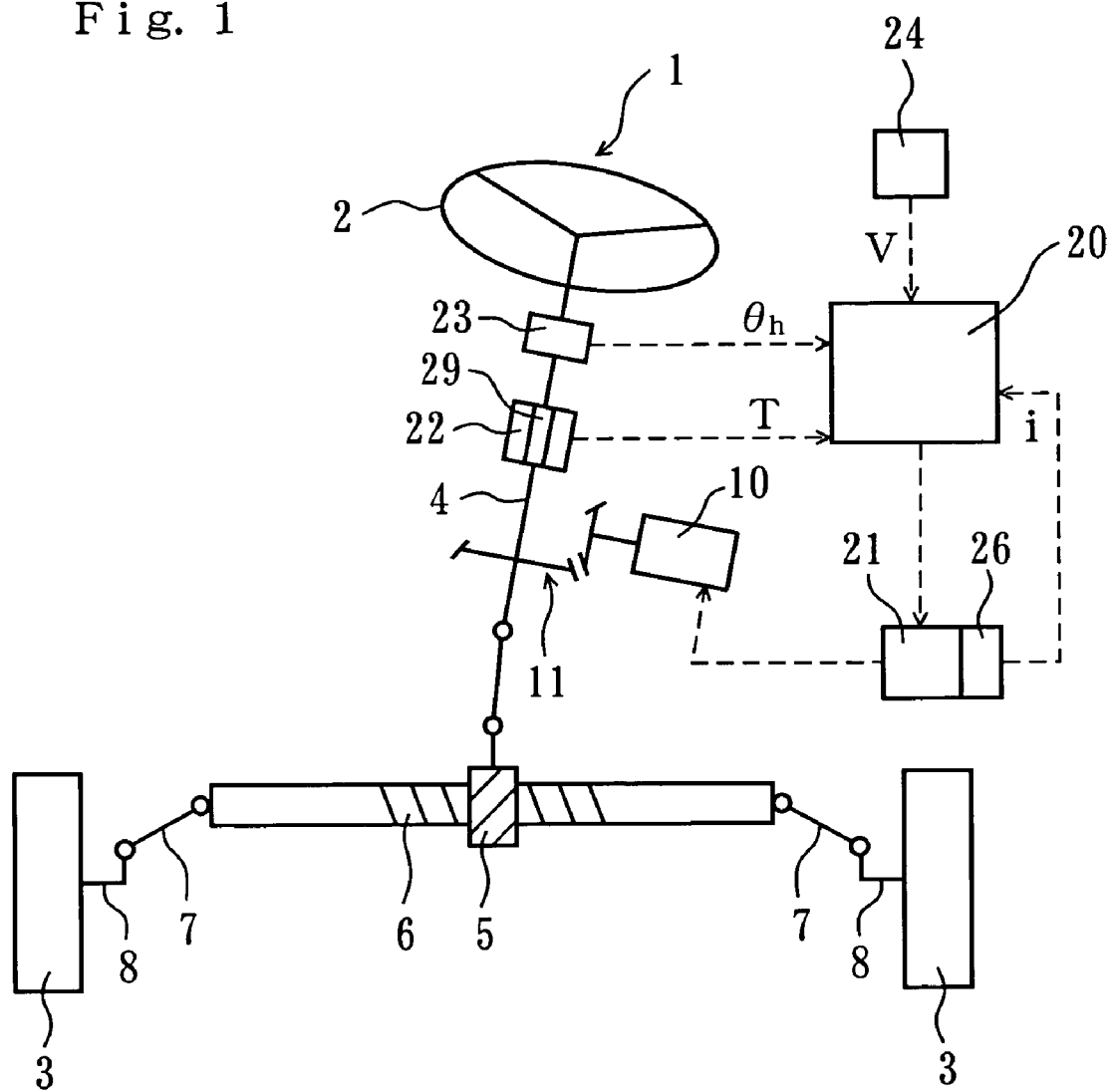
FIG. 1 is a constitutional explanatory diagram of the electric power steering apparatus according to the first embodiment of the present invention.

An electric power steering apparatus 1 for vehicles according to the first embodiment shown in FIG. 1 comprises a mechanism for transmitting the rotation of a steering wheel 2 based on steering operation to vehicle wheels 3 so as to vary the steering angle. In the present embodiment, as a result of the rotation of the steering wheel 2 being transmitted to a pinion 5 via a steering shaft 4, a rack 6 engaging with the pinion 5 moves, and the steering angle varies as a result of the movement of such rack 6 being transmitted to the vehicle wheels 3 via tie rods 7 and knuckle arms 8.

A motor 10 for generating steering assist power which acts on the path for transmitting the rotation of the steering wheel 2 to the vehicle wheels 3 is provided. In the present embodiment, the steering assist power is applied by transmitting the rotation of the output shaft of the motor 10 to the steering shaft 4 via a reduction gear mechanism 11.

The motor 10 is connected to a controller 20 constituted of a computer via a drive circuit 21. A torque sensor 22 for determining the steering torque T required to operate the steering wheel 2, a steering angle sensor 23 for determining the steering angle $\theta_h$ corresponding to the rotation angle of the steering wheel 2, a vehicle speed sensor 24 for determining the vehicle speed V, and a current sensor 26 for determining the drive current i of the motor 10 are connected to the controller 20. Incidentally, the steering shaft of the present embodiment is comprised of two parts, one of which is located at the side of the steering wheel 2 and the other is located at the side of the pinion 5, and the two parts are connected with a torsion bar 29. The torque sensor 22 determines the steering torque T obtained by multiplying the spring constant Ks of the torsion bar 29 to the torsion angle $(\theta_h - \theta_p)$ of the torsion bar 29, which is the difference between the steering angle $\theta_h$ and the rotation angle $\theta_p$ of the pinion 5.

The controller 20 controls the motor 10 such that it generates steering assist power in accordance with the determined steering torque T, varies the steering assist power in accordance with the determined vehicle speed V, and further corrects the steering assist power in accordance with the rotation angular velocity of the steering wheel 2 and the change velocity of the steering torque T.

Figure 2:
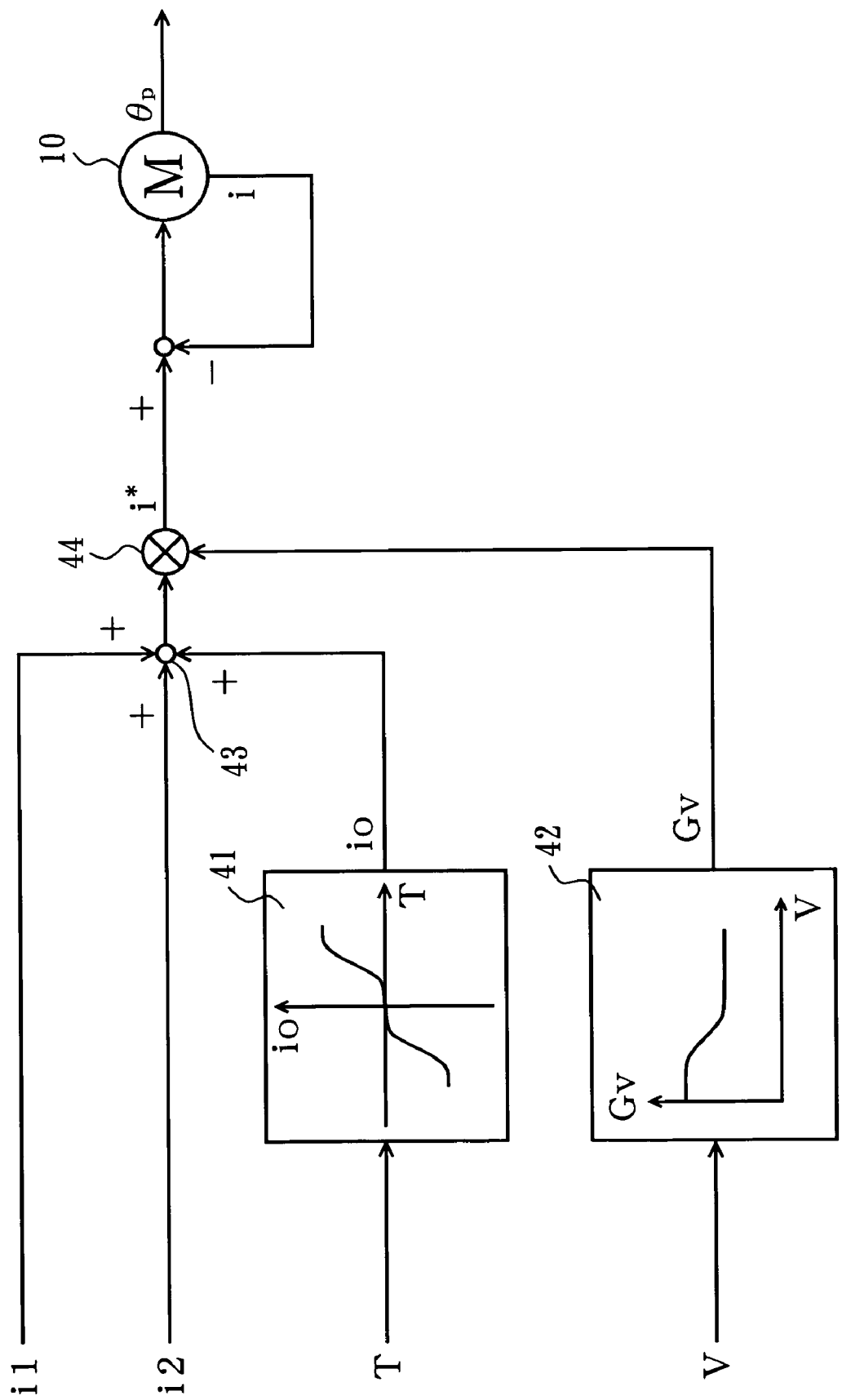
FIG. 2 is a control block diagram of the electric power steering apparatus according to the first to third embodiments of the present invention.
Figure 3:
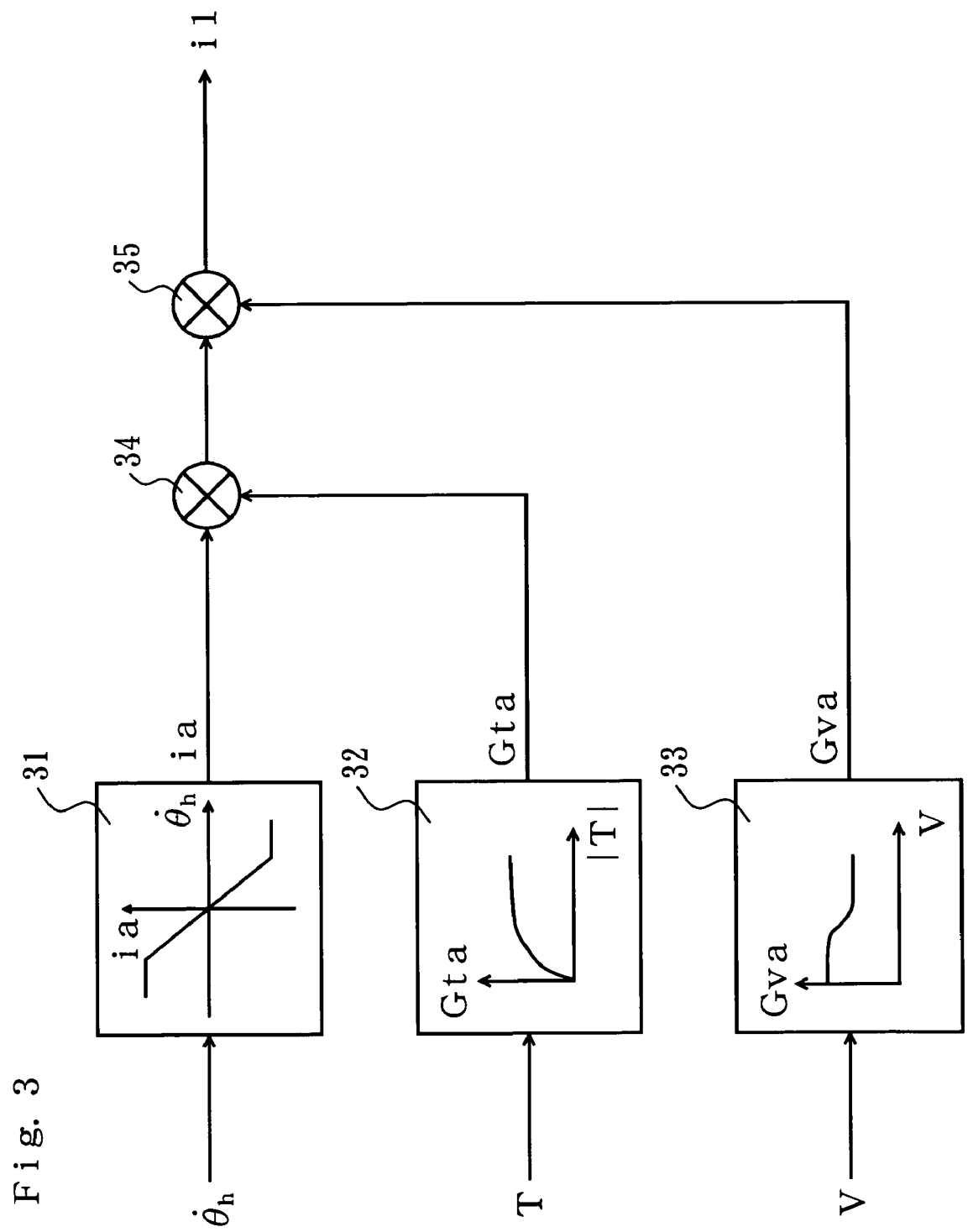
FIG. 3 is a control block diagram for determining the first correction current in the electric power steering apparatus according to the first embodiment of the present invention.
Figure 4:
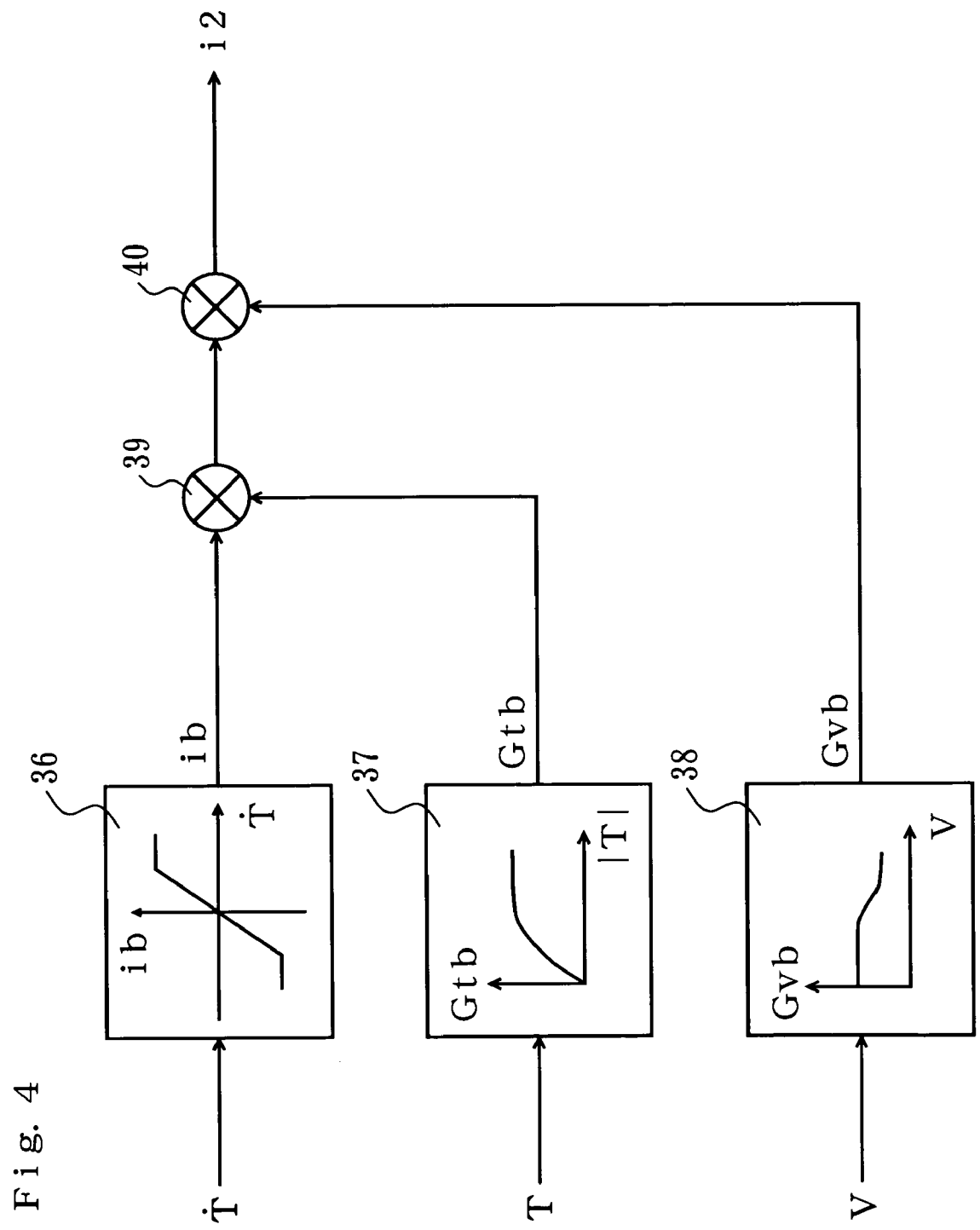
FIG. 4 is a control block diagram for determining the second correction current in the electric power steering apparatus according to the first embodiment of the present invention.

FIG. 2 to FIG. 4 are control block diagrams of the motor 10 with the controller 20. As shown in FIG. 2, the controller 20 determines the target drive current i* of the motor 10 by multiplying the basic vehicle speed gain Gv to the sum of the basic assist current io and the first correction current i1 and the second correction current i2. As a result of feedback-controlling the motor 10 so as to reduce the deviation of the target drive current i* and the determined drive current i, the rotation angle $\theta_p$ of the pinion 5 is varied, and the steering assist power is applied thereby.

As shown in FIG. 3, the rotation angular velocity $d\theta_h/dt$ of the steering wheel 2 is determined as the rotation angular velocity correspondence value by the differentiation of the steering angle $\theta_h$ determined with the steering sensor 23. The relation set between the rotation angular velocity $d\theta_h/dt$ and the first correction reference current ia is stored in the controller 20 as a table or an arithmetic expression for example. The first correction reference current ia corresponding to the determined rotation angular velocity $d\theta_h/dt$ is calculated in a calculation part 31 based on the stored relation. Regarding the relation between the rotation angular velocity $d\theta_h/dt$ and the first correction reference current ia, as shown in the calculation part 31 of FIG. 3 for example, the first correction reference current ia is inversely correlating with the rotation angular velocity $d\theta_h/dt$. The code of positive and negative of the rotation angular velocity $d\theta_h/dt$ and the first correction reference current ia at the time of rightward steering is reversed at the time of leftward steering.

The relation set between the absolute value of the steering torque T and the first torque gain Gta is stored as a table or an arithmetic expression for example, and the first torque gain Gta corresponding to the determined steering torque T is calculated in a calculation part 32. Regarding the relation between the absolute value of the steering torque T and the first torque gain Gta, as shown in the calculation part 32 of FIG. 3 for example, the first torque gain Gta increases pursuant to the increase in the absolute value of the steering torque T.

Further, the relation set between the vehicle speed V and the first vehicle speed gain Gva is stored as a table or an arithmetic expression for example, and the first vehicle speed gain Gva corresponding to the determined vehicle speed V is calculated in a calculation part 33. Regarding the relation between the vehicle speed V and the first vehicle speed gain Gva, as shown in the calculation part 33 of FIG. 3 for example, the first vehicle speed gain Gva increases when the vehicle speed V is small in comparison to when it is large.

The first correction current i1 is determined by multiplying the first torque gain Gta and the first vehicle speed gain Gva to the first correction reference current ia in the multiplication parts 34, 35. As a result, the relation set as shown in the calculation parts 31, 32, 33 of FIG. 3 is stored in the controller 20 as the first relation between the rotation angular velocity $d\theta_h/dt$ and the first correction current i1, and the first correction current i1 as the first motor output correction value inversely correlating with the rotation angular velocity $d\theta_h/dt$ is determined with the controller 20 from the first relation.

As shown in FIG. 4, the change velocity dT/dt of the steering torque T is determined as the change velocity correspondence value by the differentiation of the steering torque T determined with the torque sensor 22. The relation set between the change velocity dT/dt and the second correction reference current ib is stored as a table or an arithmetic expression for example. The second correction reference current ib corresponding to the determined change velocity dT/dt is calculated in a calculation part 36 based on the stored relation. Regarding the relation between the change velocity dT/dt and the second correction reference current ib, as shown in the calculation part 36 of FIG. 4 for example, the second correction reference current ib is directly correlating with the change velocity dT/dt. The code of positive and negative of the change velocity dT/dt and the second correction reference current ib at the time of rightward steering is reversed at the time of leftward steering.

The relation set between the absolute value of the steering torque T and the second torque gain Gtb is stored as a table or an arithmetic expression for example, and the second torque gain Gtb corresponding to the determined steering torque T is calculated in a calculation part 37. Regarding the relation between the absolute value of the steering torque T and the second torque gain Gtb, as shown in the calculation part 37 of FIG. 4 for example, the second torque gain Gtb increases pursuant to the increase in the absolute value of the steering torque T.

Further, the relation set between the vehicle speed V and the second vehicle speed gain Gvb is stored as a table or an arithmetic expression for example, and the second vehicle speed gain Gvb corresponding to the determined vehicle speed V is calculated in a calculation part 38. Regarding the relation between the vehicle speed V and the second vehicle speed gain Gvb, as shown in the calculation part 38 of FIG. 4 for example, the second vehicle speed gain Gvb increases when the vehicle speed V is small in comparison to when it is large.

The second correction current i2 is determined by multiplying the second torque gain Gtb and the second vehicle speed gain Gvb to the second correction reference current ib in the multiplication parts 39, 40. As a result, the relation set as shown in the calculation parts 36, 37, 38 of FIG. 4 is stored in the controller 20 as the second relation between the change velocity dT/dt and the second correction current i2, and the second correction current i2 as the second motor output correction value directly correlating with the change velocity dT/dt is determined with the controller 20 from the second relation.

As shown in FIG. 2, the relation between the steering torque T and the basic assist current io is stored as a table or an arithmetic expression for example, and the basic assist current io corresponding to the determined steering torque T is calculated in the operating part 41. Regarding the relation between the steering torque T and the basic assist current io, as shown in the calculation part 41 of FIG. 2 for example, the absolute value of the basic assist current io increases pursuant to the increase in the absolute value of the steering torque T. The code of positive and negative of the steering torque T and the basic assist current io at the time of rightward steering is reversed at the time of leftward steering.

The relation between the vehicle speed V and the basic vehicle speed gain Gv is stored as a table or an arithmetic expression for example, and the basic vehicle speed gain Gv corresponding to the determined vehicle speed V is calculated in a calculation part 42. Regarding the relation between the vehicle speed V and the basic vehicle speed gain Gv, as shown in the calculation part 42 of FIG. 2 for example, the basic vehicle speed gain Gv increases when the vehicle speed V is small in comparison to when it is large.

The sum of the first correction current i1 and the second correction current i2 and the basic assist current io is calculated in an addition part 43, and the target drive current i* is determined by multiplying the basic vehicle speed gain Gv to such sum in a multiplication part 44. As a result, the output of the motor 10 corresponding to the basic assist current io according to the steering torque is corrected in accordance with the sum of the first correction current i1 and the second correction current i2.

Figure 5:
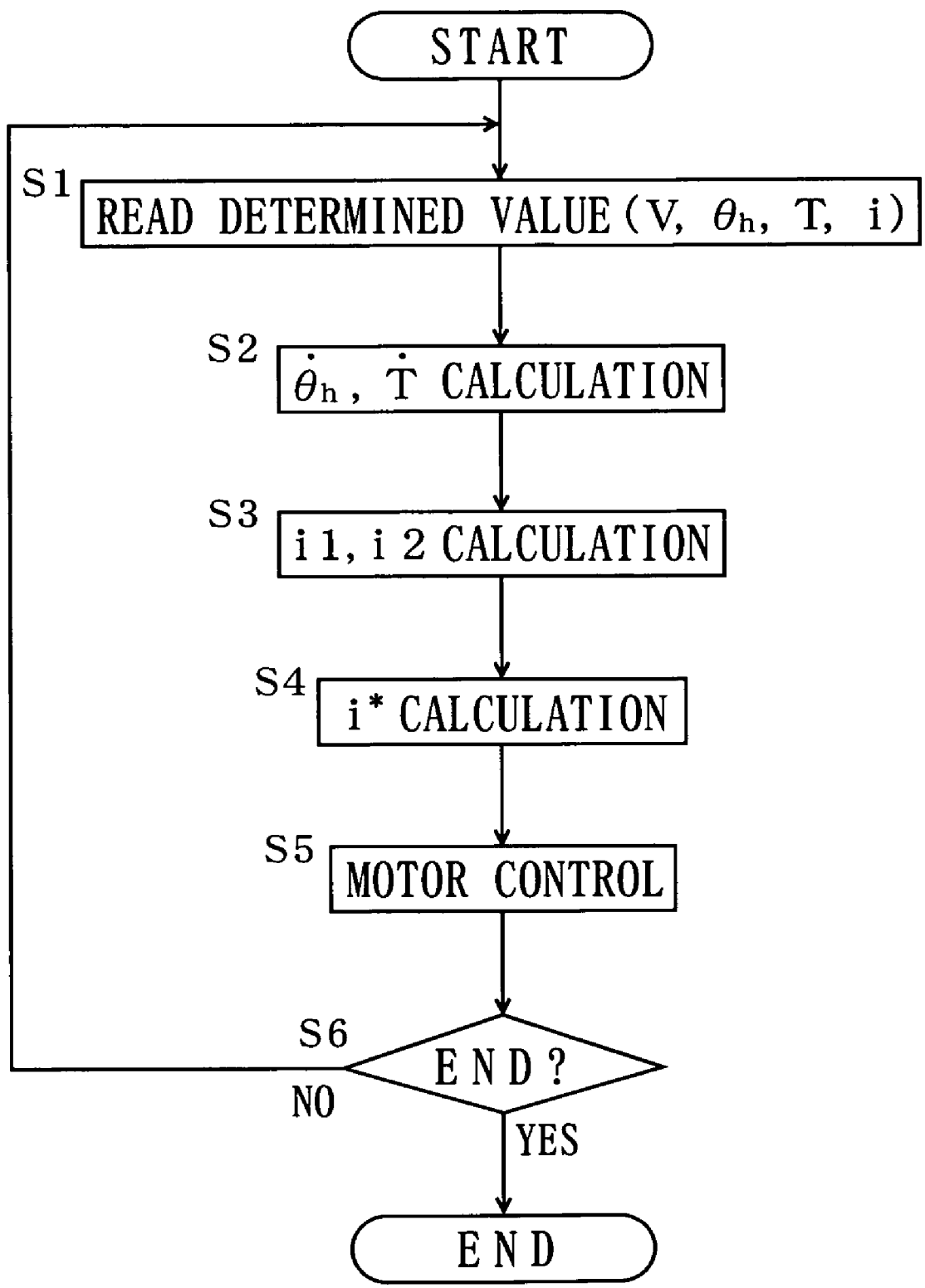
FIG. 5 is a flowchart showing the control procedure in the electric power steering apparatus according to the first embodiment of the present invention.

The flowchart of FIG. 5 shows the control procedure of the motor 10 with the controller 20. Firstly, the values V, $\theta_h$, T, i determined with the sensors are read (step S1), the rotation angular velocity $d\theta_h/dt$ is subsequently determined by time-differentiating the steering angle $\theta_h$ determined in a time series, and the change velocity dT/dt is further determined by time-differentiating the steering torque T determined in a time series (step S2). Incidentally, in the initial stage of commencing control, the initial values preset as the rotation angular velocity $d\theta_h/dt$ and change velocity dT/dt can be used. Next, the first correction current i1= Gta·Gva·ia according to the rotation angular velocity $d\theta_h/dt$ and the second correction current i2=Gtb·Gvb·ib according to the change velocity dT/dt are determined (step S3), the target drive current i*=Gv(io+i1+i2) is determined (step S4), and the motor is feedback-controlled so as to reduce the deviation of the target drive current i* and the detected drive current i (step S5). Thereafter, whether the control is to be ended or not is determined based on whether the ignition switch is ON or OFF (step S6), for example, and the routine returns to step S1 when the control is not to be ended.

Figure 6:
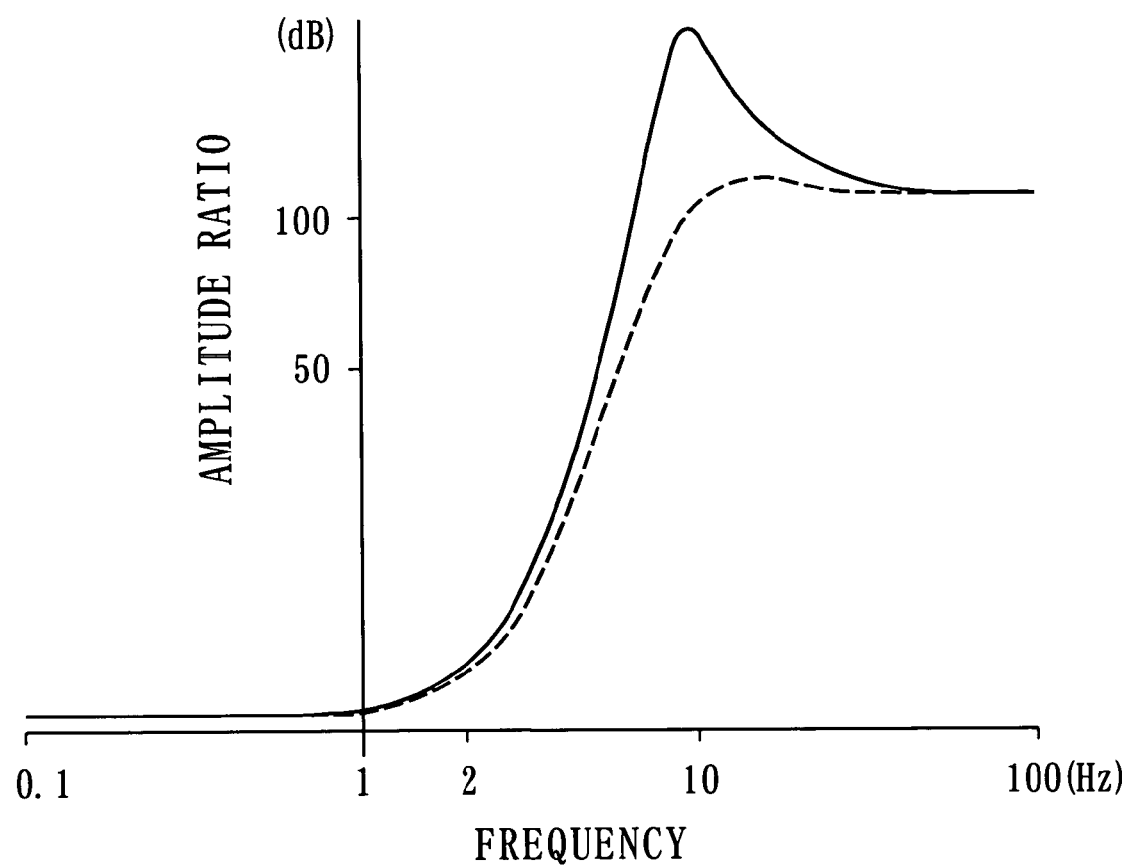
FIG. 6 is a board diagram representing the frequency response characteristic showing the steering characteristic in the electric power steering apparatus according to the first to third embodiments of the present invention.
Figure 7:
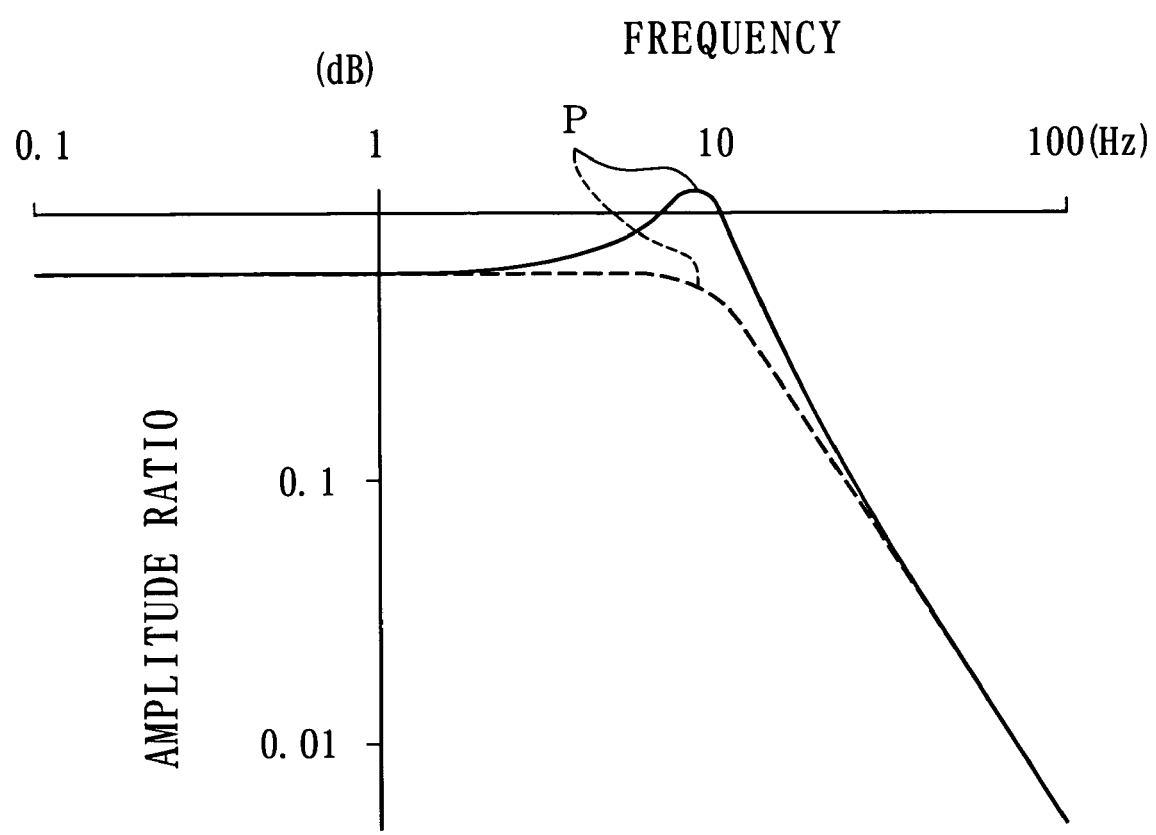
FIG. 7 is a board diagram representing the frequency response characteristic showing the influence of disturbance in the electric power steering apparatus according to the first to third embodiments of the present invention.

According to the first embodiment described above, the board diagrams representing the frequency response characteristic shown by FIG. 6 and FIG. 7 can be obtained. In FIG. 6, the horizontal axis represents the steering frequency (Hz) corresponding to the number of reciprocating operations per unit time of the steering wheel 2, and the vertical axis represents the amplitude ratio (dB) of the steering torque T relative to the steering angle $\theta_h$ of the steering wheel 2. In FIG. 7, the horizontal axis represents the input frequency (Hz) of the disturbance torque input from the road surface to the steering system via vehicle wheels 3, and the vertical axis represents the amplitude ratio (dB) of the steering torque T relative to the disturbance torque. As a result of correcting the output of the motor 10, in the frequency response characteristic shown in FIG. 6 represented by the steering frequency and the amplitude ratio of steering torque T relative to the steering angle $\theta_h$, the first relation is set such that the amplitude ratio does not increase at least within the steering frequency range (e.g., within a range of 2Hz or less) when a person operates a steering wheel. Further, as a result of correcting the output of the motor 10 in accordance with the second correction current i2, in the frequency response characteristic represented by the frequency of the disturbance torque and the amplitude ratio of the steering torque T relative to the disturbance torque shown in FIG. 7, the second relation is set such that the amplitude ratio becomes smaller at the resonance frequency.

For example, it is assumed that the input torque Ti to the steering system via the motor 10 is determined with the following formula which adds the basic assist torque To proportional to the steering torque, the first correction torque inversely proportional to the rotation angular velocity of the steering wheel 2, and the second correction torque Tb proportional to the change velocity of the steering torque.

$Ti=To+Ta+Tb$ $To=Ka \cdot Ks(\theta_h-\theta_p)$ $Ta=Kdi \cdot d\theta_h/dt$ $Tb=Kd \cdot d\{Ks(\theta_h-\theta_p)\}/dt$ Ka is a basic assist control gain, Kdi is a control gain of the steering angular velocity (steering angle differentiation), and Kd is a torque differentiation control gain.

In the frequency response characteristic shown in FIG. 6, the frequency $\omega_1$ and damping ratio $\zeta_1$ 1 are determined with the following formulas.

$$\omega_1=(K/Jp)^{1/2} \quad (1)$$

$$\zeta_1=(Cp+Kdi)/\{2 \cdot (Jp \cdot \alpha1/\alpha2)^{1/2}\} \quad (2)$$

In the frequency response characteristic shown in FIG. 7, the frequency $\omega_2$ and damping ratio $\zeta_2$ are determined with the following formulas.

$$\omega_2=[\{Ks \cdot (1+Ka)+K\}/Jp]^{1/2} \quad (3)$$

$$\zeta_2=(Cp+Kd)/\{2 \cdot (Jp \cdot Ks/\alpha1)^{1/2}\} \quad (4)$$

α1 is a parameter of the weight of steering when the frequency is zero, and α2 is a transmission ratio of disturbance when the frequency is zero, and are represented by the following formulas.

$$\alpha 1 = Ks \cdot K / \{Ks \cdot (1+Ka)+K\}$$

$$\alpha 2 = 1/\{(1+Ka)+K/Ks\}$$

K is an elastic coefficient of the steering system, Jp is an inertia of the pinion axis conversion in the steering system, and Cp is a pinion axis conversion viscosity coefficient in the steering system lower than the torsion bar 29.

In FIG. 6, the state prior to correcting the output of the motor 10 is shown with a solid line, and the state after correction is shown with a dotted line. Since the first correction current i1 is inversely correlating with the rotation angular velocity $d\theta_h/dt$ of the steering wheel 2 and the gain of such rotation angular velocity $d\theta_h/dt$ is Kdi, the damping ratio $\zeta_1$ increases pursuant to the above-mentioned formula (2) when the motor output is corrected. Nevertheless, the gain Kdi does not influence the damping ratio $\zeta_2$ based on the formula (4). Thus, by setting the gain Kdi to a value that is not so large, as shown with the dotted line after correction relative to the solid line before correction in FIG. 6, the amplitude ratio can be set to an arbitrary setting range pursuant to such correction within the steering frequency range when a person operates the steering wheel 2 (e.g., within a range of frequency 2 Hz or less). As a result, since the amplitude ratio does not become too large or too small, the feel of steering does not become inferior. Incidentally, the first correction current i1 may be directly correlating with the rotation angular velocity $d\theta_h/dt$ of the steering wheel 2, and it suffices so as long as the gain Kdi is set such that the amplitude ratio does not deteriorate the feel of steering within the steering frequency range when a person operates the steering wheel 2.

In FIG. 7, the state prior to correcting the output of the motor 10 is shown with a solid line, and the state after correction is shown with a dotted line. Since the second correction current i2 is directly correlating with the change velocity dT/dt of the steering torque T and the gain of such change velocity dT/dt is Kd, the damping ratio $\zeta_2$ increases pursuant to the above-mentioned formula (4) when the motor output is corrected. In other words, the dotted line after correction shifts relative to the solid line before correction in FIG. 7 toward a direction in which the peak value of the amplitude ratio becomes smaller at the resonance frequency (in FIG. 7, the peak point P of the amplitude ratio becomes smaller due to the correction). Thus, the influence of disturbance to the steering can be suppressed.

Figure 8:
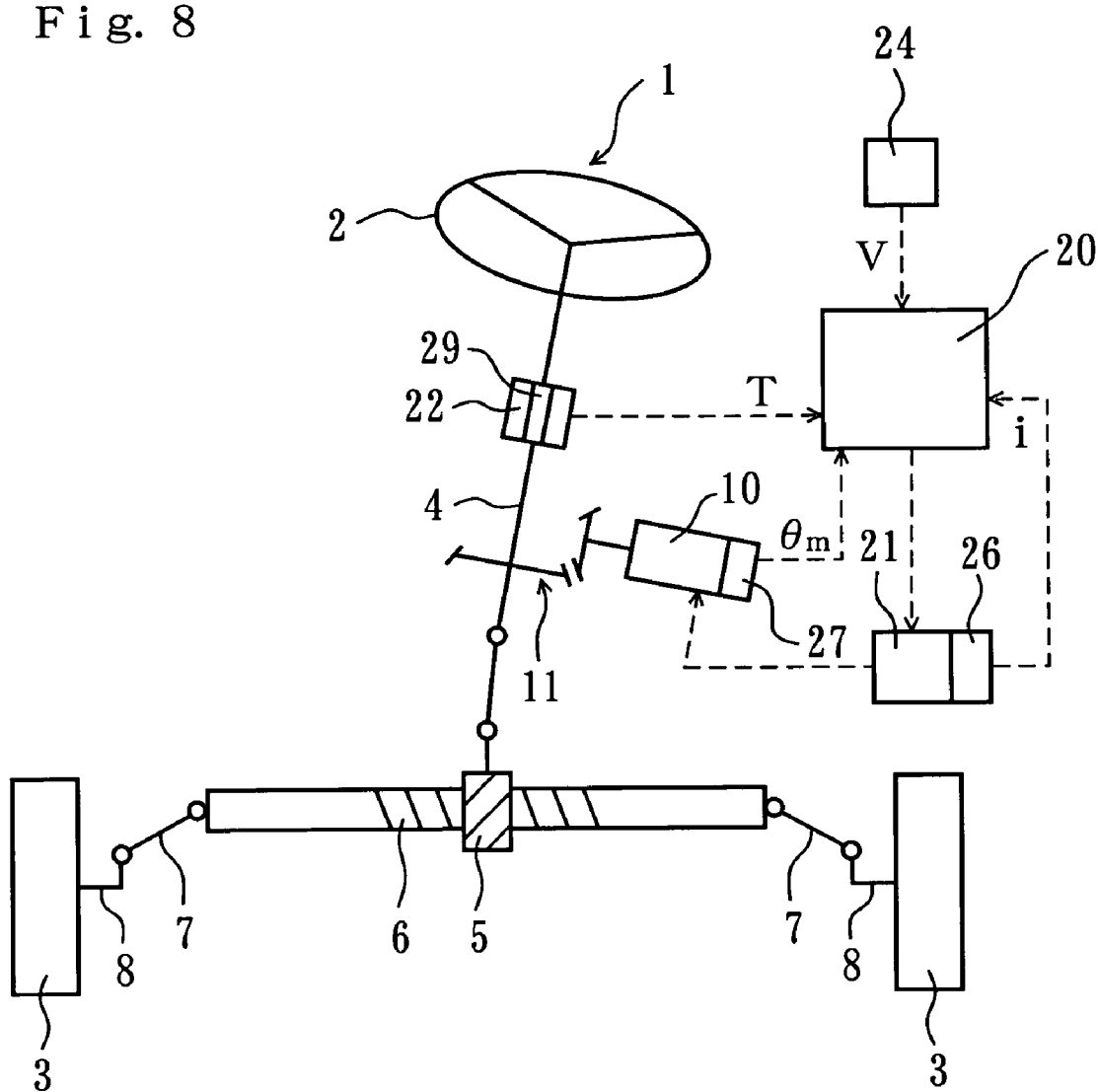
FIG. 8 is a constitutional explanatory diagram of the electric power steering apparatus according to the second embodiment of the present invention.
Figure 9:
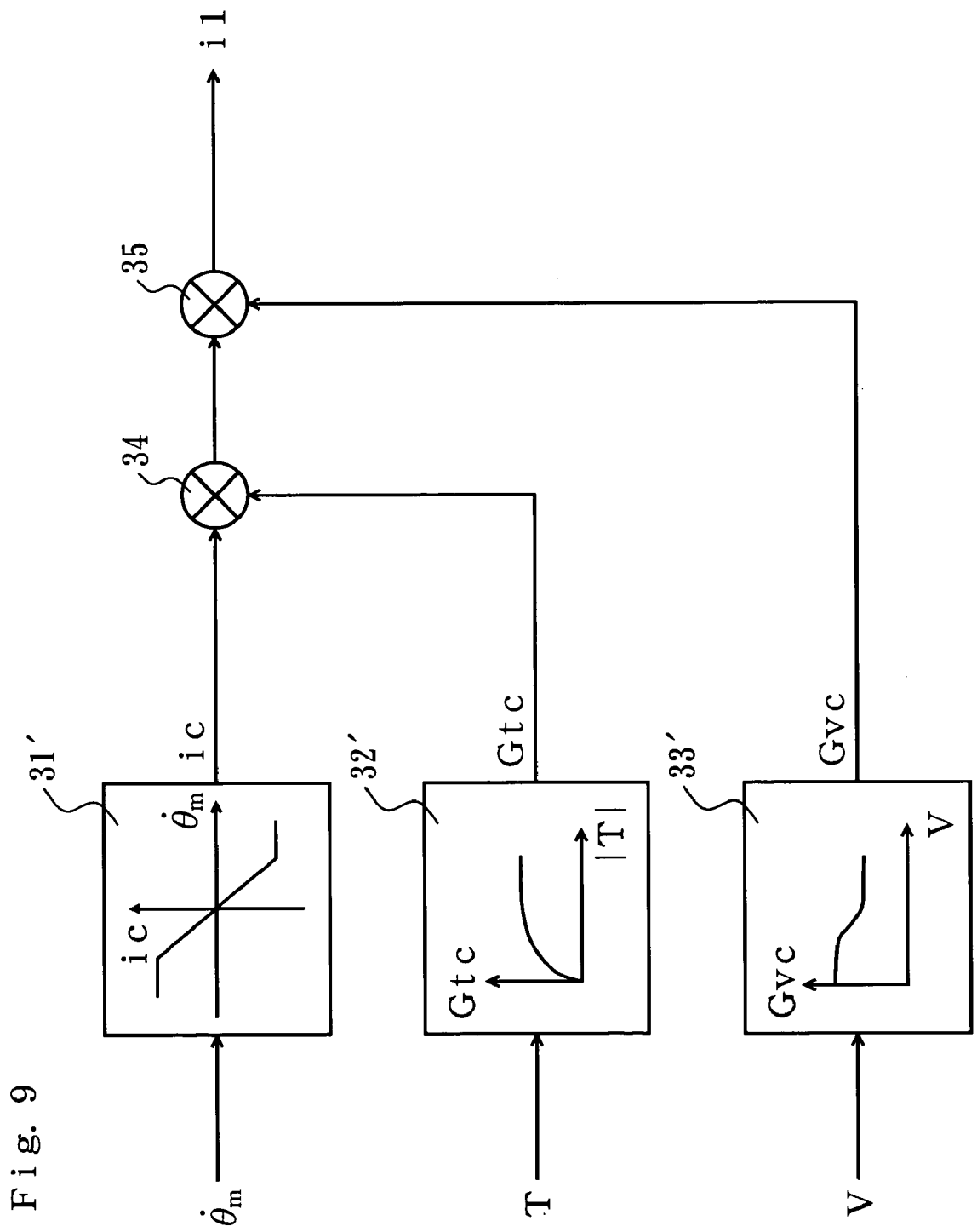
FIG. 9 is a control block diagram for determining the first correction current in the electric power steering apparatus according to the second embodiment of the present invention.
Figure 10:
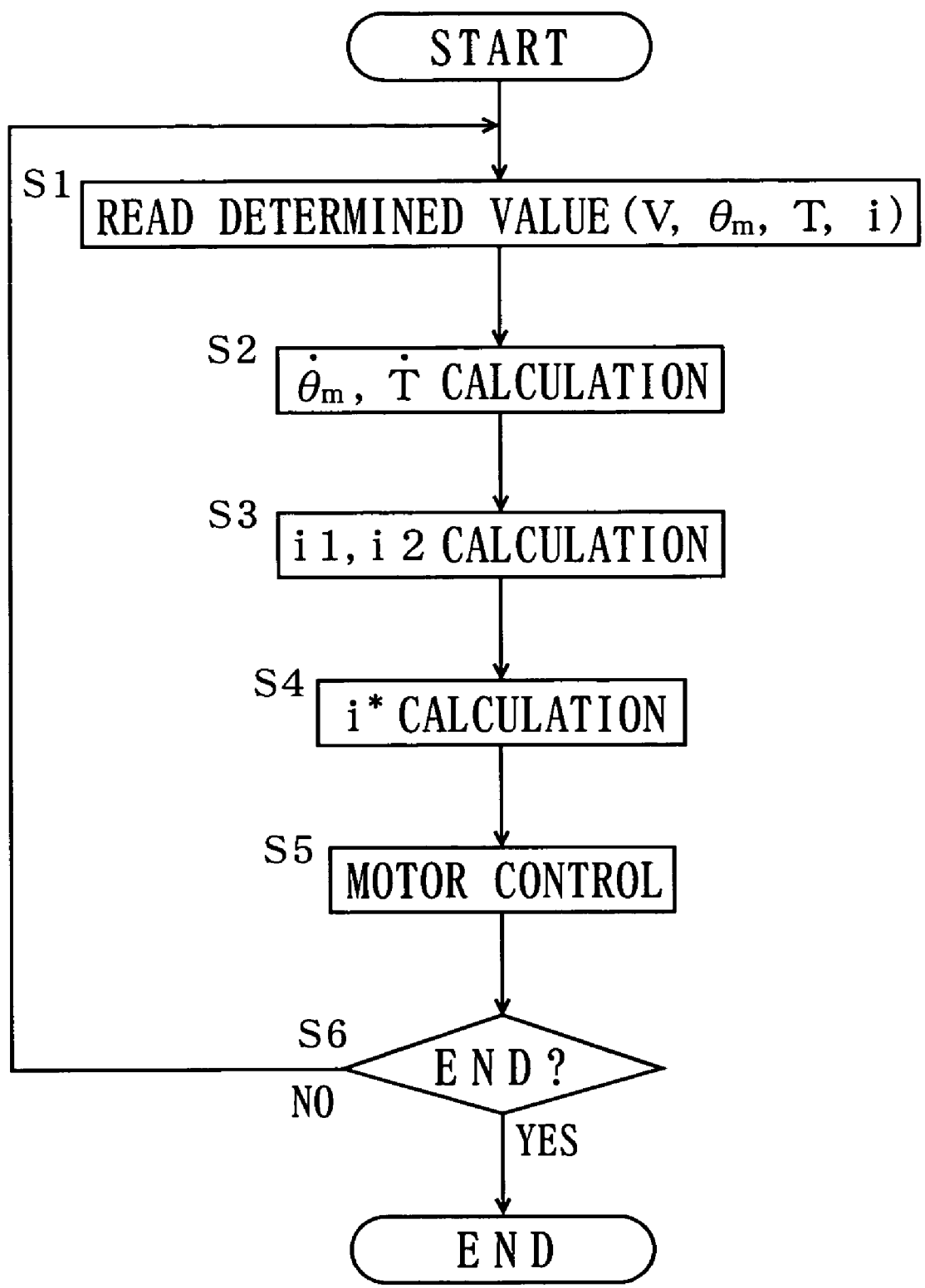
FIG. 10 is a flowchart showing the control procedure in the electric power steering apparatus according to the second embodiment of the present invention.

FIG. 8 to FIG. 10 illustrate the second embodiment, and the difference with the first embodiment is explained below, while the same reference numerals are given to the same components as the first embodiment and the explanation thereof is omitted. The difference with the first embodiment, foremost, is that the controller 20 corrects the steering assist power according to the rotation angular velocity of the motor 10 instead of the rotation angular velocity of the steering wheel 2, and the change velocity of the steering torque T. Thus, in place of the steering angle sensor 23 for determining the steering angle $\theta_h$ corresponding to the rotation angle of the steering wheel 2, an angle sensor 27 for detecting the rotation angle $\theta_m$ of the motor 10 is connected to the controller 20.

As shown in FIG. 9, the rotation angular velocity $d\theta_m/dt$ is determined as the rotation angular velocity correspondence value based on the differentiation of the rotation angle $\theta_m$ determined with the angle sensor 27. The relation set between the rotation angular velocity $d\theta_m/dt$ and the first correction reference current ic is stored in the controller 20 as a table or an arithmetic expression for example. The first correction reference current ic corresponding to the determined rotation angular velocity $d\theta_m/dt$ is calculated in a calculation part 31' based on the stored relation. Regarding the relation between the rotation angular velocity $d\theta_m/dt$ and the first correction reference current ic, as shown in the calculation part 31' of FIG. 9 for example, the first correction reference current ic is inversely correlating with the rotation angular velocity $d\theta_m/dt$. The code of positive and negative of the rotation angular velocity $d\theta_m/dt$ and the first correction reference current ic at the time of rightward steering is reversed at the time of leftward steering.

The relation set between the absolute value of the steering torque T and the first torque gain Gtc is stored as a table or an arithmetic expression for example, and the first torque gain Gtc corresponding to the determined steering torque T is calculated in a calculation part 32'. Regarding the relation between the absolute value of the steering torque T and the first torque gain Gtc, as shown in the calculation part 32' of FIG. 9 for example, the first torque gain Gtc increases pursuant to the increase in the absolute value of the steering torque T.

Further, the relation set between the vehicle speed V and the first vehicle speed gain Gvc is stored as a table or an arithmetic expression for example, and the first vehicle speed gain Gvc corresponding to the determined vehicle speed V is calculated in a calculation part 33'. Regarding the relation between the vehicle speed V and the first vehicle speed gain Gvc, as shown in the calculation part 33' of FIG. 9 for example, the first vehicle speed gain Gvc increases when the vehicle speed V is small in comparison to when it is large.

The first correction current i1 is determined by multiplying the first torque gain Gtc and the first vehicle speed gain Gvc to the first correction reference current ic in the multiplication parts 34, 35. As a result, the relation set as shown in the calculation parts 31', 32', 33' of FIG. 9 is stored in the controller 20 as the first relation between the rotation angular velocity $d\theta_m/dt$ and the first correction current i1, and the first correction current i1 as the first motor output correction value inversely correlating with the rotation angular velocity $d\theta_m/dt$ is determined with the controller 20 from the first relation.

The second correction current i2 directly correlating with the change velocity dT/dt is determined as with the first embodiment.

The flowchart of FIG. 10 shows the control procedure of the motor 10 with the controller 20. Firstly, the values V, $\theta_m$, T, i determined with the sensors are read (step S1), the rotation angular velocity $d\theta_m/dt$ is subsequently determined by time-differentiating the rotating angle $\theta_m$ determined in a time series, and the change velocity dT/dt is further determined by time-differentiating the steering torque T determined in a time series (step S2). Incidentally, in the initial stage of commencing control, the initial values preset as the rotation angular velocity $d\theta_m/dt$ and change velocity dT/dt can be used. Next, the first correction current i1=Gtc·Gvc·ic according to the rotation angular velocity $d\theta_m/dt$ and the second correction current i2=Gtb·Gvb·ib according to the change velocity dT/dt are determined (step S3), the target drive current i*=Gv·(io+i1+i2) is determined (step S4), and the motor is feedback-controlled so as to reduce the deviation of the target drive current i* and the detected drive current i (step S5). Thereafter, whether the control is to be ended or not is determined based on whether the ignition switch is ON or OFF (step S6), for example, and the routine returns to step S1 when the control is not to be ended.

According to the second embodiment described above, board diagrams similar to the board diagrams representing the frequency response characteristic shown in FIG. 6 and FIG. 7 in the first embodiment can be obtained.

For example, the input torque Ti is determined with the following formula.

$$Ti=To+Ta+Tb$$

$$To=Ka \cdot Ks(\theta_h - \theta_p)$$

$$Ta=-Kdo \cdot d\theta_m/dt$$

$$Tb=Kd \cdot d\{Ks(\theta_h - \theta_p)\}/dt$$

Kdo is a control gain of the motor rotation angular velocity (motor rotation angle differentiation).

In the frequency response characteristic represented by the steering frequency and the amplitude ratio of the steering torque T relative to the steering angle $\theta_h$, the frequency $\omega_1$ and damping ratio $\zeta_1$ are determined with the following formulas.

$$\omega_1=(K/Jp)^{1/2} \quad (5)$$

$$\zeta_1=(Cp+Kdo)/\{2 \cdot (Jp \cdot \alpha 1/\alpha 2)^{1/2}\} \quad (6)$$

In the frequency response characteristic represented by the input frequency (Hz) of the disturbance torque and the amplitude ratio of the steering torque T relative to the disturbance torque, the frequency $\omega_2$ and damping ratio $\zeta_2$ are determined with the following formulas.

$$\omega_2=[\{Ks \cdot (1+Ka)+K\}/Jp]^{1/2} \quad (7)$$

$$\zeta_2=(Cp+Kdo+Kd)/\{2 \cdot (Jp \cdot Ks/\alpha 1)^{1/2}\} \quad (8)$$

Since the first correction current i1 is inversely correlating with the rotation angular velocity $d\theta_m/dt$ of the motor 10 and the gain of such rotation angular velocity $d\theta_m/dt$ is Kdo, the damping ratio $\zeta_1$ increases pursuant to the above-mentioned formula (6) when the motor output is corrected. Nevertheless, by setting the gain Kdo to a value that is not so large, as shown with the dotted line after correction relative to the solid line before correction in FIG. 6, the amplitude ratio can be set to an arbitrary setting range within the steering frequency range when a person operates the steering wheel 2 (e.g., within a range of frequency 2 Hz or less). As a result, since the amplitude ratio does not become too large or too small, the feel of steering does not become inferior. Incidentally, the first correction current i1 may be directly correlating with the rotation angular velocity $d\theta_m/dt$ of the motor 10, and it suffices so as long as the gain Kdo is set such that the amplitude ratio does not deteriorate the feel of steering within the steering frequency range when a person operates the steering wheel 2.

Since the second correction current i2 is directly correlating with the change velocity dT/dt of the steering torque T and the gain of such change velocity dT/dt is Kd, the damping ratio $\zeta_2$ increases pursuant to the above-mentioned formula (8) when the motor output is corrected. In other words, the dotted line after correction shifts relative to the solid line before correction in FIG. 7 toward a direction in which the peak value of the amplitude ratio becomes smaller at the resonance frequency (in FIG. 7, the peak point P of the amplitude ratio becomes smaller due to the correction). Thus, the influence of disturbance to the steering can be suppressed. Incidentally, although foregoing formula (8) contains the gain Kdo, as a result of increasing the gain Kd, the peak value of the amplitude ratio can be made smaller at the resonance frequency without having to increase the gain Kdo significantly. The first relation between the rotation angular velocity $d\theta_m/dt$ of the motor 10 and the first correction current i1, and the second relation between the change velocity dT/dt and the second correction current i2 are set such that the peak value of the amplitude ratio becomes smaller at the resonance frequency. Here, since foregoing formula (6) does not contain the gain Kd, there is no influence on the damping ratio $\zeta_1$ even when such first and second relations are set.

Figure 11:
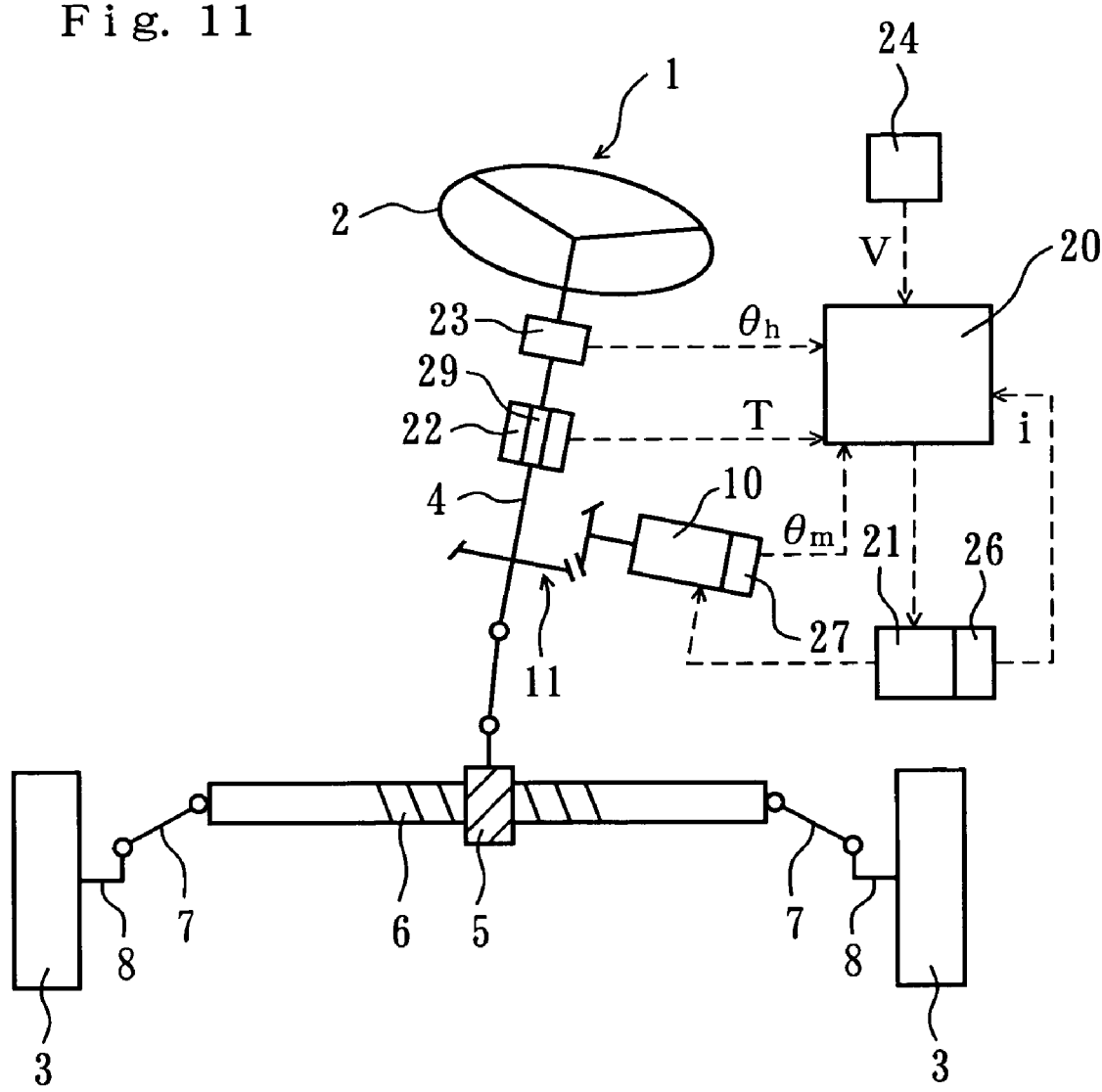
FIG. 11 is a constitutional explanatory diagram of the electric power steering apparatus according to the third embodiment of the present invention.
Figure 12:
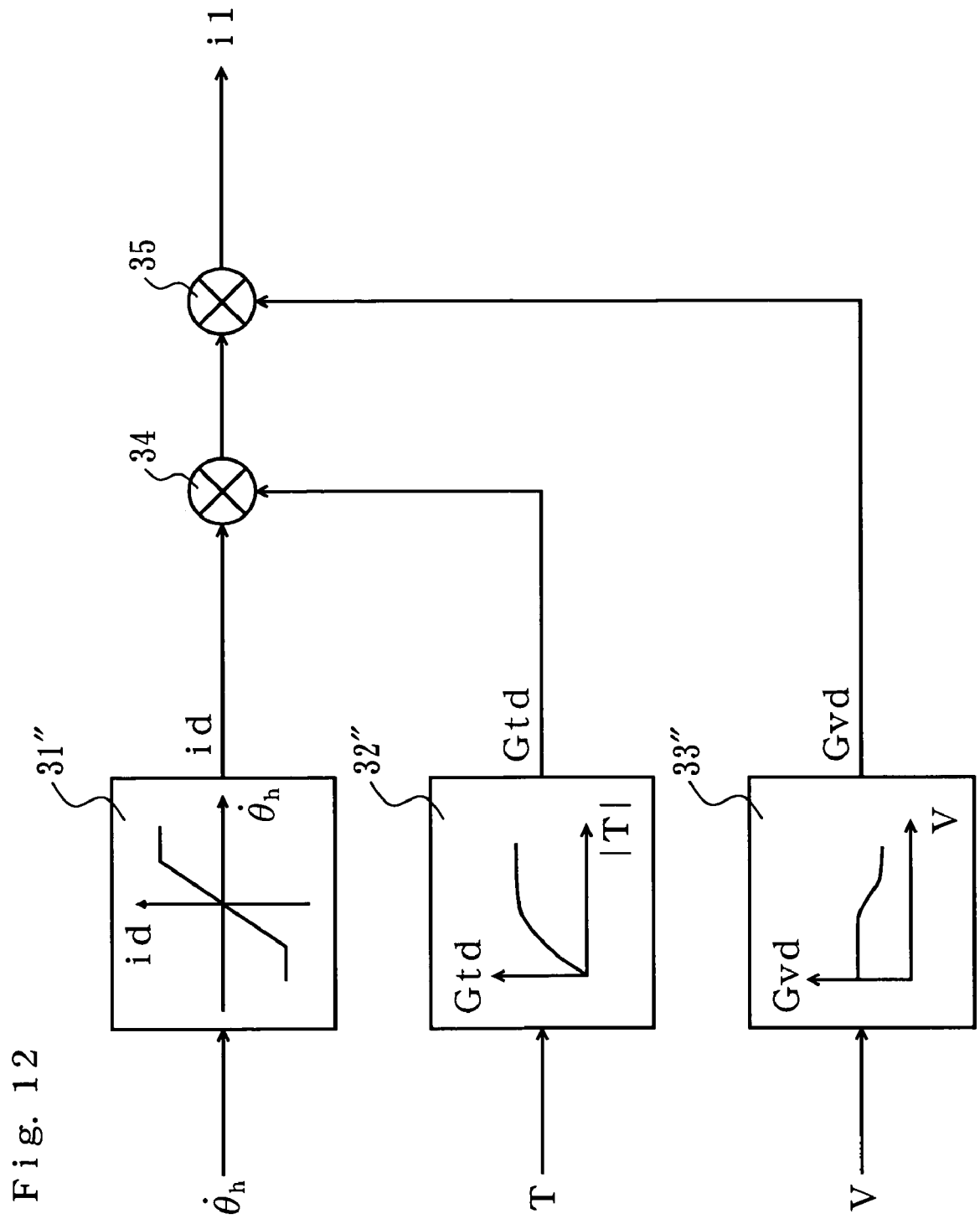
FIG. 12 is a control block diagram for determining the first correction current in the electric power steering apparatus according to the third, embodiment of the present invention.
Figure 13:
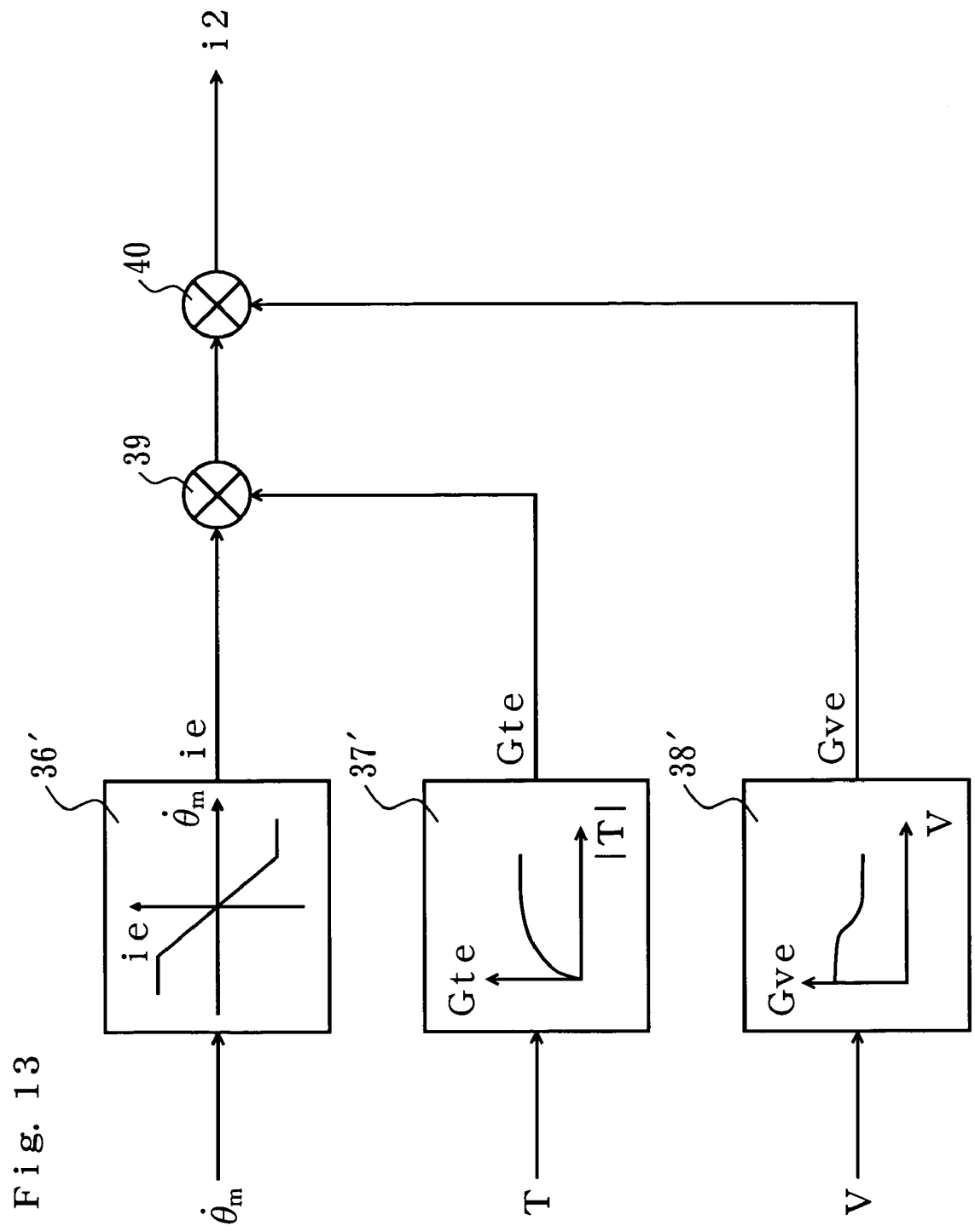
FIG. 13 is a control block diagram for determining the second correction current in the electric power steering apparatus according to the third embodiment of the present invention.

FIG. 11 to FIG. 13 illustrate the third embodiment, and the difference with the first embodiment is explained below, while the same reference numerals are given to the same components as the first embodiment and the explanation thereof is omitted. The difference with the first embodiment, foremost, is that the controller 20 corrects the steering assist power according to the rotation angular velocity of the steering wheel 2 and the rotation angular velocity of the motor 10 instead of the change velocity of the steering torque T. Thus, an angle sensor 27 for detecting the rotation angle $\theta_m$ of the motor 10 is connected to the controller 20. The rotation angular velocity correspondence value in the first embodiment; that is, the rotation angular velocity $d\theta_h/dt$ of the steering wheel 2 determined with the differentiation of the steering angle $\theta_h$ determined with the steering angle sensor 23 becomes the first rotation angular velocity correspondence value in the third embodiment. The rotation angular velocity $d\theta_m/dt$ of the motor 10 is determined as the second rotation angular velocity correspondence value by the differentiation of the rotation angle $\theta_m$ determined with the angle sensor 27.

As shown in FIG. 12, the rotation angular velocity $d\theta_h/dt$ of the steering wheel 2 is determined as the first rotation angular velocity correspondence value by the differentiation of the steering angle $\theta_h$ determined with the steering angle sensor 23. The relation set between the rotation angular velocity $d\theta_h/dt$ and the first correction reference current id is stored in the controller 20 as a table or an arithmetic expression for example. The first correction reference current id corresponding to the determined rotation angular velocity $d\theta_h/dt$ is calculated in a calculation part 31" based on the stored relation. Regarding the relation between the rotation angular velocity $d\theta_h/dt$ and the first correction reference current id, as shown in the calculation part 31" of FIG. 12 for example, the first correction reference current id is directly correlating with the rotation angular velocity $d\theta_h/dt$. The code of positive and negative of the rotation angular velocity $d\theta_h/dt$ and the first correction reference current id at the time of rightward steering is reversed at the time of leftward steering.

The relation set between the absolute value of the steering torque T and the first torque gain Gtd is stored as a table or an arithmetic expression for example, and the first torque gain Gtd corresponding to the determined steering torque T is calculated in a calculation part 32". Regarding the relation between the absolute value of the steering torque T and the first torque gain Gtd, as shown in the calculation part 32" of FIG. 12 for example, the first torque gain Gtd increases pursuant to the increase in the absolute value of the steering torque T.

Further, the relation set between the vehicle speed V and the first vehicle speed gain Gvd is stored as a table or an arithmetic expression for example, and the first vehicle speed gain Gvd corresponding to the determined vehicle speed V is calculated in a calculation part 33". Regarding the relation between the vehicle speed V and the first vehicle speed gain Gvd, as shown in the calculation part 33″ of FIG. 12 for example, the first vehicle speed gain Gvd increases when the vehicle speed V is small in comparison to when it is large.

The first correction current i1 is determined by multiplying the first torque gain Gtd and the first vehicle speed gain Gvd to the first correction reference current id in the multiplication parts 34, 35. As a result, the relation set as shown in the calculation parts 31″, 32″, 33″ of FIG. 12 is stored in the controller 20 as the first relation between the rotation angular velocity $d\theta_h/dt$ and the first correction current i1, and the first correction current i1 as the first motor output correction value directly correlating with the rotation angular velocity $d\theta_h/dt$ is determined with the controller 20 from the first relation.

As shown in FIG. 13, the relation set between the rotation angular velocity $d\theta_m/dt$ of the motor 10 and the second correction reference current ie is stored in the controller 20 as a table or an arithmetic expression for example. The second correction reference current ie corresponding to the determined rotation angular velocity $d\theta_m/dt$ is calculated in a calculation part 36′ based on the stored relation. Regarding the relation between the rotation angular velocity $d\theta_m/dt$ of the motor 10 and the second correction reference current ie, as shown in the calculation part 36′ of FIG. 13 for example, the second correction reference current ie is inversely correlating with the rotation angular velocity $d\theta_m/dt$. The code of positive and negative of the rotation angular velocity $d\theta_m/dt$ and the second correction reference current ie at the time of rightward steering is reversed at the time of leftward steering.

The relation set between the steering torque T and the second torque gain Gte is stored as a table or an arithmetic expression for example, and the second torque gain Gte corresponding to the determined steering torque T is calculated in a calculation part 37′. Regarding the relation between the absolute value of the steering torque T and the second torque gain Gte, as shown in the calculation part 37′ of FIG. 13 for example, the second torque gain Gte increases pursuant to the increase in the absolute value of the steering torque T.

Further, the relation set between the vehicle speed V and the second vehicle speed gain Gve is stored as a table or an arithmetic expression for example, and the second vehicle speed gain Gve corresponding to the determined vehicle speed V is calculated in a calculation part 38′. Regarding the relation between the vehicle speed V and the second vehicle speed gain Gve, as shown in the calculation part 38′ of FIG. 13 for example, the second vehicle speed gain Gve increases when the vehicle speed V is small in comparison to when it is large.

The second correction current i2 is determined by multiplying the second torque gain Gte and the second vehicle speed gain Gve to the second correction reference current ie in the multiplication parts 39, 40. As a result, the relation set as shown in the calculation parts 36′, 37′, 38′ of FIG. 13 is stored in the controller 20 as the second relation between the rotation angular velocity $d\theta_m/dt$ of the motor 10 and the second correction current i2, and the second correction current i2 as the second motor output correction value inversely correlating with the rotation angular velocity $d\theta_m/dt$ of the motor 10 is determined with the controller 20 from the second relation.

Figure 14:
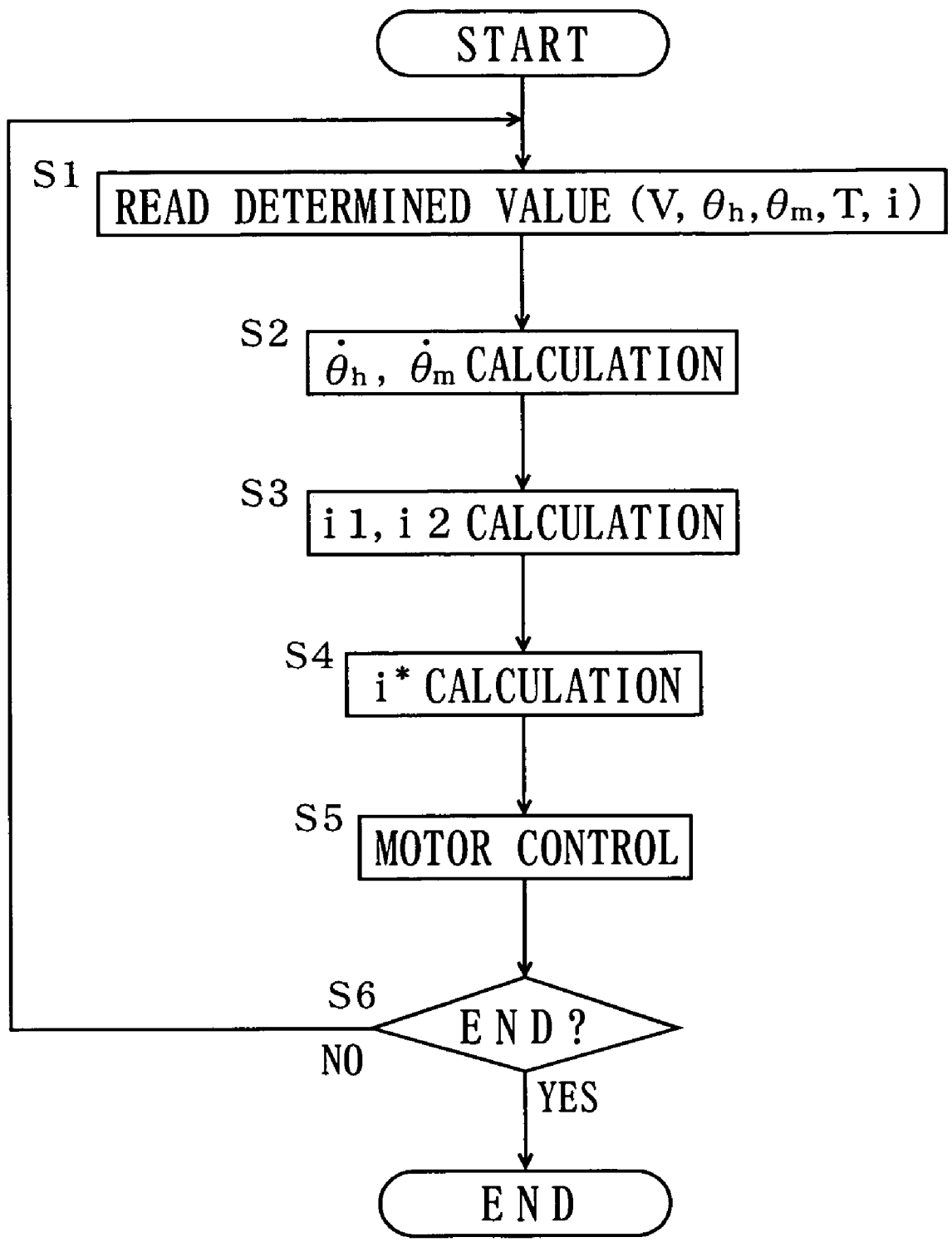
FIG. 14 is a flowchart showing the control procedure in the electric power steering apparatus according to the third embodiment of the present invention.

The flowchart of FIG. 14 shows the control procedure of the motor 10 with the controller 20. Firstly, the values V, $\theta_h$, $\theta_m$, T, i determined with the sensors are read (step S1), the rotation angular velocity $d\theta_h/dt$ of the steering wheel 2 is subsequently determined by time-differentiating the steering angle $\theta_h$ determined in a time series, and the rotation angular velocity $d\theta_m/dt$ of the motor 10 is further determined by time-differentiating the rotation angle $\theta_m$ determined in a time series (step S2). Incidentally, in the initial stage of commencing control, the initial values preset as the rotation angular velocity $d\theta_h/dt$ of the steering wheel 2 and rotation angular velocity $d\theta_m/dt$ of the motor 10 can be used. Next, the first correction current i1=Gtd·Gvd·id according to the rotation angular velocity $d\theta_h/dt$ of the steering wheel 2 and the second correction current i2=Gte·Gve·ie according to the rotation angular velocity $d\theta_m/dt$ of the motor 10 are determined (step S3), the target drive current i*=Gv·(io+i1+i2) is determined (step S4), and the motor is feedback-controlled so as to reduce the deviation of the target drive current i* and the detected drive current i (step S5). Thereafter, whether the control is to be ended or not is determined based on whether the ignition switch is ON or OFF (step S6), for example, and the routine returns to step S1 when the control is not to be ended.

According to the third embodiment described above, board diagrams similar to the board diagrams representing the frequency response characteristic shown in FIG. 6 and FIG. 7 can be obtained.

For example, the input torque Ti is determined with the following formulas.

$$Ti=To+Ta+Tb$$

$$To=Ka \cdot Ks(\theta_h-\theta_p)$$

$$Ta=Kdi \cdot d\theta_h/dt$$

$$Tb=-Kdo \cdot d\theta_m/dt$$

In the frequency response characteristic represented by the steering frequency and the amplitude ratio of the steering torque T relative to the steering angle $\theta_h$, the frequency $\omega_1$ and damping ratio $\zeta_1$ are determined with the following formulas.

$$\omega_1=(K/Jp)^{1/2} \tag{9}$$

$$\zeta_1=(Cp+Kdi+Kdo)/\{2 \cdot (Jp \cdot \alpha 1/\alpha 2)^{1/2}\} \tag{10}$$

In the frequency response characteristic represented by the input frequency (Hz) of the disturbance torque and the amplitude ratio of the steering torque T relative to the disturbance torque, the frequency $\omega_2$ and damping ratio $\zeta_2$ are determined with the following formulas.

$$\omega_2=[\{Ks \cdot (1+Ka)+K\}/Jp]^{1/2} \tag{11}$$

$$\zeta_2=(Cp+Kdo)/\{2 \cdot (Jp \cdot Ks/\alpha 1)^{1/2}\} \tag{12}$$

Since the first correction current i1 is directly correlating with the rotation angular velocity $d\theta_h/dt$ of the steering wheel 2 and the gain of such rotation angular velocity $d\theta_h/dt$ is Kdi, when the motor output is corrected, the damping ratio $\zeta_1$ increases pursuant to the above mentioned formula (10) when focusing only on the gain Kdi. In addition, the foregoing formula (10) includes the gain Kdo inversely correlating with the rotation angular velocity $d\theta_m/dt$ of the motor 10, and when the motor output is corrected, the damping ratio $\zeta_1$ increases when focusing only on the gain Kdo. Nevertheless, the gain Kdi does not influence the damping ratio $\zeta_2$ based on the formula (12). Thus, by setting the gain Kdi to an appropriate value, as shown with the dotted line after correction relative to the solid line before correction in FIG. 6, the amplitude ratio can be set to an appropriate value by such correction within the steering frequency range when a person operates the steering wheel 2 (e.g., within a range of frequency 2 Hz or less). As a result, since the amplitude ratio does not become too large or too small, the feel of steering does not become inferior. Incidentally, the first correction current i1 may be inversely correlating with the rotation angular velocity $d\theta_h/dt$ of the steering wheel 2, and it suffices so as long as the gain Kdi is set such that the amplitude ratio does not deteriorate the feel of steering within the steering frequency range when a person operates the steering wheel 2.

Since the second correction current i2 is inversely correlating with the rotation angular velocity $d\theta_m/dt$ of the motor 10 and the gain of such rotation angular velocity $d\theta_m/dt$ is Kdo, when the motor output is corrected, the damping ratio $\zeta_2$ increases pursuant to the above-mentioned formula (12). In other words, the dotted line after correction shifts relative to the solid line before correction in FIG. 7 toward a direction in which the peak value of the amplitude ratio becomes smaller at the resonance frequency (in FIG. 7, the peak point P of the amplitude ratio becomes smaller by the correction). Thus, the influence of disturbance to the steering can be suppressed.

As a result of correcting the output of the motor 10 in accordance with the first correction current i1 correlating with the rotation angular velocity $d\theta_h/dt$ of the steering wheel 2 as shown in the first to third embodiments described above, in the frequency response characteristic represented by the steering frequency of the steering wheel 2 and the amplitude ratio of the steering torque relative to the steering angle of the steering wheel 2, the amplitude can be arbitrarily set at least within the steering frequency range when a person operates the steering wheel 2. As a result, by correcting the output of the motor 10 in accordance with the sum of the first correction current i1 and the second correction current i2 corresponding to the change velocity of the physical quantity influencing the steering torque, the influence of disturbance can be reduced without deteriorating the feel of steering.

Figure 15:
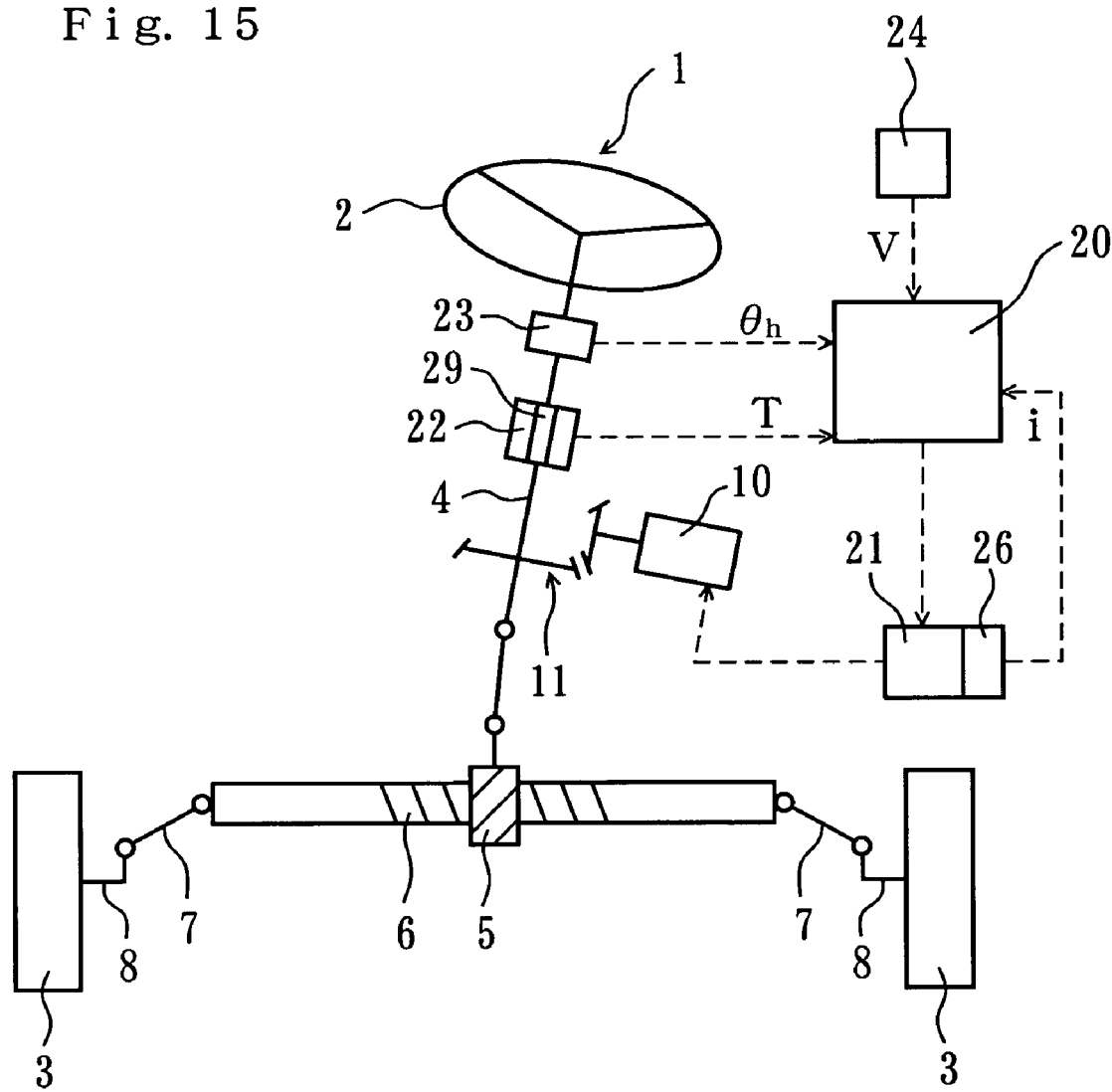
FIG. 15 is a constitutional explanatory diagram of the electric power steering apparatus according to the fourth embodiment of the present invention.

The electric power steering apparatus 1 for vehicles according to the fourth embodiment shown in FIG. 15 comprises a mechanism for transmitting the rotation of a steering wheel 2 based on steering operation to vehicle wheels 3 so as to vary the steering angle. In the present embodiment, as a result of the rotation of the steering wheel 2 being transmitted to a pinion 5 via a steering shaft 4, a rack 6 engaging with the pinion 5 moves, and the steering angle varies as a result of the movement of such rack 6 being transmitted to the vehicle wheels 3 via tie rods 7 and knuckle arms 8.

A motor 10 for generating steering assist power which acts on the path for transmitting the rotation of the steering wheel 2 to the vehicle wheels 3 is provided. In the present embodiment, the steering assist power is applied by transmitting the rotation of the output shaft of the motor 10 to the steering shaft 4 via a reduction gear mechanism 11.

The motor 10 is connected to a controller 20 constituted of a computer via a drive circuit 21. A torque sensor 22 for determining the steering torque T required to operate the steering wheel 2, a steering angle sensor 23 for determining the steering angle $\theta_h$ corresponding to the rotation angle of the steering wheel 2, a vehicle speed sensor 24 for determining the vehicle speed V, and a current sensor 26 for determining the drive current i of the motor 10 are connected to the controller 20. Incidentally, the steering shaft of the present embodiment is comprised of two parts, one of which is located at the side of the steering wheel 2 and the other is located at the side of the pinion 5, and the two parts are connected with a torsion bar 29. The torque sensor 22 determines the steering torque T obtained by multiplying the spring constant Ks of the torsion bar 29 to the torsion angle $(\theta_h - \theta_p)$ of the torsion bar 29, which is the difference between the steering angle $\theta_h$ and the rotation angle $\theta_p$ of the pinion 5.

The controller 20 controls the motor 10 such that it generates steering assist power in accordance with the determined steering torque T, varies the steering assist power in accordance with the determined vehicle speed V, and further corrects the steering assist power in accordance with the rotation angular velocity of the steering wheel 2 and the change velocity of the steering torque T.

Figure 16:
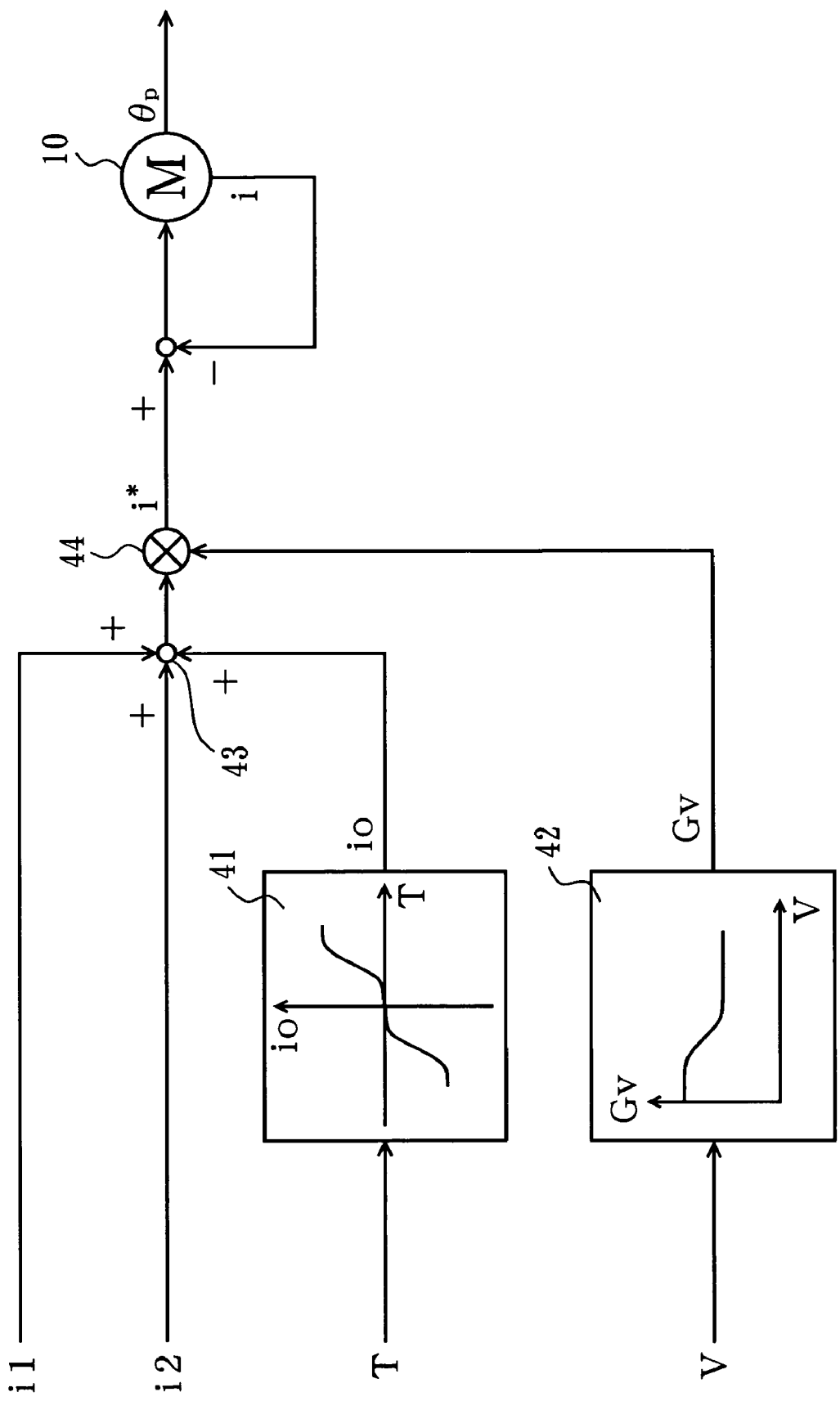
FIG. 16 is a control block diagram of the electric power steering apparatus according to an embodiment of the present invention.
Figure 17:
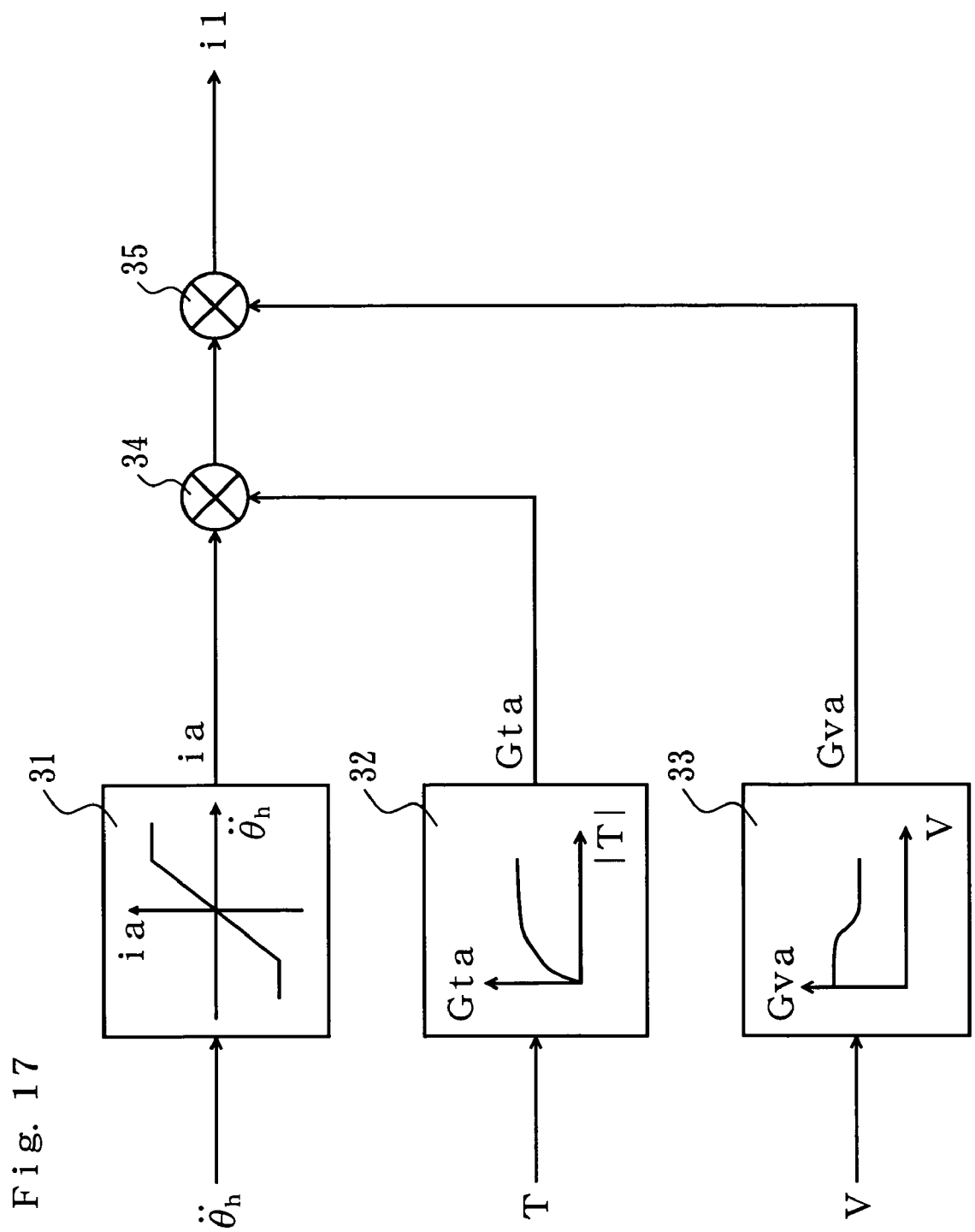
FIG. 17 is a control block diagram for determining the first correction current in the electric power steering apparatus according to the fourth embodiment of the present invention.
Figure 18:
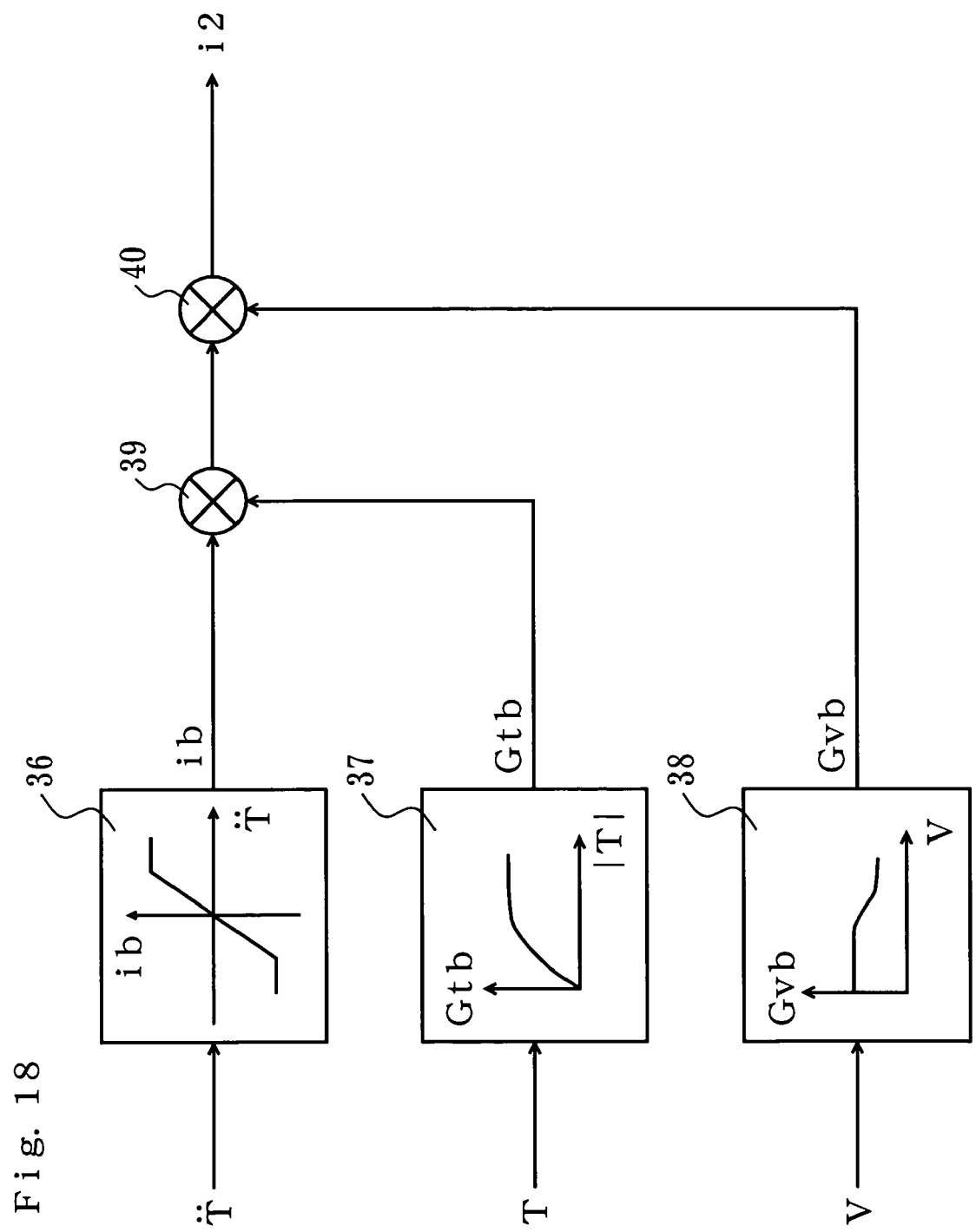
FIG. 18 is a control block diagram for determining the second correction current in the electric power steering apparatus according to the fourth embodiment of the present invention.

FIG. 16 to FIG. 18 are control block diagrams of the motor 10 with the controller 20. As shown in FIG. 16, the controller 20 determines the target drive current i* of the motor 10 by multiplying the basic vehicle speed gain Gv to the sum of the basic assist current io and the first correction current i1 and the second correction current i2. As a result of feedback-controlling the motor 10 so as to reduce the deviation of the target drive current i* and the determined drive current i, the rotation angle $\theta_p$ of the pinion 5 is varied, and the steering assist power is applied thereby.

As shown in FIG. 17, the rotation angular acceleration $d^2\theta_h/dt^2$ of the steering wheel 2 is determined as the rotation angular acceleration correspondence value by the second order differentiation of the steering angle $\theta_h$ determined with the steering sensor 23. The relation set between the rotation angular acceleration $d^2\theta_h/dt^2$ and the first correction reference current ia is stored in the controller 20 as a table or an arithmetic expression for example. The first correction reference current ia corresponding to the determined rotation angular acceleration $d^2\theta_h/dt^2$ is calculated in a calculation part 31 based on the stored relation. Regarding the relation between the rotation angular acceleration $d^2\theta_h/dt^2$ and the first correction reference current ia, as shown in the calculation part 31 of FIG. 17 for example, the first correction reference current ia is directly correlating with the rotation angular acceleration $d^2\theta_h/dt^2$. The code of positive and negative of the rotation angular acceleration $d^2\theta_h/dt^2$ and the first correction reference current ia at the time of rightward steering is reversed at the time of leftward steering.

The relation set between the absolute value of the steering torque T and the first torque gain Gta is stored as a table or an arithmetic expression for example, and the first torque gain Gta corresponding to the determined steering torque T is calculated in a calculation part 32. Regarding the relation between the absolute value of the steering torque T and the first torque gain Gta, as shown in the calculation part 32 of FIG. 17 for example, the first torque gain Gta increases pursuant to the increase in the absolute value of the steering torque T.

Further, the relation set between the vehicle speed V and the first vehicle speed gain Gva is stored as a table or an arithmetic expression for example, and the first vehicle speed gain Gva corresponding to the determined vehicle speed V is calculated in a calculation part 33. Regarding the relation between the vehicle speed V and the first vehicle speed gain Gva, as shown in the calculation part 33 of FIG. 17 for example, the first vehicle speed gain Gva increases when the vehicle speed V is small in comparison to when it is large.

The first correction current i1 is determined by multiplying the first torque gain Gta and the first vehicle speed gain Gva to the first correction reference current ia in the multiplication parts 34, 35. As a result, the relation set as shown in the calculation parts 31, 32, 33 of FIG. 17 is stored in the controller 20 as the first relation between the rotation angular acceleration $d^2\theta_h/dt^2$ and the first correction current i1, and the first correction current i1 as the first motor output correction value directly correlating with the rotation angular acceleration $d^2\theta_h/dt^2$ is determined with the controller 20 from the first relation.

As shown in FIG. 18, the change acceleration $d^2T/dt^2$ is determined as the change acceleration correspondence value by the second order differentiation of the steering torque T determined with the torque sensor 22. The relation set between the change acceleration $d^2T/dt^2$ and the second correction reference current ib is stored as a table or an arithmetic expression for example. The second correction reference current ib corresponding to the determined change acceleration $d^2T/dt^2$ is calculated in a calculation part 36 based on the stored relation. Regarding the relation between the change acceleration $d^2T/dt^2$ and the second correction reference current ib, as shown in the calculation part 36 of FIG. 18 for example, the second correction reference current ib is directly correlating with the change acceleration $d^2T/dt^2$. The code of positive and negative of the change acceleration $d^2T/dt^2$ and the second correction reference current ib at the time of rightward steering is reversed at the time of leftward steering.

The relation set between the absolute value of the steering torque T and the second torque gain Gtb is stored as a table or an arithmetic expression for example, and the second torque gain Gtb corresponding to the determined steering torque T is calculated in a calculation part 37. Regarding the relation between the absolute value of the steering torque T and the second torque gain Gtb, as shown in the calculation part 37 of FIG. 18 for example, the second torque gain Gtb increases pursuant to the increase in the absolute value of the steering torque T.

Further, the relation set between the vehicle speed V and the second vehicle speed gain Gvb is stored as a table or an arithmetic expression for example, and the second vehicle speed gain Gvb corresponding to the determined vehicle speed V is calculated in a calculation part 38. Regarding the relation between the vehicle speed V and the second vehicle speed gain Gvb, as shown in the calculation part 38 of FIG. 18 for example, the second vehicle speed gain Gvb increases when the vehicle speed V is small in comparison to when it is large.

The second correction current i2 is determined by multiplying the second torque gain Gtb and the second vehicle speed gain Gvb to the second correction reference current ib in the multiplication parts 39, 40. As a result, the relation set as shown in the calculation parts 36, 37, 38 of FIG. 18 is stored in the controller 20 as the second relation between the change acceleration $d^2T/dt^2$ and the second correction current i2, and the second correction current i2 as the second motor output correction value directly correlating with the change acceleration $d^2T/dt^2$ is determined with the controller 20 from the second relation.

As shown in FIG. 16, the relation between the steering torque T and the basic assist current io is stored as a table or an arithmetic expression for example. Regarding the relation between the steering torque T and the basic assist current io, as shown in the calculation part 41 of FIG. 16 for example, the absolute value of the basic assist current io increases pursuant to the increase in the absolute value of the steering torque T. The code of positive and negative of the steering torque T and the basic assist current io at the time of rightward steering is reversed at the time of leftward steering.

The relation between the vehicle speed V and the basic vehicle speed gain Gv is stored as a table or an arithmetic expression for example, and the basic vehicle speed gain Gv corresponding to the determined vehicle speed V is calculated in a calculation part 42. Regarding the relation between the vehicle speed V and the basic vehicle speed gain Gv, as shown in the calculation part 42 of FIG. 16 for example, the basic vehicle speed gain Gv increases when the vehicle speed V is small in comparison to when it is large.

The sum of the first correction current i1 and the second correction current i2 and the basic assist current io is calculated in an addition part 43, and the target drive current i* is determined by multiplying the basic vehicle speed gain Gv to such sum in a multiplication part 44. As a result, the output of the motor 10 corresponding to the basic assist current io according to the steering torque is corrected in accordance with the sum of the first correction current i1 and the second correction current i2.

Figure 19:
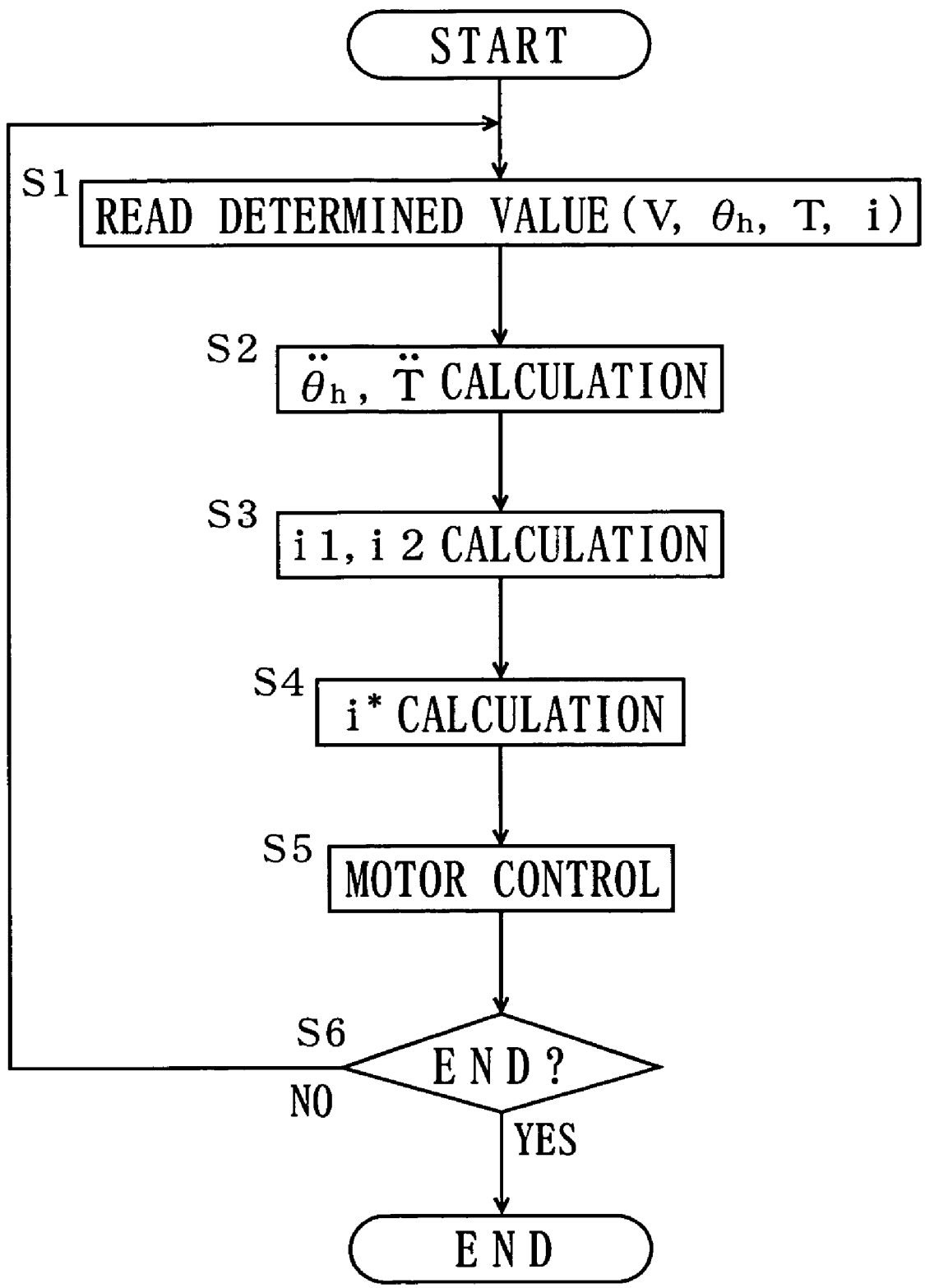
FIG. 19 is a flowchart showing the control procedure in the electric power steering apparatus according to the fourth embodiment of the present invention.

The flowchart of FIG. 19 shows the control procedure of the motor 10 with the controller 20. Firstly, the values V, $\theta_h$, T, i determined with the sensors are read (step S1), the rotation angular acceleration $d^2\theta_h/dt^2$ is subsequently determined by second order time-differentiating the steering angle $\theta_h$ determined in a time series, and the change acceleration $d^2T/dt^2$ is further determined by second order time-differentiating the steering torque T determined in a time series (step S2). Incidentally, in the initial stage of commencing control, the initial values preset as the rotation angular acceleration $d^2\theta_h/dt^2$ and change acceleration $d^2T/dt^2$ can be used. Next, the first correction current i1=Gta·Gva·ia according to the rotation angular acceleration $d^2\theta_h/dt^2$ and the second correction current i2=Gtb·Gvb·ib according to the change acceleration $d^2T/dt^2$ are determined (step S3), the target drive current i*=Gv·(io+i1+i2) is determined (step S4), and the motor is feedback-controlled so as to reduce the deviation of the target drive current i* and the detected drive current i (step S5). Thereafter, whether the control is to be ended or not is determined based on whether the ignition switch is ON or OFF (step S6), for example, and the routine returns to step S1 when the control is not to be ended.

Figure 20:
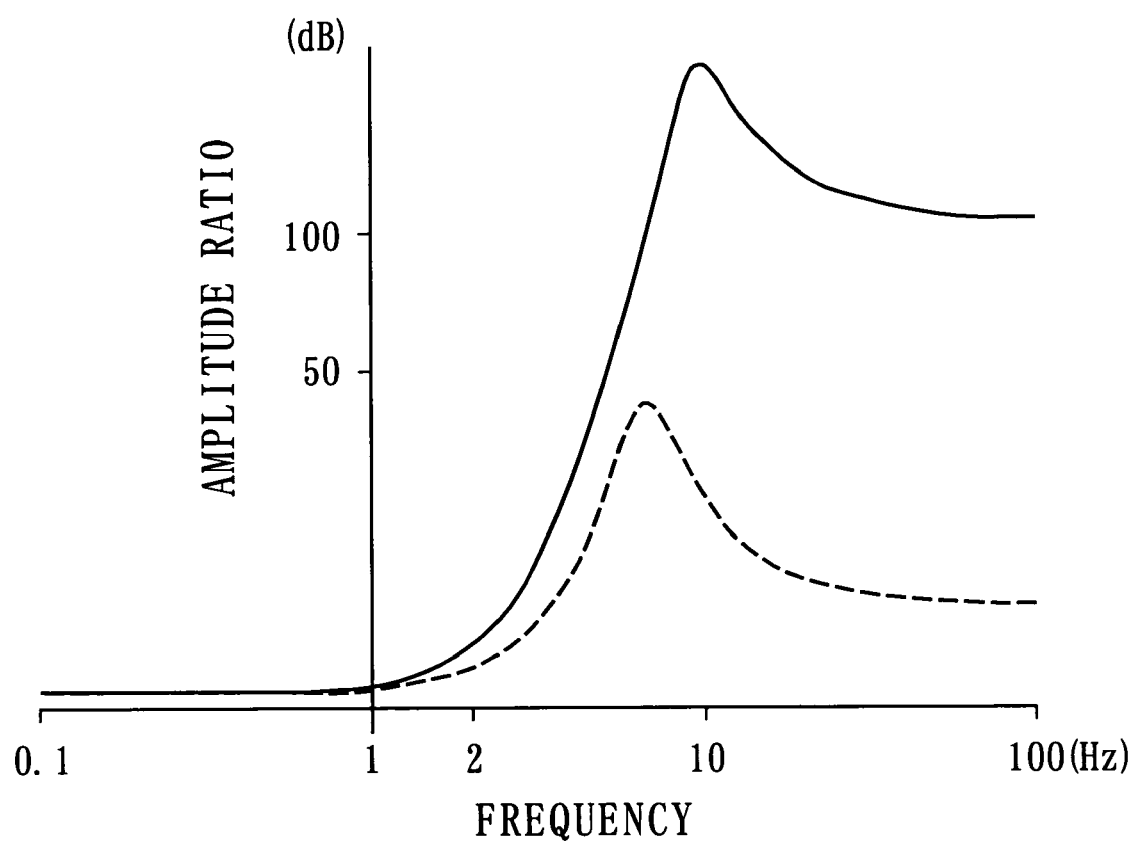
FIG. 20 is a board diagram representing the frequency response characteristic showing the steering characteristic in the electric power steering apparatus according to the fourth to sixth embodiments of the present invention.
Figure 21:
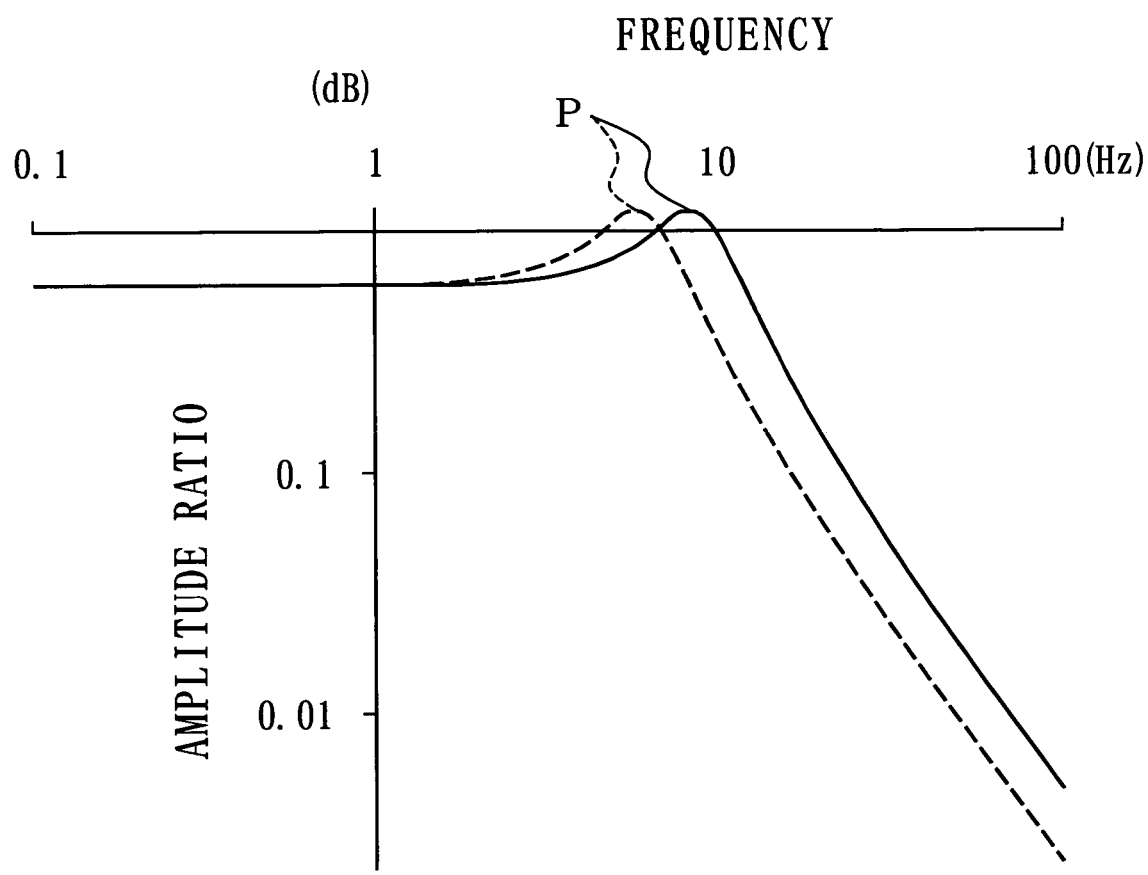
FIG. 21 is a board diagram representing the frequency response characteristic showing the influence of disturbance in the electric power steering apparatus according to the fourth to sixth embodiments of the present invention.

According to the fourth embodiment described above, the board diagrams representing the frequency response characteristic shown in FIG. 20 and FIG. 21 can be obtained. In FIG. 20, the horizontal axis represents the steering frequency (Hz) corresponding to the number of reciprocating operations per unit time of the steering wheel 2, and the vertical axis represents the amplitude ratio (dB) of the steering torque T relative to the steering angle $\theta_h$ of the steering wheel 2. In FIG. 21, the horizontal axis represents the input frequency (Hz) of the disturbance torque input from the road surface to the steering system via the vehicle wheels 3, and the vertical axis represents the amplitude ratio (dB) of the steering torque T relative to the disturbance torque. As a result of correcting the output of the motor 10, in the frequency response characteristic represented by the steering frequency and the amplitude ratio of steering torque T relative to the steering angle $\theta_h$ shown in FIG. 20, the first relation is set such that the amplitude ratio becomes smaller at least within the steering frequency range when a person operates a steering wheel (e.g., within a range of 2 Hz or less). Further, as a result of correcting the output of the motor, in the frequency response characteristic represented by the frequency of the disturbance torque and the amplitude ratio of the steering torque T relative to the disturbance torque shown in FIG. 21, the second relation is set such that the amplitude ratio becomes smaller at the resonance frequency.

For example, it is assumed that the input torque Ti to the steering system via the motor 10 is determined with the following formula which adds the basic assist torque To proportional to the steering torque, the first correction torque Ta proportional to the rotation angular acceleration of the steering wheel 2, and the second correction torque Tb proportional to the change acceleration of the steering torque.

$Ti=To+Ta+Tb$ $To=Ka\cdot Ks(\theta_h-\theta_p)$ $Ta=Kw\cdot d^2\theta_h/dt^2$ $Tb=Kdd\cdot d^2Ks(\theta_h-\theta_p)/dt$ Ka is a basic assist control gain, Kw is a control gain of the steering angular velocity differentiation (steering angle second order differentiation), and Kdd is a torque second order differentiation control gain.

In the frequency response characteristic shown in FIG. 20, the frequency $\omega_1$ and damping ratio $\zeta_1$ are determined with the following formulas.

$$\omega_1=\{K/(Jp-Kw)\}^{1/2} \quad (13)$$

$$\zeta_1=Cp/[2\cdot\{(Jp-Kw)\cdot\alpha 1/\alpha 2\}^{1/2}] \quad (14)$$

In the frequency response characteristic shown in FIG. 21, the frequency $\omega_2$ and damping ratio $\zeta_2$ are determined with the following formulas.

$$\omega_2=[\{Ks\cdot(1+Ka)+K\}/(Jp+Kdd)]^{1/2} \quad (15)$$

$$\zeta_2=Cp/[2\cdot\{(Jp+Kdd)\cdot Ks/\alpha 1\}^{1/2}] \quad (16)$$

$\alpha 1$ is a parameter of the weight of steering when the frequency is zero, and $\alpha 2$ is a transmission ratio of disturbance when the frequency is zero, and are represented by the following formulas.

$\alpha 1=Ks\cdot K/\{Ks\cdot(1+Ka)+K\}$ $\alpha 2=1/\{(1+Ka)+K/Ks\}$

K is a elastic coefficient, Jp is a inertia of the pinion axis conversion in the steering system, and Cp is a pinion axis conversion viscosity coefficient in the steering system lower than the torsion bar 29.

In FIG. 20, the state prior to correcting the output of the motor 10 is shown with a solid line, and the state after correction is shown with a dotted line. Since the first correction current i1 directly correlating with the rotation angular acceleration $d^2\theta_h/dt^2$ of the steering wheel 2 and the gain of such rotation angular acceleration $d^2\theta_h/dt^2$ is Kw, the frequency $\omega_1$ increases pursuant to the above-mentioned formula (13) when the motor output is corrected. In other words, the dotted line after correction shifts relative to the solid line before correction in FIG. 20 toward a direction in which the frequency $\omega_1$ increases. As a result, in the steering frequency range when a person operates the steering wheel, since the amplitude ratio of the steering torque relative to the steering angle of the steering wheel 2 becomes smaller under the same frequency by such correction (e.g., in FIG. 20, the amplitude ratio at a frequency of 2 Hz becomes smaller by the correction), the steering response can be improved.

In FIG. 21, the state prior to correcting the output of the motor 10 is shown with a solid line, and the state after correction is shown with a dotted line. Since the second correction current i2 is directly correlating with the change acceleration $d^2T/dt^2$ of the steering torque T and the gain of such change acceleration $d^2T/dt^2$ is Kdd, the frequency $\omega_2$ decreases pursuant to the above-mentioned formula (15) when the motor output is corrected. In other words, the dotted line after correction shifts relative to the solid line before correction in FIG. 21 toward a direction in which the frequency $\omega_2$ decreases. As a result, by correcting the motor output, the resonance frequency of the steering system in which the amplitude ratio of the steering torque T relative to the disturbance torque reaches a peak value decreases (e.g., in FIG. 21, the frequency of the peak point P of the amplitude ratio becomes smaller by the correction). Thus, since the input frequency of the disturbance torque relative to the resonance frequency becomes smaller, the frequency range of disturbance in which the disturbance has an influence becomes narrow, and the influence of disturbance to the steering can be suppressed thereby.

Figure 22:
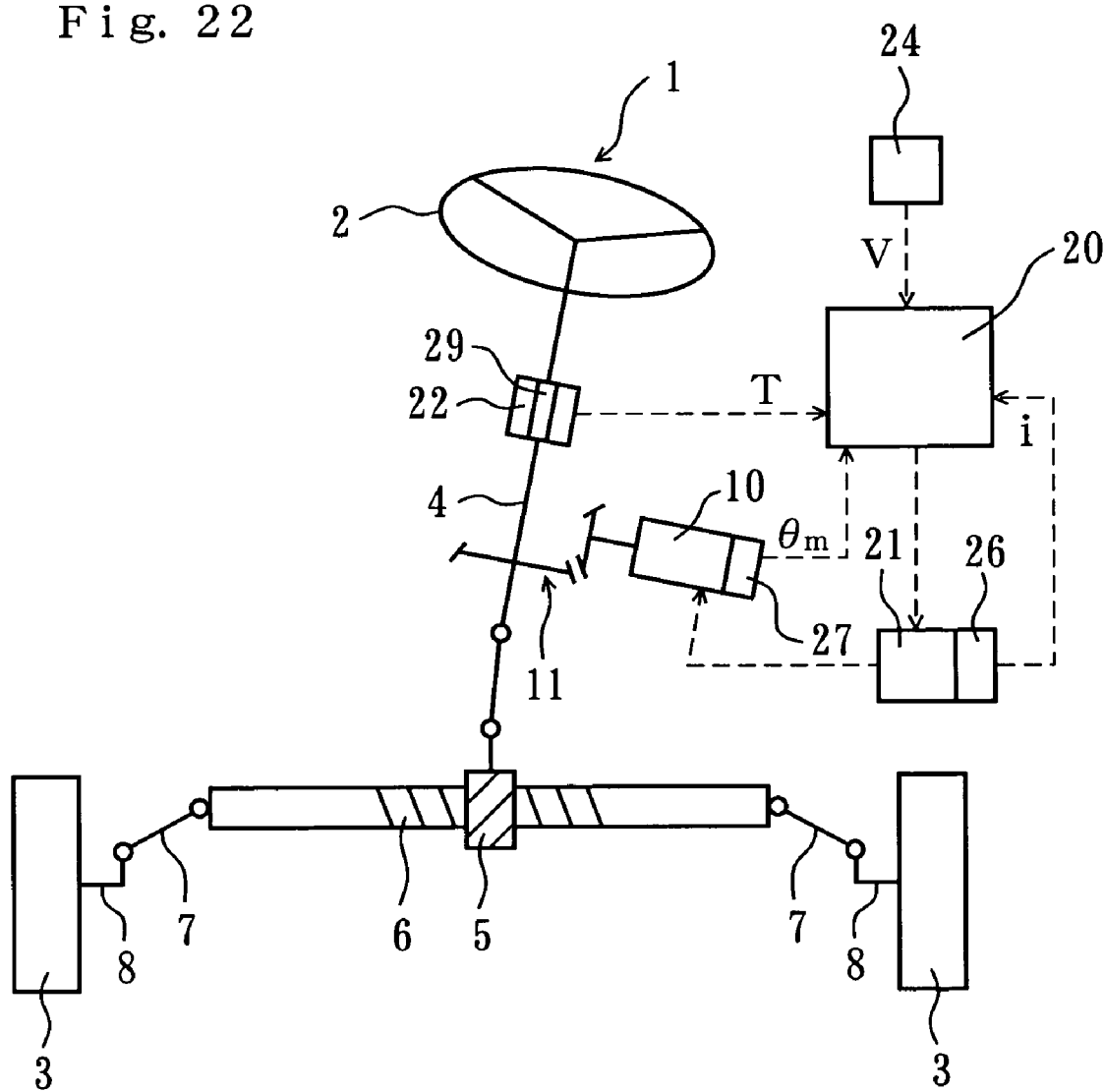
FIG. 22 is a constitutional explanatory diagram of the electric power steering apparatus according to the fifth embodiment of the present invention.
Figure 23:
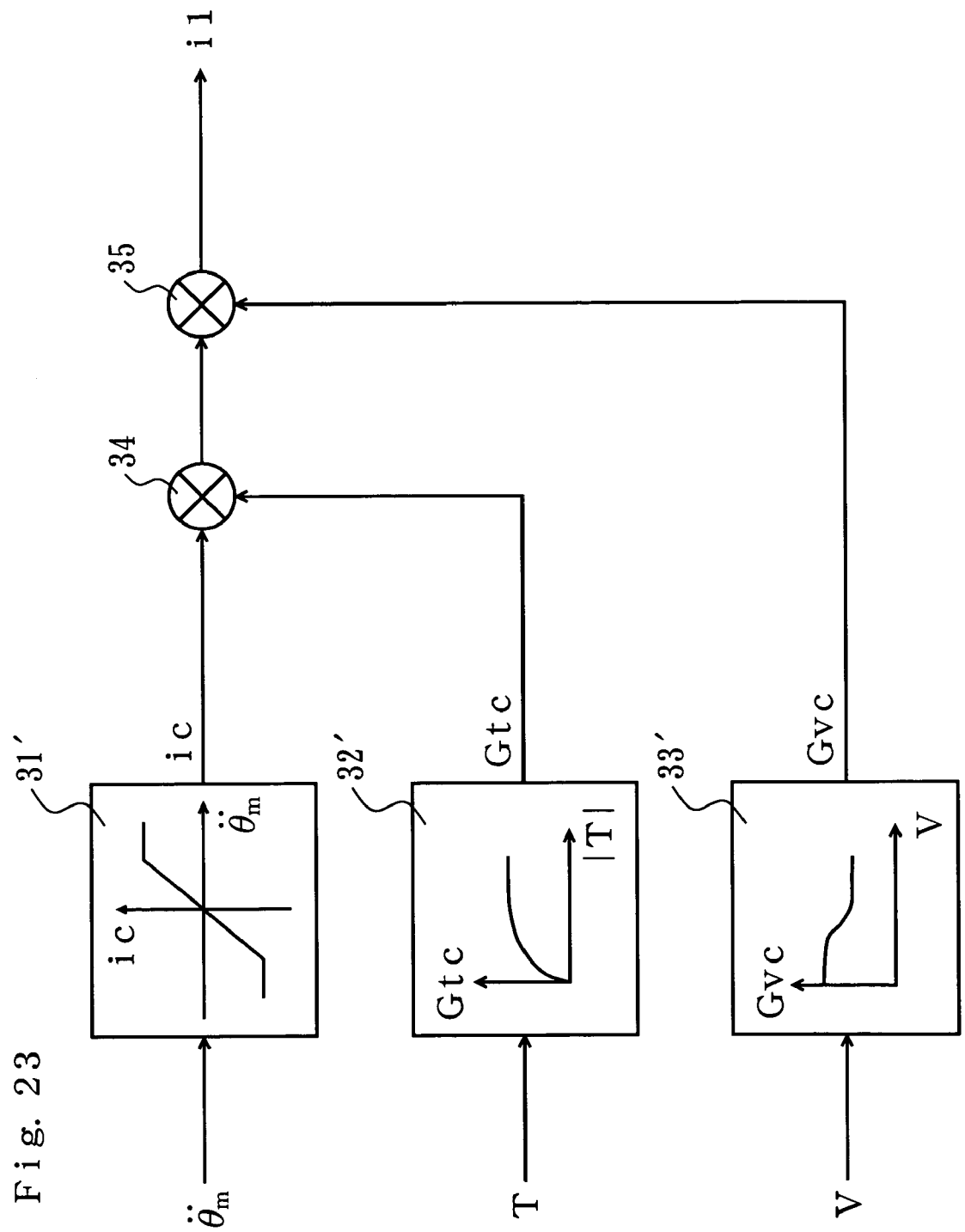
FIG. 23 is a control block diagram for determining the first correction current in the electric power steering apparatus according to the fifth embodiment of the present invention.
Figure 24:
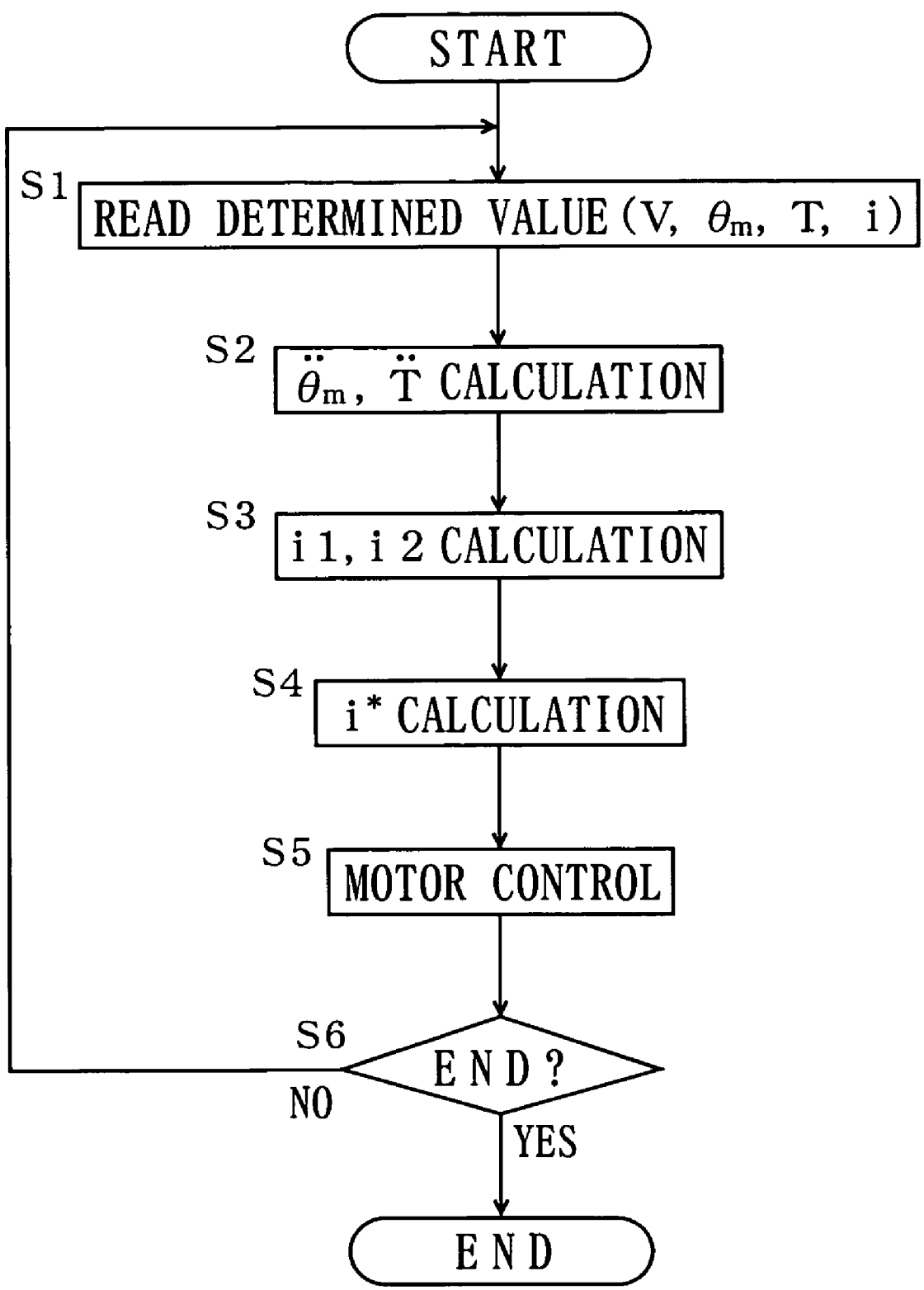
FIG. 24 is a flowchart showing the control procedure in the electric power steering apparatus according to the fifth embodiment of the present invention.

FIG. 22 to FIG. 24 illustrate the fifth embodiment, and the difference with the fourth embodiment is explained below, while the same reference numerals are given to the same components as the first embodiment and the explanation thereof is omitted. The difference with the fourth embodiment, foremost, is that the controller 20 corrects the steering assist power according to the rotation angular acceleration of the motor 10 instead of the rotation angular acceleration of the steering wheel 2, and the change acceleration of the steering torque T. Thus, in place of the steering angle sensor 23 for determining the steering angle $\theta_h$ corresponding to the rotation angle of the steering wheel 2, an angle sensor 27 for detecting the rotation angle $\theta_m$ of the motor 10 is connected to the controller 20.

As shown in FIG. 23, the rotation angular acceleration $d^2\theta_m/dt^2$ is determined as the rotation angular acceleration correspondence value by the second order differentiation of the rotation angle $\theta_m$ determined with the angle sensor 27. The relation set between the rotation angular acceleration $d^2\theta_m/dt^2$ and the first correction reference current ic is stored in the controller 20 as a table or an arithmetic expression for example. The first correction reference current ic corresponding to the determined rotation angular acceleration $d^2\theta_m/dt^2$ is calculated in a calculation part 31' based on the stored relation. Regarding the relation between the rotation angular acceleration $d^2\theta_m/dt^2$ and the first correction reference current ic, as shown in the calculation part 31' of FIG. 23 for example, the first correction reference current ic is directly correlating with the rotation angular acceleration $d^2\theta_m/dt^2$. The code of positive and negative of the rotation angular acceleration $d^2\theta_m/dt^2$ and the first correction reference current ic at the time of rightward steering is reversed at the time of leftward steering.

The relation set between the absolute value of the steering torque T and the first torque gain Gtc is stored as a table or an arithmetic expression for example, and the first torque gain Gtc corresponding to the determined steering torque T is calculated in a calculation part 32'. Regarding the relation between the absolute value of the steering torque T and the first torque gain Gtc, as shown in the calculation part 32' of FIG. 23 for example, the first torque gain Gtc increases pursuant to the increase in the absolute value of the steering torque T.

Further, the relation set between the vehicle speed V and the first vehicle speed gain Gvc is stored as a table or an arithmetic expression for example, and the first vehicle speed gain Gvc corresponding to the determined vehicle speed V is calculated in a calculation part 33'. Regarding the relation between the vehicle speed V and the first vehicle speed gain Gvc, as shown in the calculation part 33' of FIG. 23 for example, the first vehicle speed gain Gvc increases when the vehicle speed V is small in comparison to when it is large.

The first correction current i1 is determined by multiplying the first torque gain Gtc and the first vehicle speed gain Gvc to the first correction reference current ic in the multiplication parts 34, 35. As a result, the relation set as shown in the calculation parts 31', 32', 33' of FIG. 23 is stored in the controller 20 as the first relation between the rotation angular acceleration $d^2\theta_m/dt^2$ and the first correction current i1, and the first correction current i1 as the first motor output correction value directly correlating with the rotation angular acceleration $d^2\theta_m/dt^2$ is determined with the controller 20 from the first relation.

The second correction current i2 directly correlating with the change acceleration $d^2T/dt^2$ is determined as with the fourth embodiment.

The flowchart of FIG. 24 shows the control procedure of the motor 10 with the controller 20. Firstly, the values V, $\theta_m$, T, i determined with the sensors are read (step S1), the rotation angular acceleration $d^2\theta_m/dt^2$ is subsequently determined by second order time-differentiating the rotation angle $\theta_m$ determined in a time series, and the change acceleration $d^2T/dt^2$ is further determined by second order time-differentiating the steering torque T determined in a time series (step S2). Incidentally, in the initial stage of commencing control, the initial values preset as the rotation angular acceleration $d^2\theta_m/dt^2$ and change acceleration $d^2T/dt^2$ can be used. Next, the first correction current i1=Gtc·Gvc·ic according to the rotation angular acceleration $d^2\theta_m/dt^2$ and the second correction current i2=Gtb·Gvb·ib according to the change acceleration $d^2T/dt^2$ are determined (step S3), the target drive current i*=Gv·(io+i1+i2) is determined (step S4), and the motor is feedback-controlled so as to reduce the deviation of the target drive current i* and the detected drive current i (step S5). Thereafter, whether the control is to be ended or not is determined based on whether the ignition switch is ON or OFF (step S6), for example, and the routine returns to step S1 when the control is not to be ended.

According to the fifth embodiment described above, board diagrams similar to the board diagrams representing the frequency response characteristic shown in FIG. 20 and FIG. 21 of the fourth embodiment can be obtained.

For example, the input torque Ti is determined with the following formulas.

$Ti=To+Ta+Tb$ $To=Ka·Ks(\theta_h-\theta_p)$ $Ta=Km·d^2\theta_m/dt^2$ $Tb=Kdd·d^2Ks(\theta_h-\theta_p)/dt$ Km is a control gain of the motor rotation angular velocity differentiation (motor rotation angle second order differentiation).

In the frequency response characteristic represented by the steering frequency and the amplitude ratio of the steering torque T relative to the steering angle $\theta_h$, the frequency $\omega_1$ and damping ratio $\zeta_1$ are determined with the following formulas.

$$\omega_1=\{K/(Jp-Km)\}^{1/2} \quad (17)$$

$$\zeta_1=Cp/[2·\{(Jp-Km)·\alpha1/\alpha2\}^{1/2}] \quad (18)$$

In the frequency response characteristic represented by the input frequency (Hz) of the disturbance torque and the amplitude ratio of the steering torque T relative to the disturbance torque, the frequency $\omega_2$ and damping ratio $\zeta_2$ are determined with the following formulas.

$$\omega_2=[\{Ks·(1+Ka)+K\}/(Jp-Km+Kdd)]^{1/2} \quad (19)$$

$$\zeta_2=Cp/[2·\{(Jp-Km+Kdd)·Ks/\alpha1\}^{1/2}] \quad (20)$$

Since the first correction current i1 is directly correlating with the rotation angular acceleration $d^2\theta_m/dt^2$ of the motor 10 and the gain of such rotation angular acceleration $d^2\theta_m/dt^2$ is Km, the frequency $\omega_1$ increases pursuant to the above-mentioned formula (17) when the output of the motor 10 is corrected. In other words, the dotted line after correction shifts relative to the solid line before correction in FIG. 20 toward a direction in which the frequency $\omega_1$ increases. As a result, by correcting the output of the motor 10, since the amplitude ratio of the steering torque relative to the steering angle of the steering wheel 2 becomes smaller under the same frequency in the steering frequency range when a person operates the steering wheel, the steering response can be improved.

Since the second correction current i2 is directly correlating with the change acceleration $d^2T/dt^2$ of the steering torque T and the gain of such change acceleration $d^2T/dt^2$ is Kdd, the frequency $\omega_2$ decreases pursuant to the above-mentioned formula (19) when the output of the motor 10 is corrected. In other words, the dotted line after correction shifts relative to the solid line before correction in FIG. 21 toward a direction in which the frequency $\omega_2$ decreases. As a result, by correcting the output of the motor 10, the resonance frequency of the steering system in which the amplitude ratio of the steering torque T relative to the disturbance torque reaches a peak value decreases. Thus, since the input frequency of the disturbance torque relative to the resonance frequency becomes smaller, the frequency range of disturbance in which the disturbance has an influence becomes narrow, and the influence of disturbance to the steering can be suppressed thereby.

Incidentally, although the foregoing formula (19) includes the gain Km, the frequency $\omega_2$ after the correction can be made smaller than before the correction by making the gain Kdd larger than the gain Km. The first relation between the rotation angular acceleration $d^2\theta_m/dt^2$ of the motor 10 and the first correction current i1, and the second relation between the change acceleration $d^2T/dt^2$ and the second correction current i2 are set such that the frequency $\omega_2$ after the correction becomes smaller than before the correction. In this case, since the foregoing formula (17) does not include the gain Kdd, the frequency $\omega_2$ after the correction can be made smaller than before the correction even upon setting such first and second relations.

Figure 25:
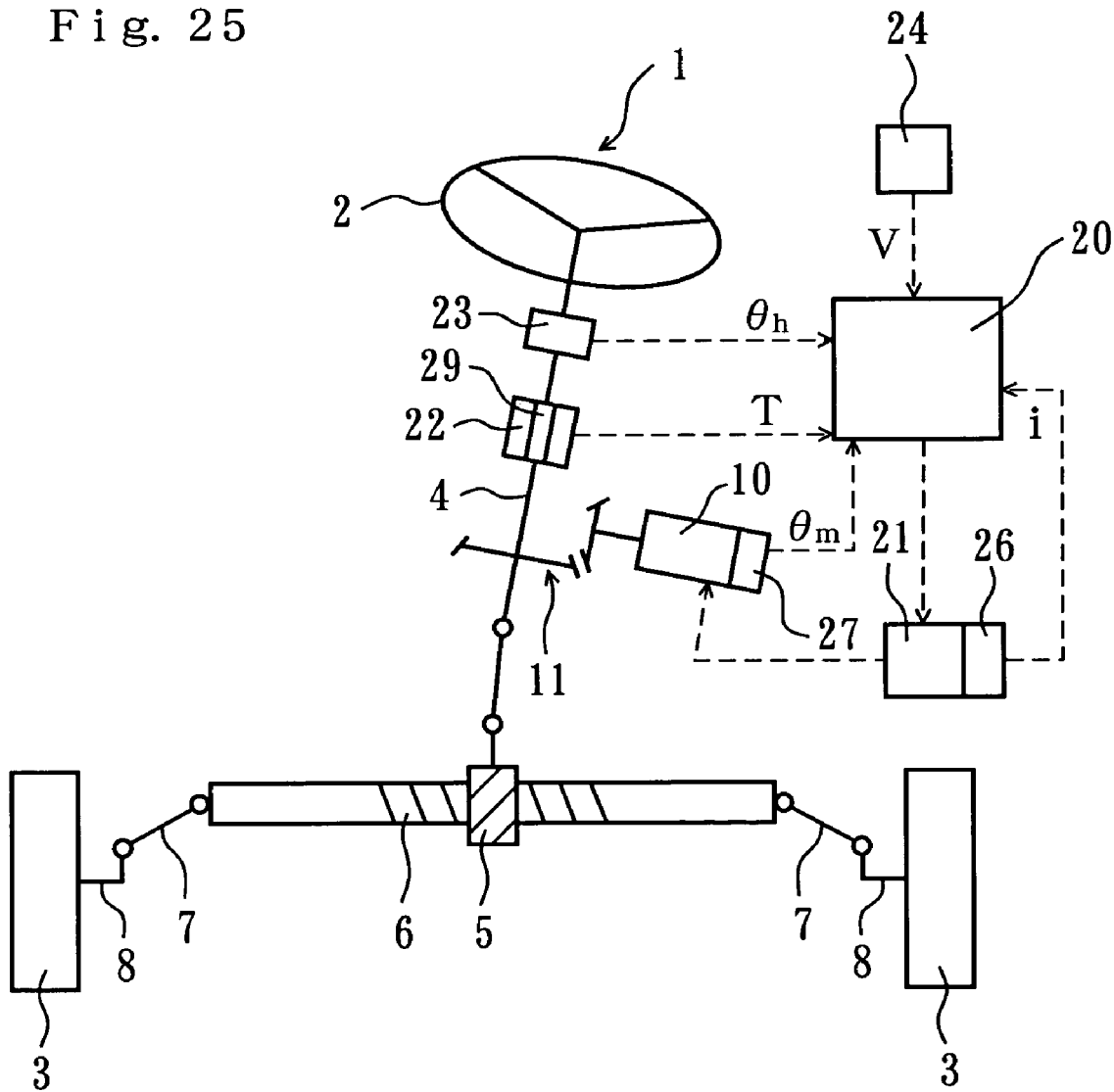
FIG. 25 is a constitutional explanatory diagram of the electric power steering apparatus according to the sixth embodiment of the present invention.
Figure 26:
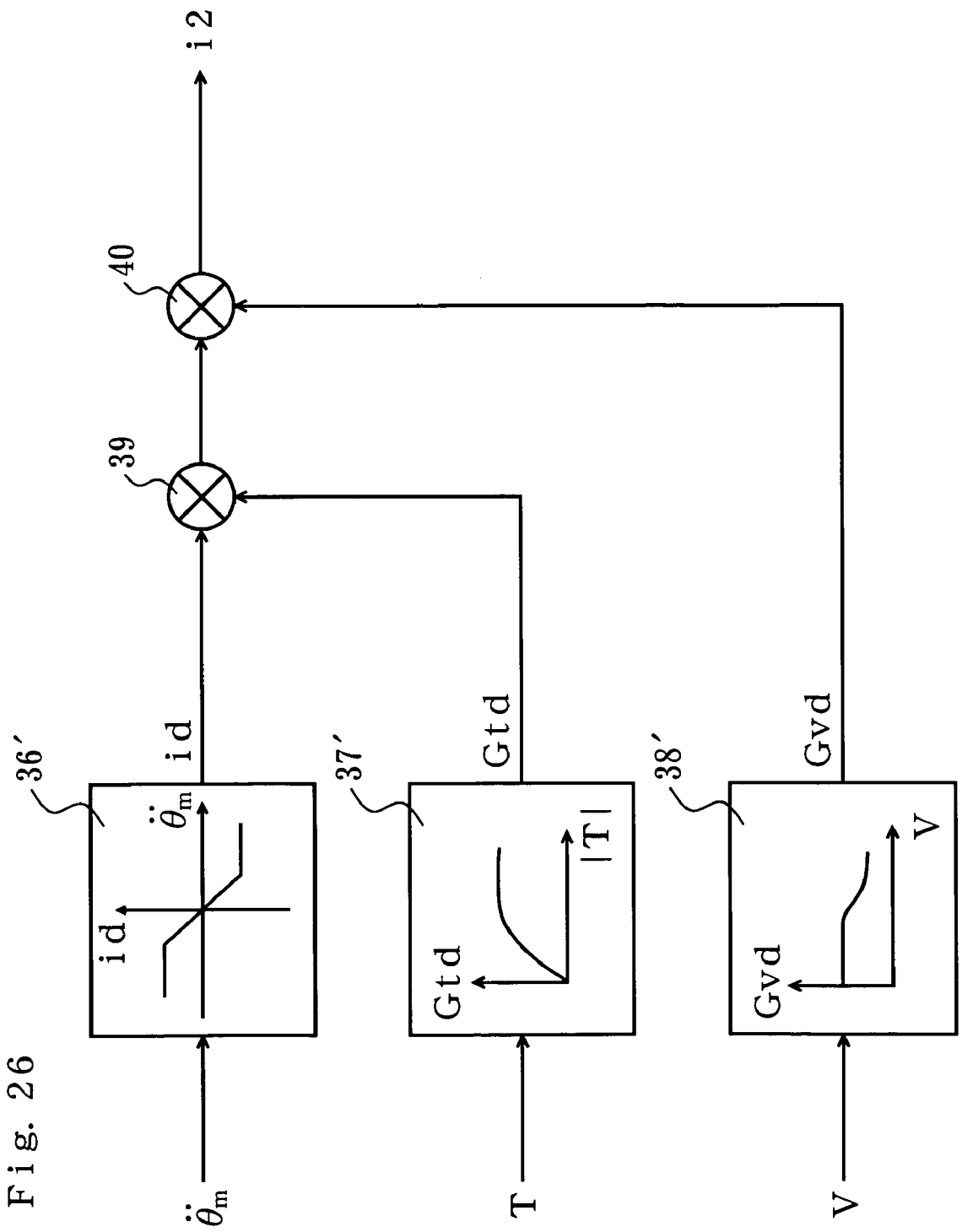
FIG. 26 is a control block diagram for determining the second correction current in the electric power steering apparatus according to the sixth embodiment of the present invention.
Figure 27:
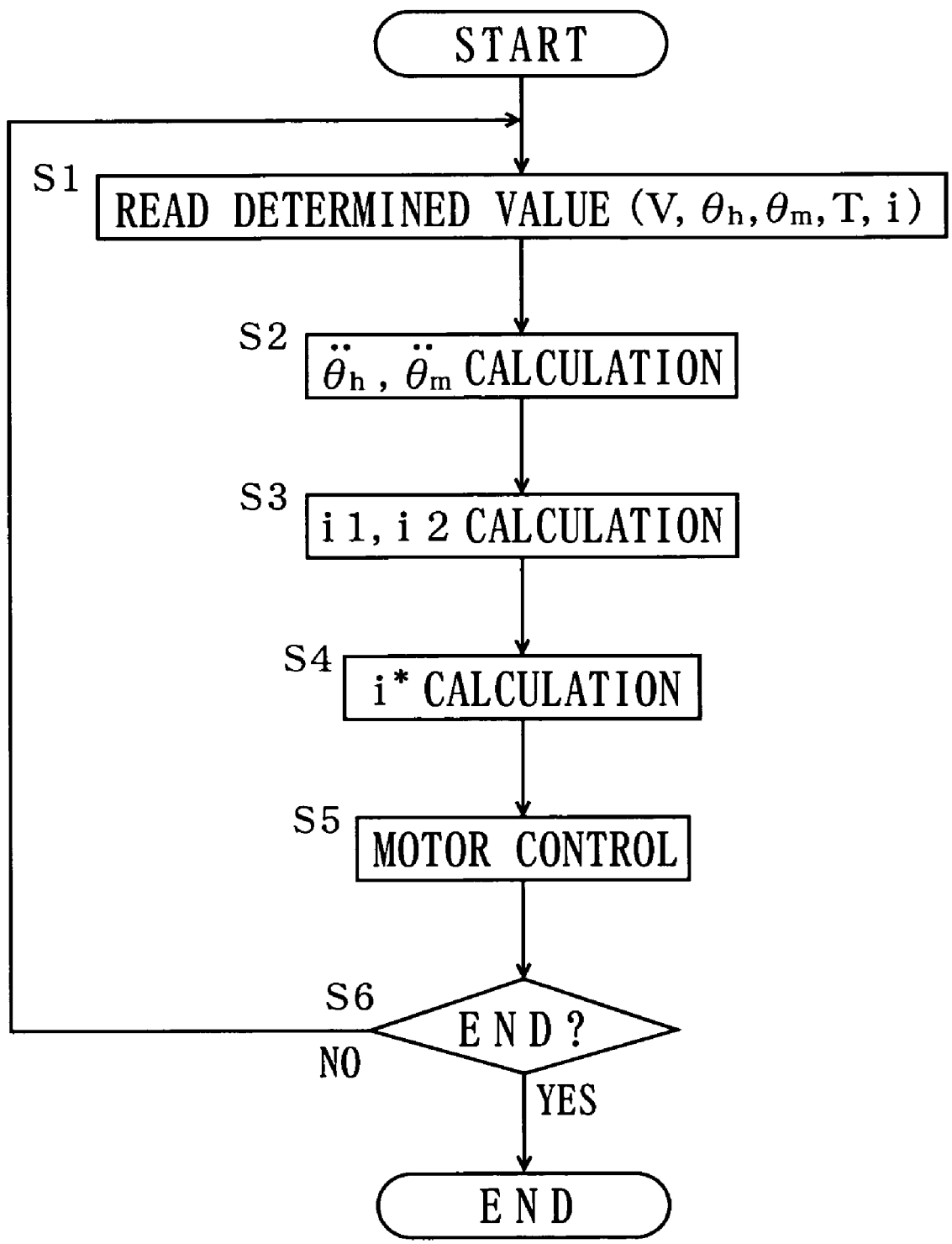
FIG. 27 is a flowchart showing the control procedure in the electric power steering apparatus according to the sixth embodiment of the present invention.
Figure 28:
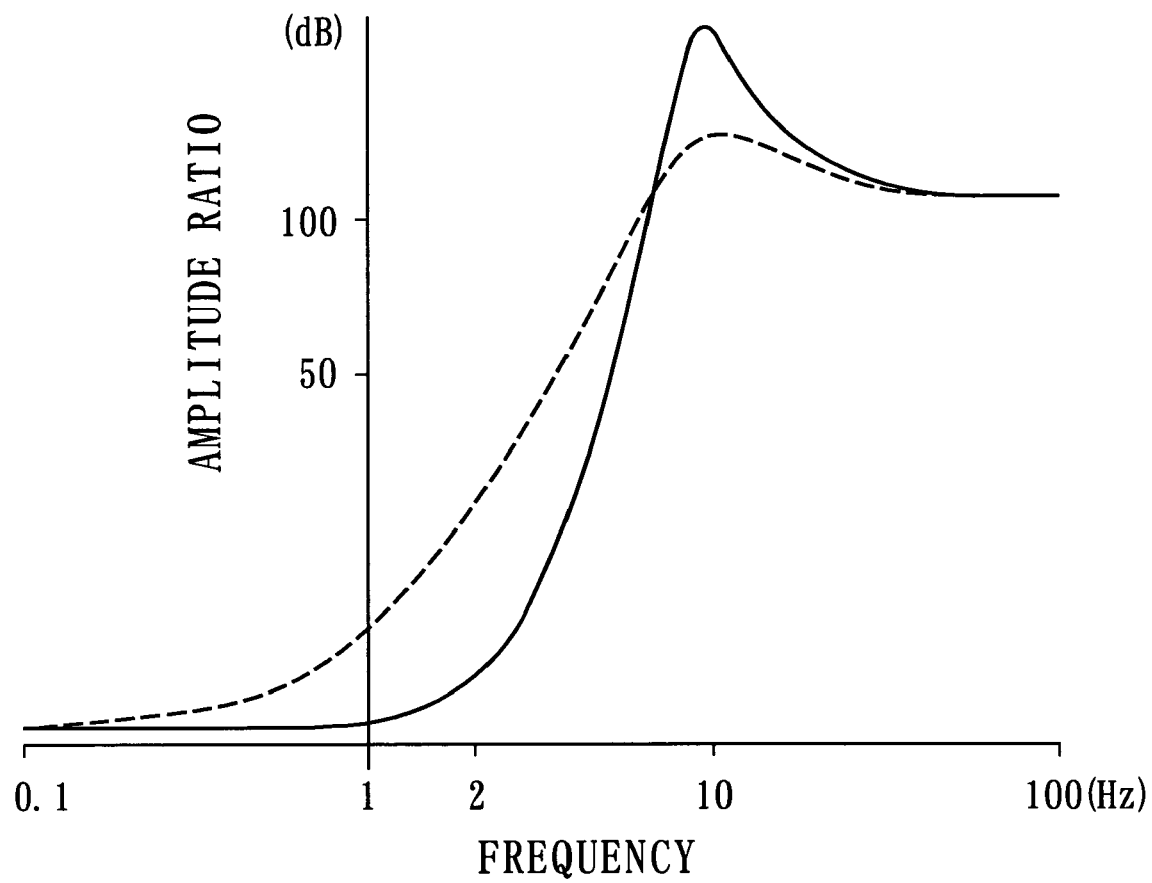
FIG. 28 is a board diagram representing the frequency response characteristic showing the steering characteristic in a conventional electric power steering apparatus.
Figure 29:
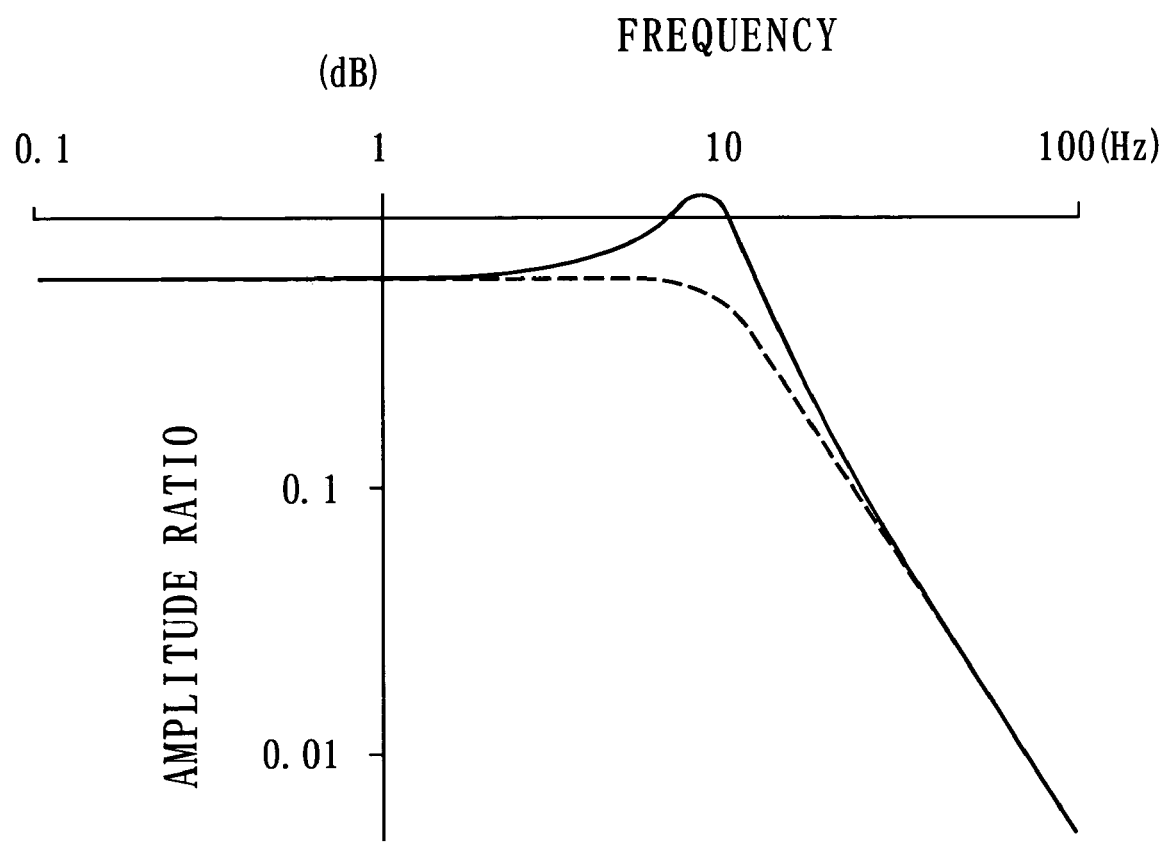
FIG. 29 is a board diagram representing the frequency response characteristic showing the influence of disturbance in a conventional electric power steering apparatus.
Figure 30:
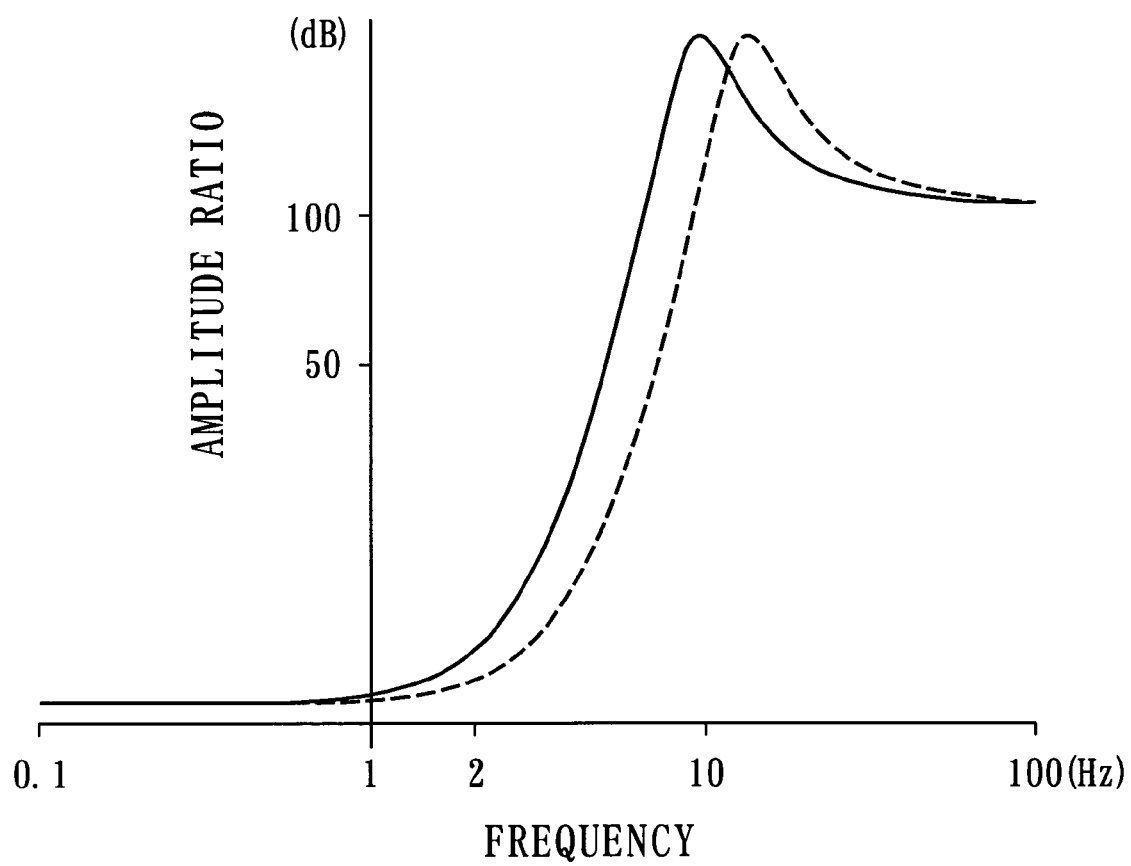
FIG. 30 is a board diagram representing the frequency response characteristic showing the steering characteristic in a conventional electric power steering apparatus.
Figure 31:
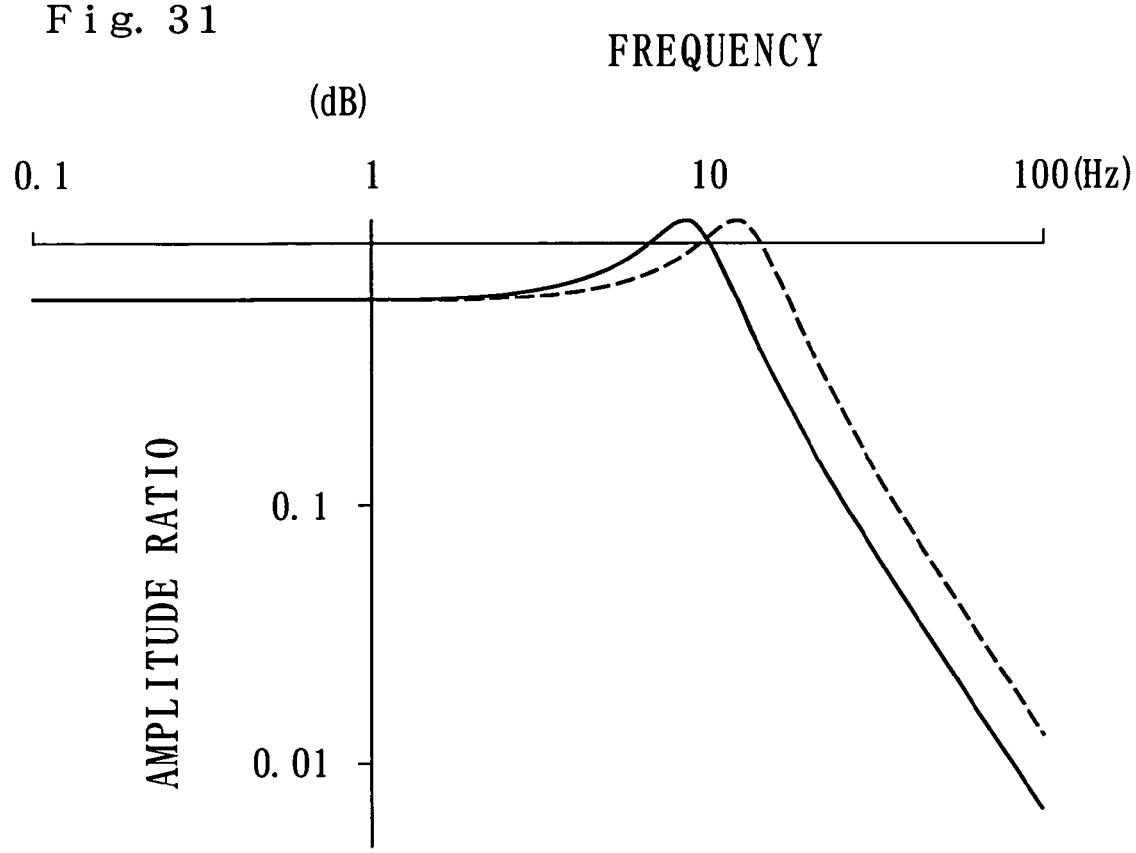
FIG. 31 is a board diagram representing the frequency response characteristic showing the influence of disturbance in a conventional electric power steering apparatus.

FIG. 25 to FIG. 27 illustrate the sixth embodiment, and the difference with the fourth embodiment is explained below, while the same reference numerals are given to the same components as the fourth embodiment and the explanation thereof is omitted. The difference with the fourth embodiment, foremost, is that the controller 20 corrects the steering assist power according to the rotation angular acceleration of the steering wheel 2 and the rotation angular acceleration of the motor 10 instead of the change acceleration of the steering torque T. Thus, an angle sensor 27 for determining the rotation angle $\theta_m$ of the motor 10 is connected to the controller 20. The rotation angular acceleration correspondence value in the fourth embodiment; that is, the rotation angular acceleration $d^2\theta_h/dt^2$ of the steering wheel 2 determined with the second order differentiation of the steering angle $\theta_h$ determined with the steering angle sensor 23 becomes the first rotation angular acceleration correspondence value in the sixth embodiment. The rotation angular acceleration $d^2\theta_m/dt^2$ of the motor 10 is determined as the second rotation angular acceleration correspondence value by the second order differentiation of the rotation angle $\theta_m$ determined with the angle sensor 27.

The first correction current i1 directly correlating with the rotation angular acceleration $d^2\theta_h/dt^2$ of the steering wheel 2 is determined as with the fourth embodiment.

As shown in FIG. 26, the relation set between the rotation angular acceleration $d^2\theta_m/dt^2$ of the motor 10 and the second correction reference current id is stored in the controller 20 as a table or an arithmetic expression for example. The second correction reference current id corresponding to the determined rotation angular acceleration $d^2\theta_m/dt^2$ is calculated in a calculation part 36' based on the stored relation. Regarding the relation between the rotation angular acceleration $d^2\theta_m/dt^2$ of the motor 10 and the second correction reference current id, as shown in the calculation part 36' of FIG. 26 for example, the first correction reference current id is inversely correlating with the rotation angular acceleration $d^2\theta_m/dt^2$. The code of positive and negative of the rotation angular acceleration $d^2\theta_m/dt^2$ and the second correction reference current id at the time of rightward steering is reversed at the time of leftward steering.

The relation set between the steering torque T and the second torque gain Gtd is stored as a table or an arithmetic expression for example, and the second torque gain Gtd corresponding to the determined steering torque T is calculated in a calculation part 37'. Regarding the relation between the absolute value of the steering torque T and the second torque gain Gtd, as shown in the calculation part 37' of FIG. 26 for example, the second torque gain Gtd increases pursuant to the increase in the absolute value of the steering torque T.

Further, the relation set between the vehicle speed V and the second vehicle speed gain Gvd is stored as a table or an arithmetic expression for example, and the second vehicle speed gain Gvd corresponding to the determined vehicle speed V is calculated in a calculation part 38'. Regarding the relation between the vehicle speed V and the second vehicle speed gain Gvd, as shown in the calculation part 38' of FIG. 26 for example, the second vehicle speed gain Gvd increases when the vehicle speed V is small in comparison to when it is large.

The second correction current i2 is determined by multiplying the second torque gain Gtd and the second vehicle speed gain Gvd to the second correction reference current id in the multiplication parts 39, 40. As a result, the relation set as shown in the calculation parts 36', 37', 38' of FIG. 26 is stored in the controller 20 as the second relation between the rotation angular acceleration $d^2\theta_m/dt^2$ of the motor 10 and the second correction current i2, and the second correction current i2 as the second motor output correction value inversely correlating with the rotation angular acceleration $d^2\theta_m/dt^2$ of the motor 10 is determined with the controller 20 from the second relation.

The flowchart of FIG. 27 shows the control procedure of the motor 10 pursuant to the controller 20. Firstly, the values V, $\theta_h$, $\theta_m$, T, i determined with the sensors are read (step S1), the rotation angular acceleration $d^2\theta_h/dt^2$ of the steering wheel 2 is subsequently determined by second order time-differentiating the steering angle $\theta_h$ determined in a time series, and rotation angular acceleration $d^2\theta_m/dt^2$ of the motor 10 is further determined by second order time-differentiating the rotation angle $\theta_m$ determined in a time series (step S2). Incidentally, in the initial stage of commencing control, the initial values preset as the rotation angular acceleration $d^2\theta_h/dt^2$ of the steering wheel 2 and rotation angular acceleration $d^2\theta_m/dt^2$ of the motor 10 can be used. Next, the first correction current i1=Gta·Gva·ia according to the rotation angular acceleration $d^2\theta_h/dt^2$ of the steering wheel 2 and the second correction current i2=Gtd·Gvd·id according to the rotation angular acceleration $d^2\theta_m/dt^2$ of the motor 10 are determined (step S3), the target drive current i*=Gv·(io+i1+i2) is determined (step S4), and the motor is feedback-controlled so as to reduce the deviation of the target drive current i* and the detected drive current i (step S5). Thereafter, whether the control is to be ended or not is determined based on whether the ignition switch is ON or OFF (step S6), for example, and the routine returns to step S1 when the control is not to be ended.

According to the sixth embodiment described above, board diagrams similar to the board diagrams representing the frequency response characteristic shown in FIG. 20 and FIG. 21 of the fourth embodiment can be obtained.

For example, the input torque Ti is determined with the following formulas.

$Ti=To+Ta+Tb$ $To=Ka\cdot Ks(\theta_h-\theta_p)$ $Ta=Kw\cdot d^2\theta_h/dt^2$ $Tb=Km\cdot d^2\theta_m/dt^2$ In the frequency response characteristic represented by the steering frequency and the amplitude ratio of the steering torque T relative to the steering angle $\theta_h$, the frequency $\omega_1$ and damping ratio $\zeta_1$ are determined with the following formulas.

$$\omega_1=\{K/(Jp-Kw-Km)\}^{1/2} \tag{21}$$

$$\zeta_1=Cp/[2\cdot\{(Jp-Kw-Km)\cdot\alpha1/\alpha2\}^{1/2}] \tag{22}$$

In the frequency response characteristic represented by the input frequency (Hz) of the disturbance torque and the amplitude ratio of the steering torque T relative to the disturbance torque, the frequency $\omega_2$ and damping ratio $\zeta_2$ are determined with the following formulas.

$$\omega_2=[\{Ks\cdot(1+Ka)+K\}/(Jp-Km)]^{1/2} \tag{23}$$

$$\zeta_2=Cp/[2\cdot\{(Jp-Km)\cdot Ks/\alpha1\}^{1/2}] \tag{24}$$

Since the first correction current i1 is directly correlating with the rotation angular acceleration $d^2\theta_h/dt^2$ of the steering wheel 2 and the gain of such rotation angular acceleration $d^2\theta_h/dt^2$ is Kw, the frequency $\omega_1$ increases pursuant to the above-mentioned formula (21) when the output of the motor 10 is corrected. In other words, the dotted line after correction shifts relative to the solid line before correction in FIG. 20 toward a direction in which the frequency $\omega_1$ increases. As a result, by correcting the output of the motor 10, since the amplitude ratio of the steering torque relative to the steering angle of the steering wheel 2 becomes smaller under the same frequency in the steering frequency range when a person operates the steering wheel 2, the steering response can be improved.

Since the second correction current i2 is inversely correlating with the rotation angular acceleration $d^2\theta_m/dt^2$ of the motor 10 and the gain of such rotation angular acceleration $d^2\theta_m/dt^2$ is Km, the frequency $\omega_2$ decreases pursuant to the above-mentioned formula (23) when the output of the motor 10 is corrected. In other words, the dotted line after correction shifts relative to the solid line before correction in FIG. 21 toward a direction in which the frequency $\omega_2$ decreases. As a result, by correcting the output of the motor 10, the resonance frequency of the steering system in which the amplitude ratio of the steering torque T relative to the disturbance torque reaches a peak value decreases. Thus, since the input frequency of the disturbance torque relative to the resonance frequency becomes smaller, the frequency range of disturbance in which the disturbance has an influence becomes narrow, and the influence of disturbance to the steering can be suppressed thereby.

Incidentally, although the foregoing formula (21) includes the gain Km, the frequency $\omega_1$ after the correction can be made larger than before the correction by making the gain Kw larger than the gain Km. The first relation between the rotation angular acceleration $d^2\theta_h/dt^2$ of the steering wheel 2 and the first correction current i1, and the second relation between the rotation angular acceleration $d^2\theta_m/dt^2$ of the motor 10 and the second correction current i2 are set such that the frequency $\omega_2$ after the correction becomes larger than before the correction. In this case, since the foregoing formula (23) does not include the gain Kw, the frequency $\omega_2$ after the correction can be made smaller than before the correction even upon setting such first and second relations.

The present invention is not limited to the foregoing embodiments. For example, a sensor for determining the rotation angle $\theta_p$ of the pinion 5 can be provided when the rotation angular velocity of the pinion 5 is determined as the rotation angular velocity correspondence value corresponding to the rotation angular velocity of the motor 10. Or, a sensor for determining the rotation angle $\theta_p$ of the pinion 5 can be provided when the rotation angular acceleration of the pinion 5 is determined as the rotation angular acceleration correspondence value corresponding to the rotation angular acceleration of the motor 10. Further, sensors for determining the inter-terminal voltage of the motor 10 and motor current can be provided when the rotation angle per unit time of the motor 10 is determined from the determined values and known arithmetic expressions. The mechanism for transmitting the rotation of the steering wheel to the vehicle wheels so as to vary the steering angle is not limited to the embodiments, and the rotation of the steering wheel can be transmitted to the vehicle wheels from the steering shaft via a mechanism such as a linkage other than the rack and pinion. Further, the transmission mechanism for transmitting the output of the motor for generating the steering assist power to the steering system is not limited to the embodiments so as long as it is able to apply such steering assist power, for instance, the steering assist power can be applied by transmitting the motor output to a ball nut screwed to a ball screw that is formed integrally with the rack.

What is claimed is:

1. An electric power steering apparatus comprising a motor for generating steering assist power; a sensor for determining steering torque required to operate a steering wheel; and a controller for controlling said motor so as to generate the steering assist power according to the determined steering torque; said electric power steering apparatus further comprising:
    a determining part for determining a rotation angular velocity correspondence value corresponding to the rotation angular velocity of said steering wheel;
    a determining part for determining a change velocity correspondence value corresponding to the change velocity of said steering torque;
    a storing part for storing a first relation set between said rotation angular velocity correspondence value and a first motor output correction value correlating with said rotation angular velocity correspondence value;
    a storing part for storing a second relation set between said change velocity correspondence value and a second motor output correction value directly correlating with said change velocity correspondence value; and
    a correcting part for correcting the output of said motor in accordance with the sum of said first motor output correction value corresponding to the determined rotation angular velocity correspondence value and said second motor output correction value corresponding to the determined change velocity correspondence value;
    wherein, in a frequency response characteristic represented by the steering frequency of said steering wheel and the amplitude ratio of the steering torque relative to the steering angle of said steering wheel, said first relation is set such that the amplitude ratio is within a setting range as a result of correction of the output of said motor, at least within the steering frequency range when a person operates the steering wheel; and
    in a frequency response characteristic represented by the frequency of the disturbance torque input from the road surface to the steering system via vehicle wheels and the amplitude ratio of the steering torque relative to said disturbance torque, said second relation is set such that the amplitude ratio becomes smaller at the resonance frequency as a result of correction of the output of said motor.

2. An electric power steering apparatus comprising a motor for generating steering assist power; a sensor for determining steering torque required to operate a steering wheel; and a controller for controlling said motor so as to generate the steering assist power according to the determined steering torque; said electric power steering apparatus further comprising:
    a determining part for determining a rotation angular velocity correspondence value corresponding to the rotation angular velocity of said motor;
    a determining part for determining a change velocity correspondence value corresponding to the change velocity of said steering torque;
    a storing part for storing a first relation set between said rotation angular velocity correspondence value and a first motor output correction value correlating with said rotation angular velocity correspondence value;
    a storing part for storing a second relation set between said change velocity correspondence value and a second motor output correction value directly correlating with said change velocity correspondence value; and
    a correcting part for correcting the output of said motor in accordance with the sum of said first motor output correction value corresponding to the determined rotation angular velocity correspondence value and said second motor output correction value corresponding to the determined change velocity correspondence value;
    wherein, in a frequency response characteristic represented by the steering frequency of said steering wheel and the amplitude ratio of the steering torque relative to the steering angle of said steering wheel, said first relation is set such that the amplitude ratio is within a setting range as a result of correction of the output of said motor, at least within the steering frequency range when a person operates the steering wheel; and
    in a frequency response characteristic represented by the frequency of the disturbance torque input from the road surface to the steering system via vehicle wheels and the amplitude ratio of the steering torque relative to said disturbance torque, said second relation is set such that the amplitude ratio becomes smaller at a resonance frequency as a result of correction of the output of said motor.

3. An electric power steering apparatus comprising a motor for generating steering assist power; a sensor for determining steering torque required to operate a steering wheel; and a controller for controlling said motor so as to generate the steering assist power according to the determined steering torque; said electric power steering apparatus further comprising:

a determining part for determining a first rotation angular velocity correspondence value corresponding to the rotation angular velocity of said steering wheel;

a determining part for determining a second rotation angular velocity correspondence value corresponding to the rotation angular velocity of said motor;

a storing part for storing a first relation set between said first rotation angular velocity correspondence value and a first motor output correction value correlating with said first rotation angular velocity correspondence value;

a storing part for storing a second relation set between said second rotation angular velocity correspondence value and a second motor output correction value inversely correlating with said second rotation angular velocity correspondence value; and a correcting part for correcting the output of said motor in accordance with the sum of said first motor output correction value corresponding to the determined first rotation angular velocity correspondence value and said second motor output correction value corresponding to the determined second rotation angular velocity correspondence value;

wherein, in a frequency response characteristic represented by the steering frequency of said steering wheel and the amplitude ratio of the steering torque relative to the steering angle of said steering wheel, said first relation is set such that the amplitude ratio is within a setting range as a result of correction of the output of said motor, at least within the steering frequency range when a person operates the steering wheel; and in a frequency response characteristic represented by the frequency of the disturbance torque input from the road surface to the steering system via vehicle wheels and the amplitude ratio of the steering torque relative to said disturbance torque, said second relation is set such that the amplitude ratio becomes smaller at the resonance frequency as a result of correction of the output of said motor.

4. An electric power steering apparatus comprising a motor for generating steering assist power; a sensor for determining steering torque required to operate a steering wheel; and a controller for controlling said motor so as to generate the steering assist power according to the determined steering torque; said electric power steering apparatus further comprising:

a determining part for determining a rotation angular velocity correspondence value corresponding to the rotation angular velocity of said steering wheel;

a determining part for determining a change velocity correspondence value corresponding to the change velocity of the physical quantity influencing said steering torque;

a storing part for storing a first relation set between said rotation angular velocity correspondence value and a first motor output correction value correlating with said rotation angular velocity correspondence value;

a storing part for storing a second relation set between said change velocity correspondence value and a second motor output correction value correlating with said change velocity correspondence value; and a correcting part for correcting the output of said motor in accordance with the sum of said first motor output correction value corresponding to the determined rotation angular velocity correspondence value and said second motor output correction value corresponding to the determined change velocity correspondence value;

wherein, in a frequency response characteristic represented by the steering frequency of said steering wheel and the amplitude ratio of the steering torque relative to the steering angle of said steering wheel, said first relation is set such that the amplitude ratio is within a setting range as a result of correction of the output of said motor, at least within the steering frequency range when a person operates the steering wheel; and in a frequency response characteristic represented by the frequency of the disturbance torque input from the road surface to the steering system via vehicle wheels and the amplitude ratio of the steering torque relative to said disturbance torque, said second relation is set such that the amplitude ratio becomes smaller at the resonance frequency as a result of correction of the output of said motor.

5. An electric power steering apparatus comprising a motor for generating steering assist power; a sensor for determining steering torque required to operate a steering wheel; and a controller for controlling said motor so as to generate the steering assist power according to the determined steering torque; said electric power steering apparatus further comprising:

a determining part for determining a rotation angular acceleration correspondence value corresponding to the rotation angular acceleration of said steering wheel;

a determining part for determining a change acceleration correspondence value corresponding to the change acceleration of said steering torque;

a storing part for storing a first relation set between said rotation angular acceleration correspondence value and a first motor output correction value directly correlating with said rotation angular acceleration correspondence value;

a storing part for storing a second relation set between said change acceleration correspondence value and a second motor output correction value directly correlating with said change acceleration correspondence value; and a correcting part for correcting the output of said motor in accordance with the sum of said first motor output correction value corresponding to the determined rotation angular acceleration correspondence value and said second motor output correction value corresponding to the determined change acceleration correspondence value;

wherein, in a frequency response characteristic represented by the steering frequency of said steering wheel and the amplitude ratio of the steering torque relative to the steering angle of said steering wheel, said first relation is set such that the amplitude ratio becomes smaller under the same frequency as a result of correction of the output of said motor, at least within the steering frequency range when a person operates the steering wheel; and in a frequency response characteristic represented by the frequency of the disturbance torque input from the road surface to the steering system via vehicle wheels and the amplitude ratio of the steering torque relative to said disturbance torque, said second relation is set such that the resonance frequency at which the amplitude ratio reaches the peak value becomes smaller as a result of correction of the output of said motor.

6. An electric power steering apparatus comprising a motor for generating steering assist power; a sensor for determining steering torque required to operate a steering wheel; and a controller for controlling said motor so as to generate the steering assist power according to the determined steering torque; said electric power steering apparatus further comprising:

a determining part for determining a rotation angular acceleration correspondence value corresponding to the rotation angular acceleration of said motor;

a determining part for determining a change acceleration correspondence value corresponding to the change acceleration of said steering torque;

a storing part for storing a first relation set between said rotation angular acceleration correspondence value and a first motor output correction value directly correlating with said rotation angular acceleration correspondence value;

a storing part for storing a second relation set between said change acceleration correspondence value and a second motor output correction value directly correlating with said change acceleration correspondence value; and a correcting part for correcting the output of said motor in accordance with the sum of said first motor output correction value corresponding to the determined rotation angular acceleration correspondence value and said second motor output correction value corresponding to the determined change acceleration correspondence value;

wherein, in a frequency response characteristic represented by the steering frequency of said steering wheel and the amplitude ratio of the steering torque relative to the steering angle of said steering wheel, said first relation is set such that the amplitude ratio becomes smaller under the same frequency as a result of correction of the output of said motor, at least within the steering frequency range when a person operates the steering wheel; and in a frequency response characteristic represented by the frequency of the disturbance torque input from the road surface to the steering system via vehicle wheels and the amplitude ratio of the steering torque relative to said disturbance torque, said second relation is set such that the resonance frequency at which the amplitude ratio reaches the peak value becomes smaller as a result of correction of the output of said motor.

7. An electric power steering apparatus comprising a motor for generating steering assist power; a sensor for determining steering torque required to operate a steering wheel; and a controller for controlling said motor so as to generate the steering assist power according to the determined steering torque; said electric power steering apparatus further comprising:

a determining part for determining a first rotation angular acceleration correspondence value corresponding to the rotation angular acceleration of said steering wheel;

a determining part for determining a second rotation angular acceleration correspondence value corresponding to the rotation angular acceleration of said motor;

a storing part for storing a first relation set between said first rotation angular acceleration correspondence value and a first motor output correction value directly correlating with said first rotation angular acceleration correspondence value;

a storing part for storing a second relation set between said second rotation angular acceleration correspondence value and a second motor output correction value inversely correlating with said second rotation angular acceleration correspondence value; and a correcting part for correcting the output of said motor in accordance with the sum of said first motor output correction value corresponding to the determined first rotation angular acceleration correspondence value and said second motor output correction value corresponding to the determined second rotation angular acceleration correspondence value;

wherein, as a result of correction of the output of said motor in accordance with said first motor output correction value, in a frequency response characteristic represented by the steering frequency of said steering wheel and the amplitude ratio of the steering torque relative to the steering angle of said steering wheel, said first relation is set such that the amplitude ratio becomes smaller under the same frequency, at least within the steering frequency range when a person operates the steering wheel; and as a result of correction of the output of said motor in accordance with said second motor output correction value, in a frequency response characteristic represented by the frequency of the disturbance torque input from the road surface to the steering system via vehicle wheels and the amplitude ratio of the steering torque relative to said disturbance torque, said second relation is set such that the resonance frequency at which the amplitude ratio reaches the peak value becomes smaller.

* * * * *